US010540992B2

(12) United States Patent
Goldhor et al.

(10) Patent No.: US 10,540,992 B2
(45) Date of Patent: Jan. 21, 2020

(54) DEFLATION AND DECOMPOSITION OF DATA SIGNALS USING REFERENCE SIGNALS

(71) Applicants: Speech Technology & Applied Research Corporation, Lexington, MA (US); Richard S. Goldhor, Belmont, MA (US)

(72) Inventors: Richard S. Goldhor, Belmont, MA (US); Keith Gilbert, Berlin, MA (US); Joel MacAuslan, Nashua, NH (US)

(73) Assignees: Richard S. Goldhor, Belmont, MA (US); Speech Technology & Applied Research Corporation, Lexington, MA (US)

(*) Notice: Subject to any disclaimer, the term of this patent is extended or adjusted under 35 U.S.C. 154(b) by 0 days.

(21) Appl. No.: 16/019,873

(22) Filed: Jun. 27, 2018

(65) Prior Publication Data

US 2018/0322892 A1 Nov. 8, 2018

Related U.S. Application Data

(63) Continuation-in-part of application No. 15/160,860, filed on May 20, 2016, now Pat. No. 10,067,093, and a continuation-in-part of application No. 13/933,060, filed on Jul. 1, 2013, now Pat. No. 10,473,628.

(60) Provisional application No. 62/164,465, filed on May 20, 2015, provisional application No. 62/526,860,
(Continued)

(51) Int. Cl.
*G06F 13/00* (2006.01)
*G10L 25/51* (2013.01)

(52) U.S. Cl.
CPC .................................... *G10L 25/51* (2013.01)

(58) Field of Classification Search
CPC ...................................................... G10L 25/51
See application file for complete search history.

(56) References Cited

U.S. PATENT DOCUMENTS

| | | | | |
|---|---|---|---|---|
| 10,067,093 B2 | 9/2018 | Goldhor | | |
| 2004/0071310 A1* | 4/2004 | Sharma | H04N 1/4446 | 382/100 |
| 2005/0213777 A1 | 9/2005 | Zador | | |

(Continued)

OTHER PUBLICATIONS

Robert Aichner et al., "A real-time blind source separation scheme and its application to reverberant and noisy acoustic environments," Signal Processing 86 (2006) 1260-1277.

(Continued)

*Primary Examiner* — Phuong Huynh
(74) *Attorney, Agent, or Firm* — Blueshift IP, LLC; Robert Plotkin

(57) ABSTRACT

A system processes data signals consisting of sums of independent signal terms, zero or more of which signal terms may already have been identified, in order to generate one or more additional terms. Deflated versions of the data signals are created by subtracting from the data signals any previously identified signal terms. Additional independent signal terms are computed using a set of reference signals organized into mutually independent partioning support sets. The images of each support set are computed on the data signals. Computed images on a data signal that are non-zero are identified as additional independent signal terms of that data signal.

10 Claims, 30 Drawing Sheets

Related U.S. Application Data filed on Jun. 29, 2017, provisional application No. 61/666,696, filed on Jun. 29, 2012.

(56) References Cited

U.S. PATENT DOCUMENTS

| | | | |
|---|---|---|---|
| 2006/0034361 | A1 | 2/2006 | Choi |
| 2006/0072767 | A1 | 4/2006 | Zhang |
| 2006/0176149 | A1 | 8/2006 | Douglas |
| 2008/0027722 | A1 | 1/2008 | Haulick |
| 2009/0012779 | A1 | 1/2009 | Ikeda |
| 2009/0214052 | A1 | 8/2009 | Liu |
| 2010/0128897 | A1 | 5/2010 | Saruwatari |
| 2010/0329472 | A1 | 12/2010 | Nakadai |
| 2012/0322511 | A1* | 12/2012 | Fox ..................... G10L 21/0208 455/570 |
| 2013/0294608 | A1 | 11/2013 | Yoo |
| 2013/0297298 | A1 | 11/2013 | Yoo |
| 2014/0195201 | A1 | 7/2014 | Goldhor |
| 2016/0341701 | A1 | 11/2016 | Goldhor |
| 2017/0230654 | A1 | 8/2017 | Jung |

OTHER PUBLICATIONS

Robert Aichner, "Acoustic Blind Source Separation in Reverberant and Noisy Environments," Doktor-Ingenieur, pp. 1-267, 2007.

Aichner, R, H Buchner, F Yan, and W Kellermann. "A Real-Time Blind Source Separation Scheme and Its Application to Reverberant and Noisy Acoustic Environments." Signal Processing 86, No. 6 (Jun. 2006): 1260-77. doi:10.10161j.sigpro.2005.06.022.

Cover, T. M., and Joy A. Thomas, "Elements of Information Theory" Wiley Series in Telecommunications. New York: Wiley, 1991. p. 18ff.

Goldhor, Richard. "Sensor Image-Based Environmental Listening Assistant," NIH SBIR Grant No. R43 DC015416, Mar. 15, 2016.

Golub, Gene H., and Charles F. Van Loan "Matrix Computations" 3rd ed. Johns Hopkins Studies in the Mathematical Sciences. Baltimore: Johns Hopkins University Press, 1996. Chapter 5, p. 230 ff.

M. Akil and C. Serviere, "Separability of convolutive mixtures based on Wiener filtering and mutual information criterion," in Signal Processing Conference, 2006 14th European, 2006, pp. 1-4.

Matsuoka, K. "Minimal Distortion Principle for Blind Source Separation," 4:2138-43. Soc. Instrument & Control Eng. (SICE), 2002. doi:10.1109/SICE.2002.1195729.

Matsuoka, Kiyotoshi, and Satoshi Nakashima. "Minimal Distortion Principle for Blind Source Separation." In Proc. Int. Conf. Independent Component Analysis and Blind Signal Separation. Rome, 2001.

R. Aichner, H. Buchner, and W. Kellermann, "Convolutive Blind Source Separation for Noisy Mixtures," in Speech and Audio Processing in Adverse Environments, E. Hänsler and G. Schmidt, Eds. Berlin, Heidelberg: Springer Berlin Heidelberg, 2008, pp. 469-524.

De Sa, A.M.F.L.M., "A note on the sampling distribution of coherence estimate for the detection of periodic signals," Signal Processing Letters, IEEE, Mar. 2004, vol. 11, No. 3, pp. 323,325.

Kay, S. M.; Modern Spectral Estimation. Englewood Cliffs, NJ: Prentice-Hall, 1988, pp. 453-455.

Non-Final Rejection dated Oct. 17, 2018 for U.S. Appl. No. 13/933,060 of Richard Goldhor, filed Jul. 1, 2013, 29 pages.

Ryu Takeda et al., "Speedup and Performance Improvement of ICA-based Robot Audition by Parallel and Resampling-based Block-wise Processing," The 2010 IEEE/RSJ International Conference on Intelligent Robots and Systems, Oct. 18-22, 2010, Taipei Taiwan, 8 pages.

Ryu Takeda et al., "ICA-Based Efficient Blind Dereverberation and Echo Cancellation Method for Barge-In-Able Robot Audition," ICASSP, IEEE International Conference on Acoustics, Speech and Signal Processing—Proceedings, Apr. 19-24, 2009, Taipei Taiwan, pp. 3677-3680.

Notice of Allowance dated Jul. 1, 2019 in U.S. Appl. No. 13/933,060 of Richard Goldhor, filed Jul. 1, 2013, 17 pages.

* cited by examiner

Figure 19: The $q^{th}$ source removal from the $p^{th}$ mixture.

Figure 20 – Double SCRUB and BSS: semi-blind source separation enhancement.

DEFLATION AND DECOMPOSITION OF DATA SIGNALS USING REFERENCE SIGNALS

STATEMENT AS TO FEDERALLY SPONSORED RESEARCH

This invention was made with government support under grant numbers R44 DC011668, R43 DC015416, R43 DC015942, R43 DC011475, and R43 DC006379 awarded by the National Institutes of Health. The Government has certain rights in the invention.

The Government has certain rights in the invention.

BACKGROUND

Often observable data signals are composed of additive mixtures of unobservable source signals, one or more of which it would be useful to recover or remove from the data signal in a principled manner. By way of example, in many common signal transmission environments, multiple signal sources are active at the same time. (For instance, in the real world, many acoustic sources in the environment may be simultaneously generating sounds.) A receiver (such as a listener) often would like to attend to a single signal source, but any sensor (e.g. microphone) in the environment typically responds to a mixture of sources. As indicated schematically in FIG. 1, each component of such a sensor's response corresponds to some source, delayed by the propagation time between that source and the sensor, and further filtered by echoes, radiation characteristics of the sources, and so forth. We call such a component a sensor image of its source.

It has been considered useful to be able to recover the underlying source signals from the available response mixtures, so that a listener could listen to each signal source separately. This is the source separation problem.

In a very important and common version of the source separation problem, the radiated signals of the underlying sources are not observable in any way. That is to say, they cannot be detected, measured, or recorded in isolation. Rather, the only available relevant information is the response signals generated by the sensors (e.g. microphones) that are present in the environment. The signals from those sensors (the "response mixtures," "sensor mixtures," or simply "mixtures") can be detected, captured, and processed.

From a signal processing perspective, the situation may be modeled as shown in FIG. 2. In this model it is assumed that the observable data signals m are composed of convolutive mixtures of the unknown sources s. The relationship between the hidden source signals and the data signals—the observable mixtures—are defined by a hidden "mixing matrix" H. An important signal processing challenge is to estimate those underlying but hidden sources by processing the observed sensor responses to create Source Images. This is referred to as the Blind Source Separation (BSS) problem.

For example, referring to FIG. 3A, a system 300 is shown that corresponds to a particular example of the more general system shown in FIG. 2. System 300 includes a plurality of sources 302*a-c* and a plurality of sensors 306*a-c*. Although the system 300 is shown as including four sources 302*a-c* and three sensors 306*a-c*, the particular numbers of sources and sensors shown in FIG. 3A is merely an example and does not constitute a limitation of the present invention, which may be used in connection with any number of sources and any number of sensors, and any number of mixture components. The number of sources need not, in general, be equal to the number of sensors.

The sources 302*a-c* emit corresponding signals 304*a-c*. More specifically, source 302*a* emits signal 304*a*, source 302*b* emits signal 304*b*, and source 302*c* emits signal 304*c*. Although in FIG. 3A each of the sources 302*a-c* is shown as emitting exactly one signal, this is merely an example and does not constitute a limitation of the present invention, which may be used in connection with sources that that emit any number of signals.

In FIG. 3A, each of the sensors 306*a-c* receives a mixture of one or more of the signals 304*a-c*. In practice, any particular sensor may receive zero, one, two, or more signals. In the particular example of FIG. 3A, sensor 306*a* receives a mixture of signals 304*a* and 304*b*; sensor 306*b* receives a mixture of signals 304*b* and 304*c*; and sensor 306*c* receives solely signal 304*b*.

A signal source that contributes a mixture component with a statistically significant amount of energy to at least one sensor is called a contributing source. A source may be non-contributing either because it is inactive (not emitting a signal with any significant amount of energy, sometimes called being or becoming silent) or because its location in the environment, the signal propagation properties of the environment, and/or the location of the sensors in the environment combine to shield all sensors from its contribution. Additional factors that typically determine whether a particular source is contributing or not include the spectral content of the source signal, the transfer function of the environment, and the frequency response of the sensors.

The sensors 306*a-c* produce corresponding outputs 308*a -c* representing their input mixtures. These outputs are also called "responses" or "response signals." For example, sensor 306*a* produces output 308*a* representing the mixture of signals 304*a* and 304*b* received by sensor 306*a*; sensor 306*b* produces output 308*b* representing the mixture of signals 304*b* and 304*c* received by sensor 306*b*; and sensor 306*c* produces output 308*c* representing the signal 304*b* received by sensor 306*c*.

Although not specifically illustrated in FIG. 3A, the contribution that a particular signal makes to the mixture received by the sensors 306*a-c* may vary from source to source. For example, although in FIG. 3A both sensors 306*a* and 306*b* are shown as receiving signal 304*b*, properties of the signal 304*b* may in practice differ at sensors 306*a* and 306*b*, such as due to distances in distance traveled or other factors that dampen or otherwise modify the signal 304*b* on its way to sensors 306*a* and 306*b*. In many systems, there is a linear relationship between a source signal and the corresponding mixture component in the response of a particular sensor. This linear relationship can be described using a so-called "transfer function" that describes the propagation characteristics between the source and the sensor.

In many cases it would be advantageous to determine, or estimate, what each of the individual source signals 304*a-c* is. Techniques of processing sensor signals (which are mixtures) to separate sources from each other, are referred to as "Blind Source Separation" (BSS) algorithms. Here, the word "Blind" means that the only information available to the source separation system about the sources are the sensor responses—all of which are, in general, linear weighted mixtures of multiple sources. In other words, no "hidden" information about the sources themselves is available to the source separation system. The field of BSS processing is an active field of research—see, for instance, Aichner, et al (R. Aichner, H. Buchner, F. Yan, and W. Kellerman, "A real-time blind source separation scheme and its application to reverberant and noisy acoustic environments", Signal Processing, vol. 86, pp. 1260-1277, 2007.) for a detailed description of a BSS algorithm.

As applied to FIG. 3A, for example, BSS may be used in an attempt to process the outputs 308*a-c* of sensors 306*a-c*, respectively, to identify the source signals 304*a-c*. For example, the system 300 of FIG. 3A includes a blind source separation module 310 which receives the signals 304*a-c* output by the sensors 306*a-c* and generates, based solely on those sensor outputs 308*a-c*, source identification outputs 312*a-c* which are intended to identify the source signals 304*a-c* that caused the sensors 306*a-c* to produce the outputs 308*a-c*. For example, the blind source separation module 310 may be used to process outputs 308*a*, 308*b*, and 308*c* (e.g., simultaneously) to produce outputs 312*a-c*, where output 312*a* is intended to estimate source signal 304*a*; output 312*b* is intended to estimate source signal 304*b*; and output 312*c* is intended to estimate source signal 304*c*.

In the traditional BSS problem statement, the goal of the signal processing to be performed is to estimate the hidden source signals. However, this goal is itself problematic. In general, there are logical and mathematical limitations to what BSS algorithms can achieve. Note that the sources are truly hidden, and in general no pristine source signal is directly observable. Indeed, in many scenarios, including common acoustic environments, the very concept of a specific set of hidden source signals is ontologically suspect.

In these situations, the characterization of the sources as "hidden" actually masks a deeper problem: those signals are not well defined. This may be true, curiously enough, even though a BSS algorithm generates well-behaved estimates of the "hidden source signals." This is possible because, in general, the power of an estimated source is different by an unknown amount from the power of the original hidden signal, the order of output estimates is typically unrelated to any particular enumeration of the input signals (the "permutation ambiguity"), the estimated source is time-shifted by an arbitrary amount relative to the original, and the spectral power profile of the estimate and its original is generally different. For this reason, each output of the BSS algorithm is referred to herein as a source image, building on the metaphoric understanding of images as being recognizable reproductions of some original (the hidden source signal), but differing in size, orientation, etc. A source image is any signal that is related to the putative hidden source signal of a particular signal source by a convolution kernel.

In fact, a source signal that is referred to as "hidden" actually is not any particular signal at all. Rather, it can best be considered to be an entire equivalence class of perfectly coherent signals. Thus, in a situation in which there are N simultaneously active sources, the computational situation can best be understood as a search for the definition of N equivalence classes, each Source Equivalence Class (SEC) corresponding to one of the active sources.

In this understanding of the BSS problem, each of the N estimated source images generated by the BSS algorithm is best understood as an estimate of some arbitrary member of one of the Source Equivalence Classes. Once any of the signals in an SEC is specified, all of the other signals in that class can, in theory, be generated, because any two signals in an SEC are related to each other via a finite length convolution kernel called an image kernel (and sometimes informally referred to as a "weight"). Given any member signal, there is another signal in the SEC corresponding to each possible convolution kernel.

Note that there are no image kernels capable of mapping a member of one SEC to a member of another SEC. This is because all members of one SEC are incoherent with all members of all other SECs. As a result, the expected value of a kernel defined by their ratios would have zero energy.

It will be understood that one of the members of each SEC might be regarded in some sense as the original "hidden source signal." But that hidden member cannot, in general, be identified without imposing additional constraints on the computational problem. And, in many cases, the hidden source signal cannot be identified because it is, in the absence of any such defensible constraints, not well defined.

It is true that the hidden source member of the SEC can be defined, or at least a narrower subset of the SEC containing the hidden source member can be defined, if additional constraints are imposed by the physical situation or the statement of the problem to be solved. For example, if the physical locations of all of the signal sources and sensors are specified, the members of the SEC that might qualify as the original signal can be constrained. Much current work on the BSS problem takes the approach of attempting to better define the original source signal by imposing additional situational or computational constraints, and working through their computational consequences. Such systems are often identified as Blind Deconvolution and Blind System Identification systems.

A distinct and separate problem is to determine the component sensor images of each source. Note that, in general, none of the sensor images of a source will be identical to the corresponding hidden source signal. Nor will one of the sensor images of a source be identical to another image of the same source. Instead, each sensor image constitutes an independent view of its source. Because there are many signal processing systems that either require or can take advantage of multiple independent images of a signal source, particularly if each image can be associated with a specific sensor, it would be particularly advantageous to decompose every sensor signal into its constituent sensor images.

SUMMARY

A system processes data signals consisting of sums of independent signal terms, zero or more of which signal terms may already have been identified, in order to generate one or more additional independent signal terms. Deflated versions of the data signals are created by subtracting from the data signals any previously identified signal terms. Additional independent signal terms are computed using a set of reference signals organized into mutually independent partitioning support sets. The images of each support set are computed on the data signals. Computed images on a data signal that are non-zero are identified as additional independent signal terms of that data signal.

Other features and advantages of various aspects and embodiments of the present invention will become apparent from the following description and from the claims.

DETAILED DESCRIPTION

Figure 1:
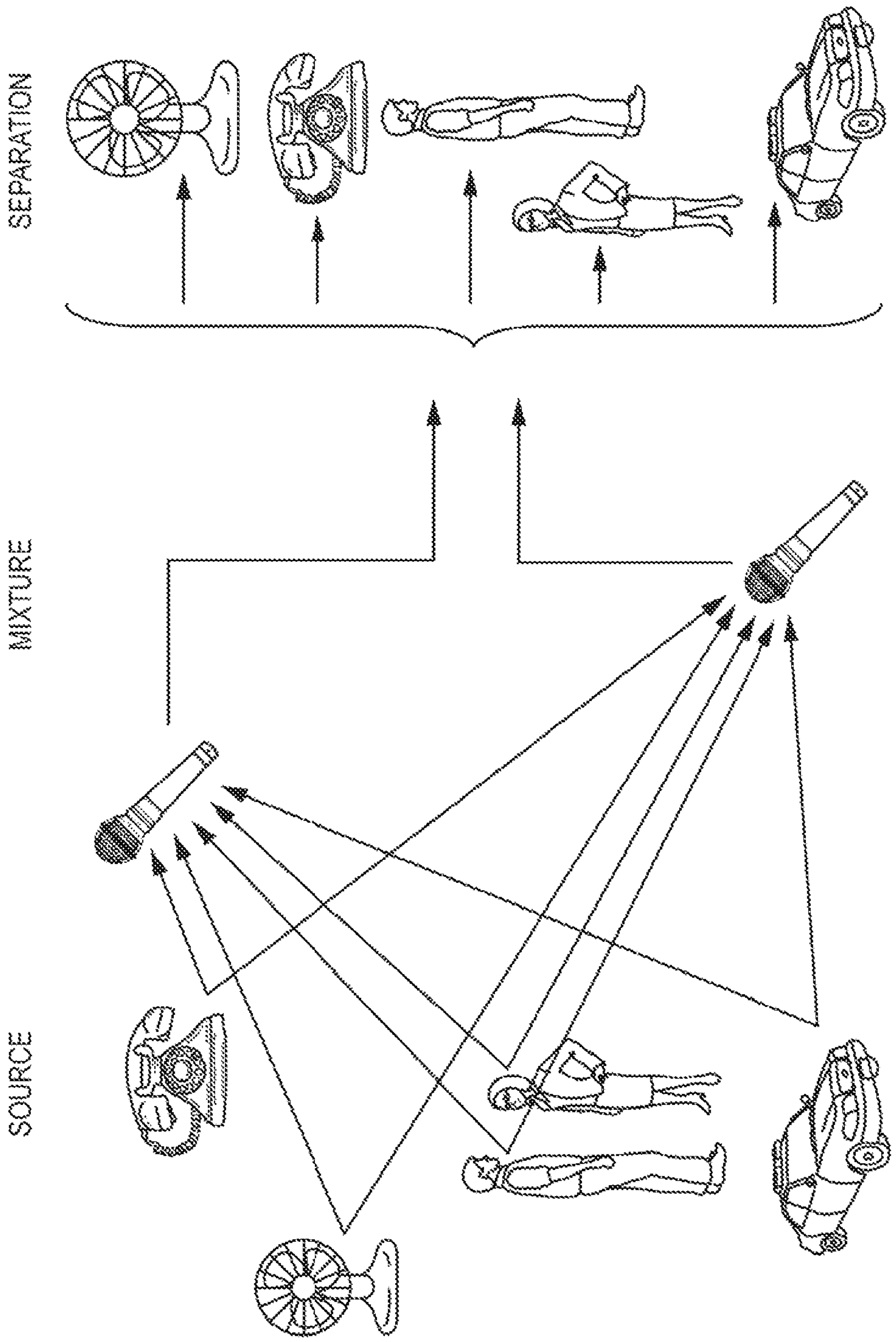
FIG. 1 is a diagram illustrating the response of a sensor to a mixture of sources in the environment.
Figure 2:
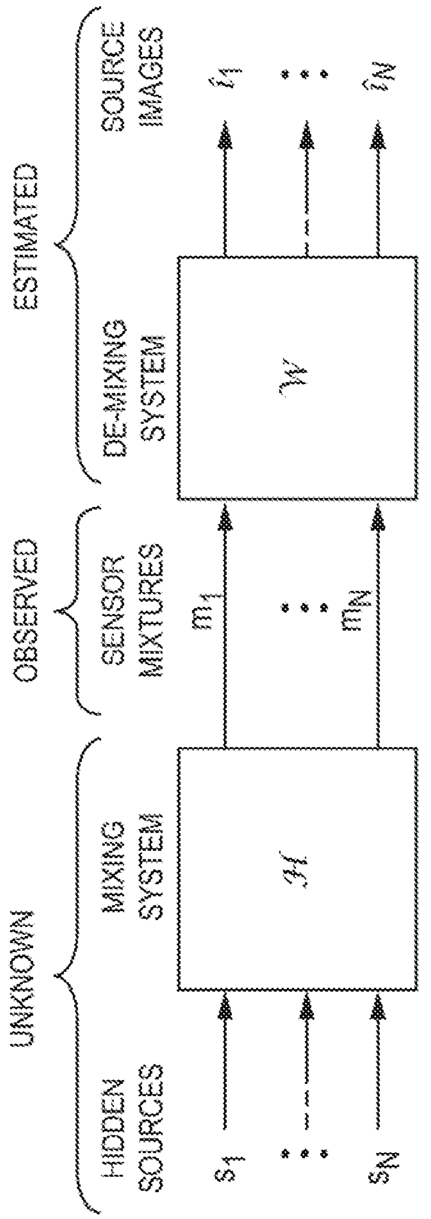
FIG. 2 is a diagram illustrating a model of sensor responses.

Embodiments of the present invention include methods and systems for deflating or decomposing one or more data signals, drawn from a set of data signals. This set of data signals is referred to herein as "the data set." Each data signal is modeled as being composed of an unweighted instantaneous sum of essentially independent signals (to be described below) referred to herein as independent signal terms, or "ISTs." The decomposition process employs signals drawn from a second set of reference signals to deflate or decompose one or more of the data signals into a plurality of ISTs.

Because identifying the set of reference signals ("the reference set") upon which the decomposition process depends, and choosing an appropriate measure of "essential independence" of signal terms, requires user intervention and knowledge, embodiments of the present invention do not constitute Blind Source Separation methods and systems, even though they may employ the results of BSS methods. Rather, they comprise knowledge-based mixture decomposition methods and systems. To distinguish them from BSS systems, we sometimes informally refer to these methods and systems as Only Mostly Blind Source Separation (or "OMBSS") techniques.

Each IST is itself modeled as a linear weighted mixture of one or more independent unknown source signals. This means that an IST is a sum of one or more hidden signals, each of which may be filtered by an arbitrary linear filter. The linear filtering of each source may, for example, take the form of a simple scalar amplification. In this "instantaneous" case, the linear filter is a simple gain factor (such as a unitary gain), and the linear filtering process that forms the IST may be a multiply-and-sum function. Alternatively, the mixing process may be fully "convolutive," in which case the linear filters have arbitrary impulse responses, and the linear weighting function may be modeled as a convolution of impulse responses with source signals, the weighted mixture elements being added together to form the IST.

The data signal itself consists of either a single IST, or an unweighted instantaneous sum of independent ISTs. Although the source signals and their filter characteristics are "hidden" (i.e., unknown and unobservable), under appropriate circumstances these additive ISTs can be determined by decomposing a data signal using techniques described below. Certain embodiments of this invention involve identifying ISTs from which the signals in a data set are composed. Certain embodiments of this invention include methods and systems for ascertaining useful properties of those ISTs. Certain embodiments of this invention include methods for "deflating" data signals by subtracting one or more identified ISTs from those signals. This subtraction process is sometimes called "deflation," and the difference—the residue—of the deflation operation is sometimes called a deflated signal.

The methods for decomposing data signals described herein employ one or more reference signals, which together comprise a reference set. The same reference set is employed for decomposing all of the data signals in a data set. In brief, the signals in the reference set are used to decompose each signal in the data set into separate parts, some of which are identified as valid ISTs, and others as not being valid ISTs—that is, not being any independent linear mixture of one or more of the hidden sources from which the data signal was formed. Using methods disclosed herein, valid ISTs are identified, and used to guide further decomposition and analysis.

Any well-formed signal may be employed as a reference signal, although some signals are inherently more useful as reference signals than others. It turns out that linear mixtures of the hidden sources from which the ISTs of data signals are constructed make useful reference signals, and that linearly filtered versions of the ISTs themselves make particularly useful reference signals.

Reference signals and data signals may take many forms, such as acoustic signals, or digital or analog audio signals resulting from microphone responses, electronic devices, etc. Signals may also be electrical in nature, arising from, for example, natural systems (e.g. bioelectrical signals) or engineered systems (e.g. electromagnetic equipment). Alternatively, for example, such signals may be ordered sequences of data values generated by numerical computing equipment.

Particularly useful reference signals may be constructed or identified in many ways. For example, external knowledge may be employed to establish a hypothesis that a selected signal is an IST of a data signal, and on the basis of that hypothesis the selected signal may be chosen as a reference signal. For example, if the response signals of a set of microphones comprise the data set, then the input signal to a loudspeaker in the vicinity of the microphones may be identified as one of the reference signals.

Alternatively, for example, reference signals may be generated from the data signals themselves. For instance, a Blind Source Separation (BSS) algorithm may be used to generate a set of reference signals from the data signals, as described herein. As another example, a "beamforming" algorithm may be used to generate one or more reference signals. All of the reference signals in a reference set may be generated using a single method, such as a BSS algorithm, or different reference signals in the reference set may be generated in different ways. The utility of the methods and systems disclosed herein does not depend on any particular method of generating reference signals.

Similarly, data signals may be constructed or identified in many ways. A data signal may, for example, represent an observable (that is, measurable) quantity in the real world, such as the output voltage of a sensor. As one example, the output signal of an acoustic microphone is a useful type of data signal, and the output signals from a set of microphones are an example of a useful data set.

Typically, digitally sampled signal values x[k] are known to within some accuracy, generally represented as the variance of errors or uncertainties about x[k]. Often a single scalar value v can be determined that characterizes the variance of the entire signal. Testing whether signal values are different from zero then amounts to testing whether those values differ from 0 by significantly more than this known variance would predict, for a specified level of significance $\alpha$, determined by the specifics of the situation.

We can make this determination by computing S, the sum of the squared signal values divided by v. We then determine, for this value of S, the tabulated or computed value P(S) of the cumulative of ChiSq[N], the chi-squared distribution with N degrees of freedom, where N is the number of samples in the signal. We accept a signal as being non-zero when P(S) is greater than $(1-\alpha)$. Values of P(S) that are smaller than $(1-\alpha)$ indicate that any overall non-zero signal, if present at all, is not detectable (by this test), given the known level of uncertainties in the x[k]. In these cases we consider the signal to be effectively zero.

To identify two signals as effectively equal, we subtract one from the other and determine whether this difference is effectively zero, using the same criteria as above.

If some non-trivial linear combination (additive mixture, including perhaps convolutive mixtures) of a set of signals exists that is effectively equal to zero, that set of signals is said to be linearly dependent. A non-trivial linear combination is one in which not all of the mixing coefficients are equal to zero. If no such mixture exists, the signals are said to be linearly independent. Linear independence is a requirement for, but not equivalent to, essential independence.

The correlation of two signals u and v (at zero time lag) is measured as the integral of the product of u and the conjugate of v. Two signals whose correlation is zero or close to zero are said to be uncorrelated or decorrelated. The power of the sum of two signals perfectly decorrelated at zero time lag equals the sum of the powers of the two signals.

Two signals are said to be coherent if one of them is a linearly filtered version of the other. The value of the coherence function between two signals ranges between 1.0 and 0.0, inclusive. de Sa, A.M.F.L.M., "A note on the sampling distribution of coherence estimate for the detection of periodic signals," *Signal Processing Letters, IEEE*, vol. 11, no. 3, pp. 323,325, March 2004. In theory, two signals that are mutually incoherent will have a coherence function value of zero, while two signals that are perfectly coherent will have a coherence function value of one. In practice, because of the presence of noise (in the system instruments, electronics, computers, etc.) the actual coherence values may vary somewhat. Appropriate statistical tests can be used to determine whether a calculated coherence value differs significantly from zero or one, and whether two calculated coherence values differ significantly from each other. We will use the term "incoherent" to describe two signals whose coherence value does not differ significantly from zero, and may also describe such signals as having "zero coherence." We will use the phrases "perfectly coherent" or "having unit coherence" to describe two signals whose coherence value does not differ significantly from one. Except where indicated otherwise, the term "coherent" applied to two signals means that those signals have a coherence function value significantly greater than zero. Except where clearly indicated otherwise, the term "significant" means "statistically significant."

The coherence of two signals u and v is measured as the mean over all frequencies f of the mean squared coherence function MSC(u, v, f), where MSC(u, v, f) is equal to the squared magnitude of the cross-power spectrum of u and v at f, divided by the product of the spectral powers of u and v at f. [See Kay, S. M. Modern Spectral Estimation. Englewood Cliffs, N.J.: Prentice-Hall, 1988, pp. 453-455.] It is worth noting that signal incoherence is a more stringent condition than perfect decorrelation at zero time lag. That is, two signals may be perfectly decorrelated at zero time lag, but not mutually incoherent. However, all pairs of mutually incoherent signals are perfectly decorrelated at all time lags.

The joint optimal image of a signal set (such as a set of reference signals) onto a designated signal (such as a data signal) is computed as the linear convolutive mixture of the signals in the signal set that minimizes the mean square error between that mixture and the designated signal. If the signal set is composed of only a single signal, the optimal image of that signal is computed as the linearly filtered version of the signal in the signal set that minimizes the error between that linearly filtered version and the designated signal. Note that this joint optimal mixture may be instantaneous. The joint optimal image is often just called the "optimal image", or simply 'the image."

The residue of the image of a signal set on a designated signal (often written as "the residue of . . . on . . . ") is computed as the designated signal minus the joint optimal image of the signal set on that designated signal. Thus, the sum of the image and residue equals the designated signal. The image and the residue of that image are uncorrelated, so the sum of their power equals the power of the designated signal. A residue is sometimes also referred to as a "residual".

Because every image of a signal set is a specific linear convolutive mixture of the signals in that set, any such image is fully specified by the coefficients of the convolution kernels with which members of the signal set are convolved to create the additive terms of the image. The kernel coefficients for a particular image of the signal set are sometimes called image coefficients, and the set of kernel coefficients that define a particular image is sometimes called the image coefficient set. More generally, the kernel coefficients of an arbitrary additive mixture of the signal set are sometimes called mixture coefficients, and the set of kernel coefficients that define an additive mixture is referred to as the mixture coefficient set.

If and only if all pairs of signals in a reference set, data set, and other signal set are incoherent, the set is said to be orthogonal. If a signal is incoherent with each member of a set of signals, the signal is said to be orthogonal with the set, and vice versa. If all members of a first set of signals are orthogonal with a second set, the first set and the second set are orthogonal.

To determine whether two signals are effectively orthogonal, we align them by optionally shifting one of them relative to the other so that the peak of their cross-correlation function occurs at zero lag, or time-aligning them by any other convenient criterion, and measure their coherence C (see above). We accept two signals as orthogonal if C is smaller than a specified context-dependent value such as 0.1, and fully coherent if C is greater than another context-dependent value such as 0.85.

If a set of N signals are not mutually orthogonal, they can be transformed into a set of M orthonormal basis signals (for $M \leq N$) that is both orthogonal and normalized, forming an M-dimensional signal space. Among other techniques, the well-known Gram-Schmidt Orthogonal Process (see, e.g., Golub, G. and C. van Loan, *Matrix Computations,* 1996, John Hopkins Press) can be used to generate the basis signals. This new set of signals resembles the old set (e.g., each member of the old set can be formed as a linear combination of the new signals).

As described below, there are advantages and disadvantages to orthogonalizing either or both the reference set and the data set. With the data set in particular, it must be noted that, in general, the basis signals in the orthogonalized data set are linear combinations of the original data signals. If those data signals were chosen because of extraneous properties, those properties might not apply to the orthogonalized signals. In other words, it is the set that is orthogonalized, not the individual signals in the set.

By way of example, if the data set represents the response of microphones in an acoustic environment, each microphone records the acoustic field at a particular location. If those signals are orthogonalized, the new signals do not, in general, represent the acoustic field in any physical location.

Two signals are said to be statistically independent at first order (i.e., considering only the relationship between single data values rather than pairs, triplets, etc.) if the values of one signal provide no information about the values of the other signal. Various measures of statistical independence are in common use. For instance, the mutual information MI between two signals is a convenient measure of their statistical dependence, so the value I equal to one minus the mutual information between the two signals, normalized by the maximum of the two signals marginal entropy, can be used as a numerical measure of their statistical independence (see Cover & Thomas, Elements of Information Theory, Wiley, 1991, p. 18ff). We accept two signals as independent if I is greater than a specified context-dependent value such as 0.8.

Measures of higher orders of statistical independence can be defined in a similar manner by comparing the marginal and joint distributions of tuples of signal values.

Two signals are said to be source (or location) independent if they are incoherent and if the characteristics of the first signal are consistent with that signal being the image of a source located at a particular location in space, while the characteristics of the second signal are consistent with that signal being the image of a different source, located at a distinctly different location in space than the first source. By way of example, in a delay space model of the propagation paths of signals with a finite propagation velocity, two source independent signals will be incoherent and have propagation delays consistent with being located in two different locations in delay space.

Two signals are said to be essentially independent if the two signals are incoherent and also satisfy some more stringent condition, such as statistical independence of a particular order, or source independence.

Two sets of signals are mutually essentially independent if each signal in the first set is essentially independent of each signal in the second set.

It is worth noting that essential independence, including statistical independence, is a more stringent condition than incoherence. That is, two signals may be mutually incoherent but still not essentially independent. However, all essentially independent signals are mutually incoherent.

Essential independence is different from, and a more stringent condition than, linear independence. All essentially independent signals are linearly independent, but not all linearly independent signals are essentially independent. In the discussion below, if the terms "independent" or "independence" is used without qualification, "essentially independent" or "essential independence" is generally intended. When "linearly independent" or "linear independence" is intended, the modifiers "linearly" or "linear" will always be used. In the phrase "independent signal term" (abbreviated "IST") "independent" means "essentially independent" (for example, statistically independent).

It is useful to introduce the general concept of the quality of partition (or partition quality) between two arbitrary signals. The more similar two signals are, the less well they are partitioned. The less similar they are, the better they are partitioned. The partition quality between two signals can be objectively measured, and reported as a "QoP" real value which ranges between zero and one. Two identical signals have a QoP value of zero. Two fully partitioned signals have a QoP value of one.

Commonly, the partition quality of two signals is interpreted as the degree of essential independence (such as statistical independence) of those signals, and a standard measure of statistical independence (such as the mutual information-based measure given above) is employed as the QoP value. Measures of essential independence other than mutual information can be used to measure quality of partition. For example, source independence can be used to measure the quality of partition. However, statistical independence is often a particularly felicitous choice for quality of partition, because tests for statistical independence are generally sensitive to the presence of a common component in two mixtures, even when the two mixtures are themselves orthogonal (incoherent).

A reference set as a whole, and each distinct non-empty subset of that reference set, is said to constitute a support set that can be used to decompose any data signal into an image of the support set on the data signal, and a residue equal to the data signal minus the image. Thus each reference signal is itself a support set. Both the image and the residue are themselves signals, and may be mixtures. Commonly, the residue of a decomposition may itself be a linear mixture, and may be further decomposed using the techniques described herein. The image may also be a mixture subject to further decomposition.

In particular, if there are more than one mutually independent subsets of reference signals in the support set, the image of the support set on the data signal may be a mixture of reference components, each reference component being the image of one of the mutually independent subsets on the data signal.

Depending upon the signals comprising the support set and the data signal, either the image or the residue may be effectively equal to the data signal itself. If the image is effectively equal to the data signal, we say that the decomposition of the Data Signal supported by that support set is inclusive. (In this case, the residue will be effectively zero.) If the residue is effectively equal to the data signal, we say that the decomposition of the data signal supported by that support set is exclusive. (In this case, the image will be effectively zero.) The decomposition of a reference set or signal on a data signal will be exclusive if and only if the reference set or signal is orthogonal to the data signal. Alternatively, neither the image nor the residue may be effectively equal to the data signal, in which case the decomposition is neither inclusive nor exclusive.

It is useful to measure the partition quality of image and residue pairs. If either the image or residue is effectively zero, and the other signal is not, their QoP is one. If the image and residue of a non-inclusive, non-exclusive decomposition have a QoP value effectively equal to one, then the decomposition of the data signal by that support set is a partitioning decomposition; otherwise, it is a blurring decomposition. The partition quality of a signal or set of signals onto a data signal is equal to the QoP of the image and residue of that signal or set onto that data signal.

It is worth noting that any image and its residue are incoherent, regardless of whether the decomposition that formed those signals is partitioning or not. In other words, all decompositions of a data signal into an image and a residue create an incoherent image-residue pair, but not all image-residue pairs are independent.

The image and residue of a partitioning decomposition of a data signal are ISTs of the data signal. We call the support set of that decomposition a partitioning reference set for that data signal. If an individual signal generates a partitioning decomposition of a data signal, we call that signal a partitioning signal for that data signal. If the partitioning signal is a reference signal, we call it a partitioning reference signal. If a support set generates a partitioning decomposition of a data signal, we call that support set a partitioning support set.

The concepts of inclusive, exclusive, blurring, and partitioning decompositions can be extended from individual data signals to sets of data signals. A support set that generates an inclusive decomposition on all of the data signals in a set of data signals is said to be an inclusive support set for that data set. A support set that generates an exclusive decomposition of all of the data signals in a set of data signals is said to be an exclusive support set for that data set. A support set that generates a blurring decomposition for any of the data signals in a set of data signals is said to be a blurring support set for that data set. A support set that is neither inclusive, exclusive, or blurring for a set of data signals is said to be a partitioning support set for that set of data signals. The decompositions of the data signals in a set of data signals generated by a partitioning support set will always include at least one partitioning decomposition, or both an inclusive decomposition of at least one data signal and an exclusive decomposition of at least one other data signal in the set.

The image of a support set onto a designated signal (such as a data signal) is computed as the linear convolutive mixture of the signals in the support set that minimizes the mean square error between that mixture and the designated signal. Note that this optimal mixture may be instantaneous. The residue of a support set on a designated signal is computed as the designated signal minus the image of the support set on that designated signal, so the sum of the image and residue equals the designated signal. The image and the residue are uncorrelated, so the sum of their powers equals the power of the designated signal.

If the signals in a reference set are mutually orthogonal, the set of images of each reference signal in the set on any designated signal will be mutually orthogonal, and the sum of the powers of those images will be equal to the power of the sum of the images. This is true even if some of the reference signals are incoherent with the designated signal, because the power of images of incoherent reference Signals on the designated signal will be effectively zero. Furthermore, the power of the sum of the images will be equal to the power of the joint image of the reference set on the designated signal, and this power is equal to the power of the mixture minus the power of the residue of that joint image. Note, however, that the mutual orthogonality of the individual reference signal images onto a designated signal does not guarantee that those images are ISTs of the designated signal—that is, that the reference signals are partitioning signals for the designated signal.

If a signal is composed of an unweighted sum of independent terms (ISTs), for any first IST of that signal, its residue (that is, the signal minus the IST) is a second IST of the signal. It may be that either of those ISTs may be further decomposed into additional independent ISTs called sub-ISTs. The residue of a sub-IST of an IST (that is, the IST minus any sub-IST) is also a sub-IST.

As a signal is decomposed, using a set of reference signals, into independent ISTs, that signal and each of its ISTs can have associated with it a base set of reference signals. The base set of a signal is the minimal subset of the reference set for which some linear mixture of the reference signals in the base set is identical to the signal. It is worth noting that:

- all members of the base set of a signal are members of the reference set;
- the base set of an image is the support set of the partitioning decomposition that produced the image;
- the base set of an IST includes the union of the base sets of all identified sub-ISTs of that IST;
- the base set of a signal includes the union of the base sets of the image-residue pair of any partitioning decomposition of that signal; and
- the base sets of mutual sub-ISTs of an IST are disjoint. That is, any reference signal that is a member of the base set of an IST is a member of the base set of no more than one sub-IST of the IST.

Figure 4A:
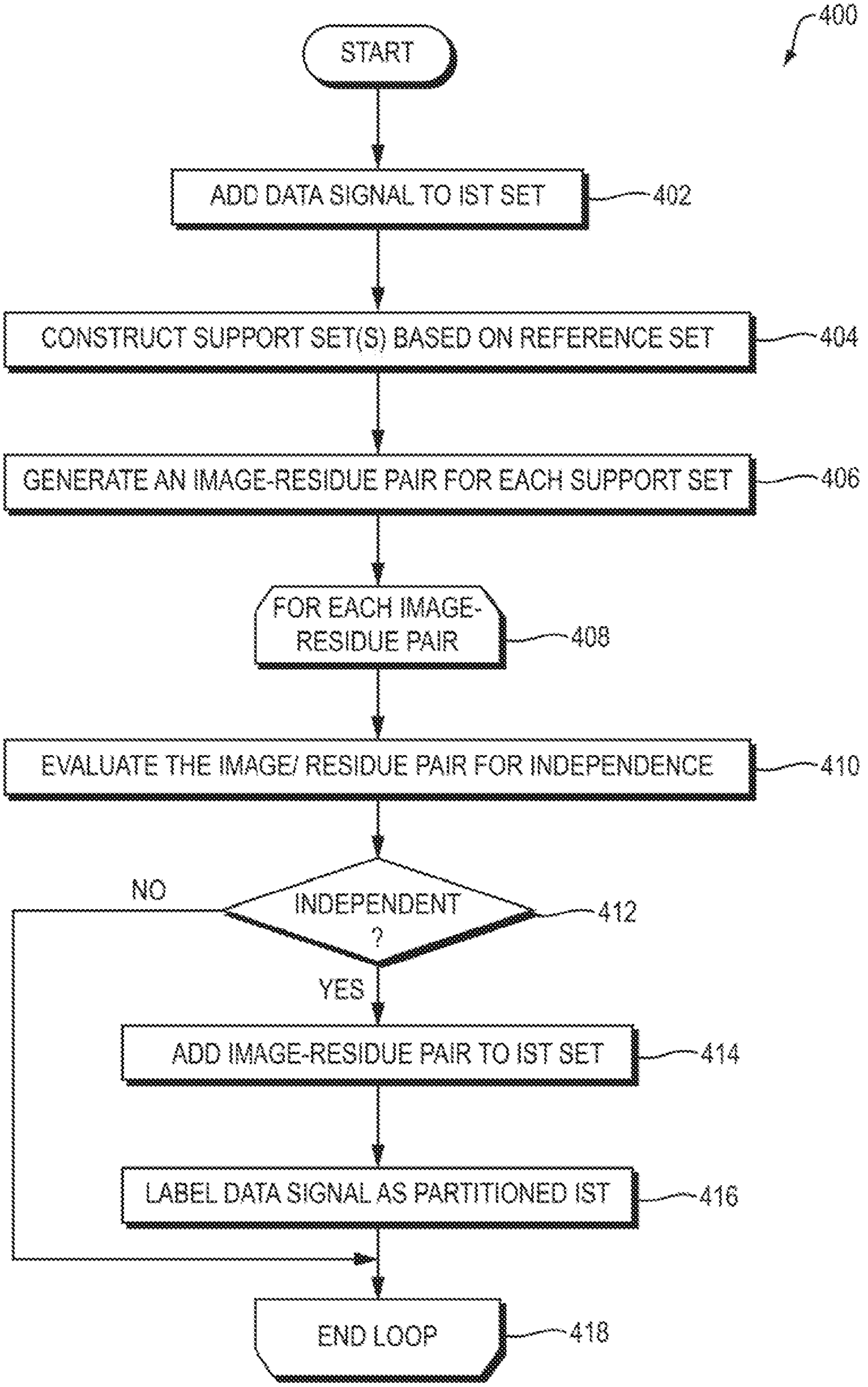
FIGS. 4A-4B are flowcharts of methods performed by the system of FIG. 3 according to one embodiment of the present invention.
Figure 4B:
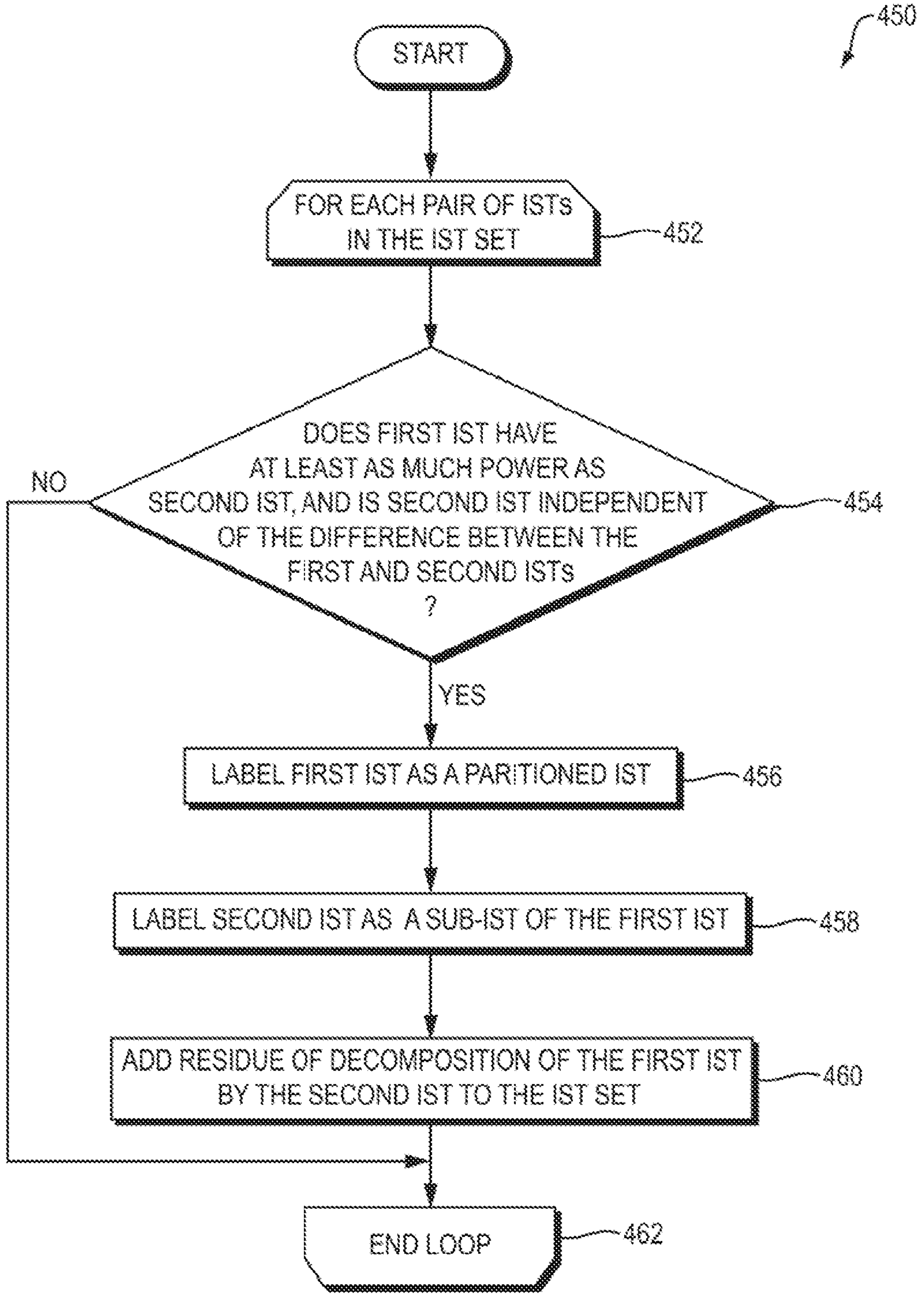
Figure 4C:
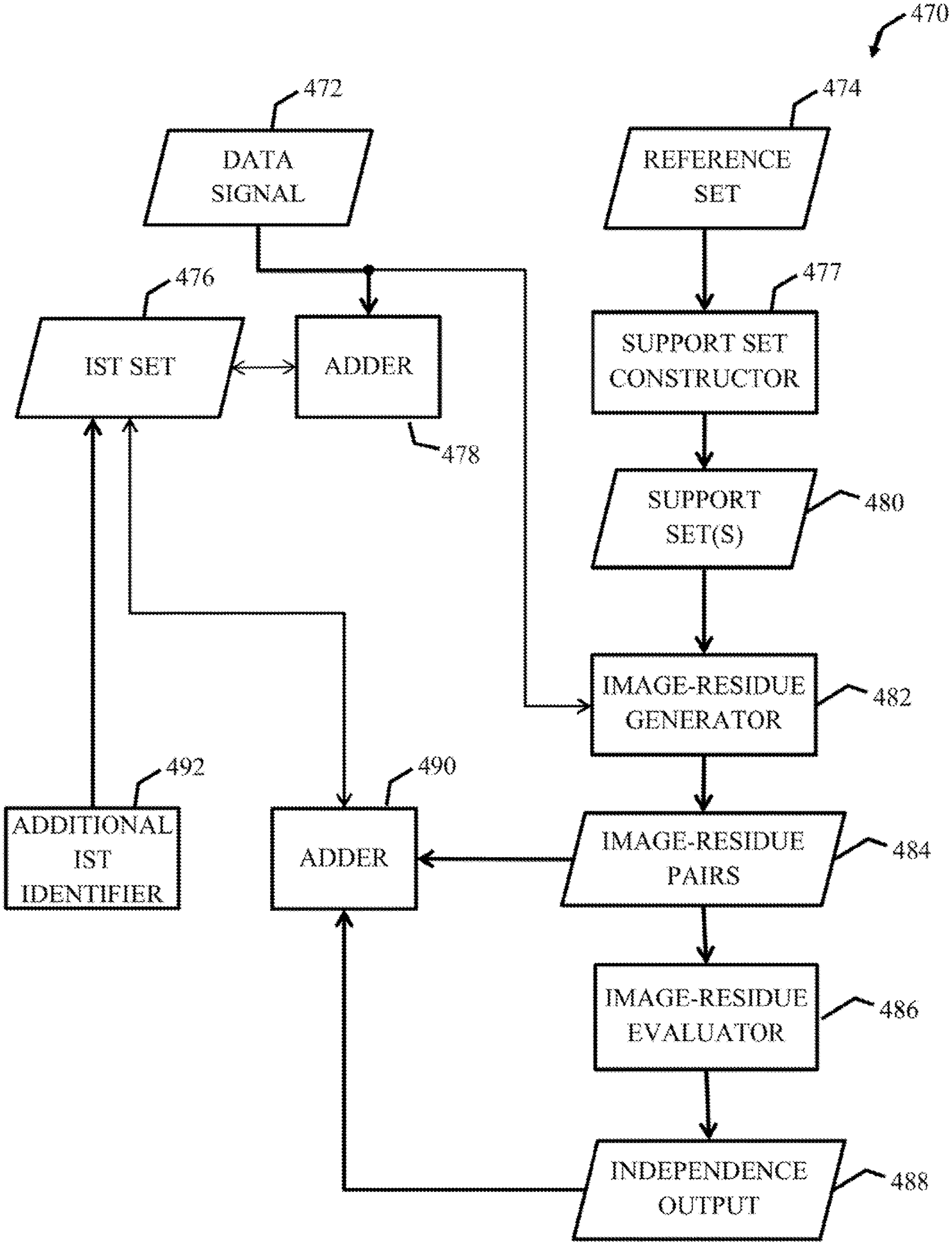
FIG. 4C is a dataflow diagram of a system for identifying independent signal terms (ISTs) of a data signal, given the data signal and a reference set, according to one embodiment of the present invention.

Referring to FIG. 4C, a dataflow diagram is shown of a system 470 for identifying ISTs of a data signal 472, given the data signal 472 and a reference set 474, according to one embodiment of the present invention. Referring to FIG. 4A, a flowchart is shown of a method 400 performed by the system 300 of FIG. 4C according to one embodiment of the present invention.

The ISTs identified by the system 470 and method 400 of FIGS. 4C and 4A may be considered to be members of an IST set 476, which is associated with the data signal 472 and its reference set 474. Not every data signal/reference set combination yields a non-trivial data set. The data signal 472 and the reference set 474 in FIG. 4C, for example, may or may not yield a non-trivial data set. For instance, if the data signal 472 is orthogonal to the reference set 474, then the reference set cannot be used to decompose the data signal 472, and the IST set 476, at the conclusion of the method 400, is just the data signal 472 itself. Likewise, if none of the support sets that can be formed from the reference set 474 partition the data signal, then the reference set 474 cannot be used to decompose the data signal 472, and the IST set 476, at the conclusion of the method 400, is just the data signal 472 itself.

The system 470 and method 400 may construct the IST set 476 as follows. Initially, the IST set 476 includes no members. Then an adder 478 adds the data signal 472 to the IST set 476, as a result of which the IST set 476 includes only the data signal 472 (FIG. 4A, operation 402).

The reference set 474 defines a set of possible support sets, that set consisting of the reference set 474 and all distinct non-empty subsets of the reference set 474. A support set constructor 477 constructs at least one support set 480 based on the reference set 474 (FIG. 4A, operation 404). The support set(s) 480 may, for example, be all possible support sets that may be constructed based on the reference set 474.

An image-residue generator 482 generates (e.g., computes), for each of the support set(s) 480, the image and residue defined by that support set on the data signal 472, by performing a decomposition of the data signal 472 based on that support set into the image and residue. The result is a set of one or more image-residue pairs 484, each of which corresponds to a distinct one of the support set(s) 480 (FIG. 4A, operation 406). For each of the image-residue pairs 484 (FIG. 4A, operations 408 and 418), an image-residue evaluator 486 evaluates the image/residence pair for independence (FIG. 4A, operation 410), thereby producing independence output 488 indicating, for each of the image-residue pairs 484, whether the image and residue in the image-residue pair are independent of each other. The evaluation of each of the image-residue pairs 484 for independence in operation 410 effectively determines whether the decomposition that produced that image-residue pair was a partitioning decomposition.

If the image-residue evaluator 486 determines that a particular image-residue pair is independent (i.e., if the decomposition that generated the image-residue pair is determined to be a partitioning decomposition) (FIG. 4A, operation 412), then an adder 490 adds that image-residue pair to the IST set 476 (FIG. 4A, operation 414), and labels the data signal 472 as a partitioned IST (FIG. 4A, operation 416).

The data signal 472 may be labeled as a partitioned IST in any of a variety of ways, such as by storing data (e.g., in the IST set 476), indicating that the data signal 472 is a partitioned IST. Although FIG. 4B shows the data signal 472 being labeled as a partitioned IST each time an image-residue pair is determined to be independent, this is not required. Alternatively, for example, the data signal 472 may be labeled as a partitioned IST only once, e.g., in response to the first time that an image-residue pair is determined to be independent.

In a second phase of processing, additional ISTs may be identified and added to the IST set 476 by iteratively identifying additional partitioning decompositions of the data signal 472 using ISTs that were previously identified, and which therefore are already in the IST set 476. More specifically, and referring now to the method 450 of FIG. 4B, an additional IST identifier 492 may enter a loop over each pair of ISTs in the IST set 476 (FIG. 4B, operation 452), where each such pair includes a first IST and a second IST, and determine, for each such pair of ISTs, whether: (i) the first IST has at least as much power as the second IST; and (ii) the second IST is independent of the difference between the first IST and the second IST (FIG. 4B, operation 454). If both conditions (i) and (ii) are satisfied for the pair of ISTs, then the additional IST identifier 492: (1) labels the first IST as a partitioned IST (FIG. 4B, operation 456); (2) labels the second IST as a sub-IST of the first IST (FIG. 4B, operation 458); and (3) adds a residue of the decomposition of the first IST by the second IST to the IST set 476 (FIG. 4B, operation 460). Note that the different between the first IST and the second IST is the residue of the decomposition of the first IST by the second IST.

The loop initiated in operation 452 may repeat any number of times (FIG. 4B, operation 462). As a result, the method 450 of FIG. 4B may cause any number of additional available ISTs to be identified and added to the IST set 476. Upon conclusion of the method 450 of FIG. 4B, every IST for which an image-residue pair, or sub-ISTs, have been identified will have been labeled a partitioned IST. Every IST in the IST set that is not labeled as a partitioned IST is considered to be labeled an irreducible IST.

Figure 5:
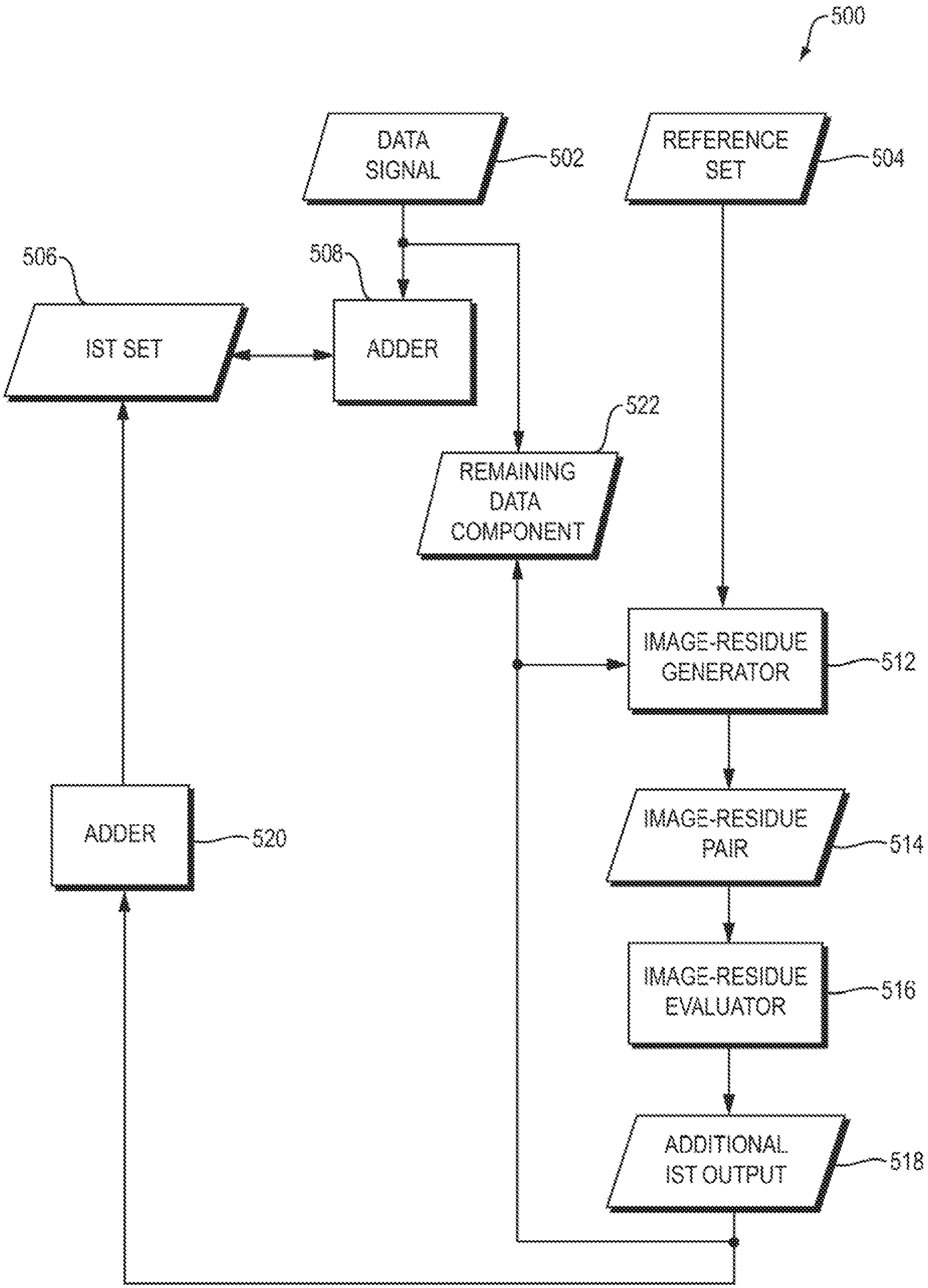
FIG. 5 is a dataflow diagram of a system for identifying independent additive ISTs of a data signal, given the data signal and a reference set, when all of the reference signals in the reference set are mutually orthogonal, according to one embodiment of the present invention.
Figure 6:
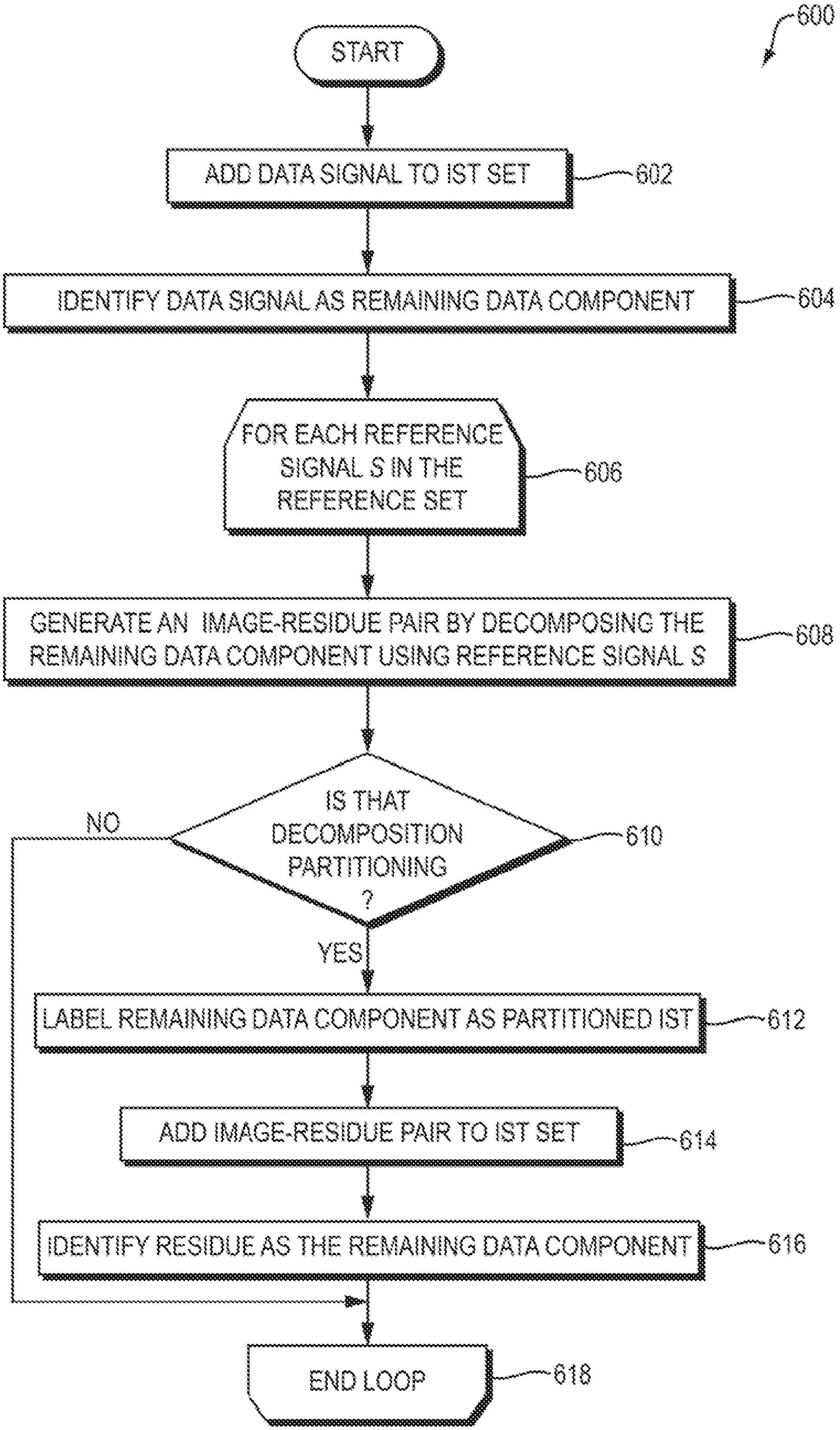
FIG. 6 is a flowchart of a method performed by the system of FIG. 5 according to one embodiment of the present invention.

If all of the reference signals in the reference set 474 are mutually independent, then an alternative method to the ones illustrated in FIGS. 3 and 4A-4B may be used to create the IST set for any data set. This alternative method is illustrated in FIGS. 5 and 6. More specifically, FIG. 5 is a dataflow diagram of a system 500 for identifying independent additive ISTs of a data signal 502, given the data signal 502 and a reference set 504, when all of the reference signals in the reference set 504 are mutually orthogonal, according to one embodiment of the present invention. Referring to FIG. 6, a flowchart is shown of a method 600 performed by the system 500 of FIG. 5 according to one embodiment of the present invention.

The system 500 and method 600 may construct the IST set 506 as follows. Initially, the IST set 506 includes no members. Then an adder 508 adds the data signal 502 to the IST set 506, as a result of which the IST set 506 includes only the data signal 502 (FIG. 6, operation 602). The method 600 identifies the data signal 502 as the "remaining data component" (FIG. 6, operation 604). The system 500 enters a loop over each reference signal S in the reference set 504 (FIG. 6, operation 606). An image-residue generator 512 generates (e.g., computes), the image and residue defined by reference signal S on the remaining data component, by performing a decomposition of the remaining data component based on reference signal S into the image and residue (FIG. 6, operation 608). The result is an image-residue pair 514 corresponding to the remaining data component.

An image-residue evaluator 516 determines whether the decomposition performed in operation 608 is a partitioning decomposition (FIG. 6, operation 610). If the image-residue evaluator 516 finds that it is, then: (1) the image-residue evaluator 516 labels the remaining data component as a partitioned IST (FIG. 6, operation 612); and (2) an adder 520 adds the image and residue in the image-residue pair 514 to the IST set 506, based on output 518 from the image-residue evaluator identifying the image-residue pair to add to the IST set 506 (FIG. 6, operation 614).

The method 600 identifies the residue in the image-residue pair 514 as the "remaining data component" (FIG. 6, operation 616). The method 600 loops over the remaining signals in the reference set 504 (FIG. 6, operation 618). When all of the signals in the reference set 504 have been processed by the system 500 and method 600, the IST set 506 is complete.

Additional processing may be performed on an IST set (such as the IST set 476 of FIG. 4C or the IST set 506 of FIG. 5) once the IST set has been generated. For example, referring to FIG. 7, a dataflow diagram is shown of a system 700 for identifying one or more irreducible decomposition sets of ISTs for at least one first IST in an IST set, such as the IST set 476 of FIG. 4C or the IST set 506 of FIG. 5, according to one embodiment of the present invention. Referring to FIG. 8, a flowchart is shown of a method 800 that is performed by the system 700 of FIG. 7 according to one embodiment of the present invention. The system 700 and method 800 may be applied, for example, after the system 470 and method 400 of FIGS. 3A-4C have been applied, or after the system 500 and method 600 of FIGS. 5-6 have been applied.

Figure 7:
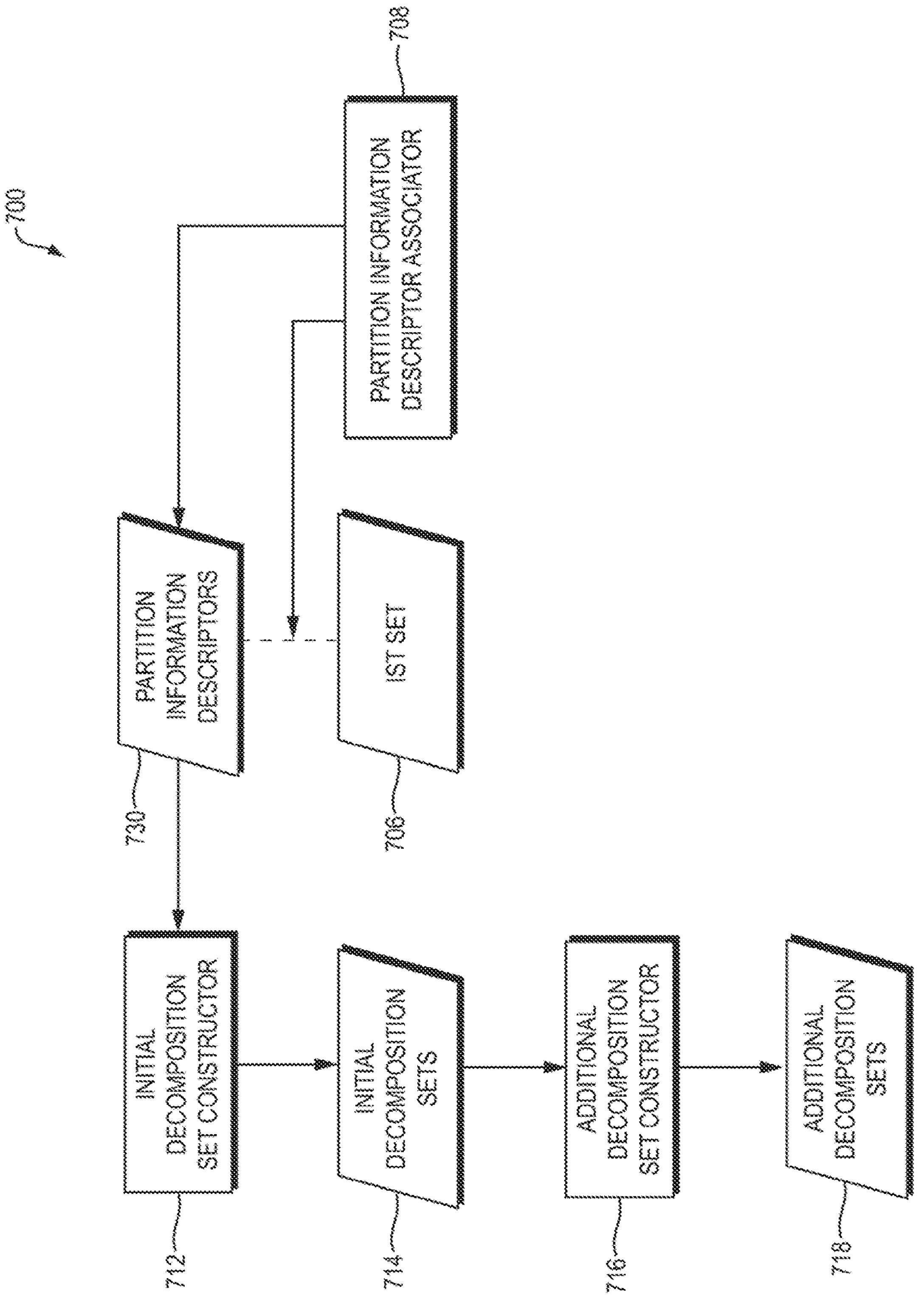
FIG. 7 is a dataflow diagram of a system for identifying one or more irreducible decomposition sets of ISTs for at least one first IST in an IST set, according to one embodiment of the present invention.
Figure 8:
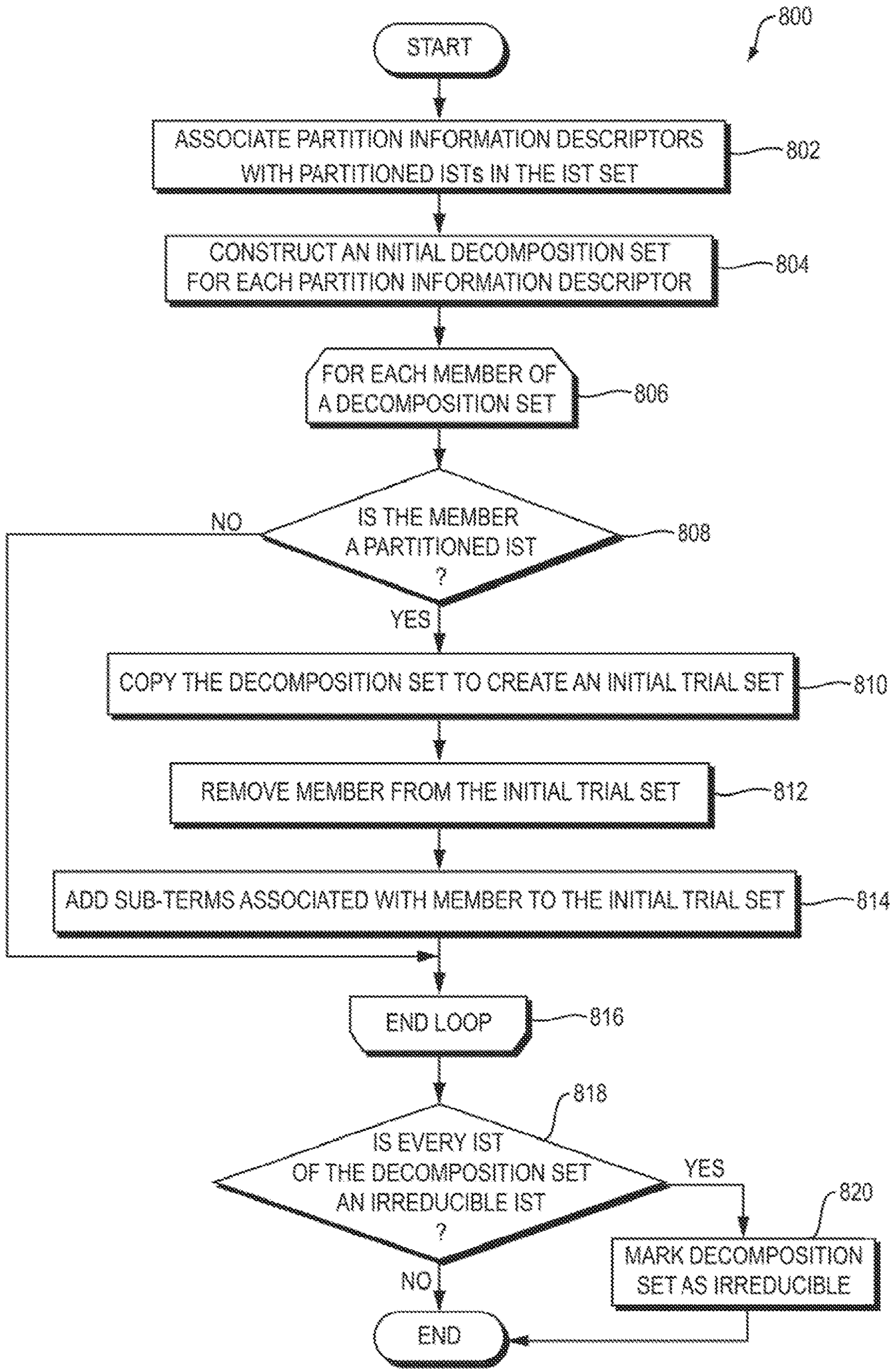
FIG. 8 is a flowchart of a method that is performed by the system of FIG. 7 according to one embodiment of the present invention.

In general, the system 700 and method 800 of FIGS. 7 and 8 augment the systems and methods of FIGS. 3-6 to identify decomposition sets for one or more of the ISTs in the IST set (e.g., the IST set 476 or the IST set 506), including the data signal itself (e.g., the data signal 302 or the data signal 502). Each decomposition set is associated with an IST in an IST set. An IST may have more than one decomposition set associated with it. In general, a decomposition set is a set of ISTs (in an IST set) which, when added together, equal the IST the IST set is associated with. Note that only partitioned ISTs have non-empty decomposition sets associated with them.

Referring to FIG. 7, the system 700 includes an IST set 706. As described in more detail below, the system 700 and method 800 of FIGS. 7 and 8 may be integrated with the system 300 and method 400 of FIGS. 3 and 4, or the system 500 and method 600 of FIGS. 5 and 6. The method 800 associates, with each of one or more partitioned ISTs in the IST set 706, a corresponding partition information descriptor (FIG. 8, operation 802). A partition information descriptor (also referred to herein as "partition information") may be any data that identifies a partitioning decomposition of a corresponding partitioned IST. The partition information descriptor specifies the image and residue, or the sub-terms, into which the corresponding partitioned IST can be decomposed. A partition information descriptor may be "associated" with a corresponding partitioned IST in any of a variety of ways, such as by storing data representing an association between the partition information descriptor and the corresponding partitioned IST.

The method 800 of FIG. 8 may associate the partition information descriptor with the corresponding partitioned IST during the construction of the IST set in the methods 400 or 600 in response to such methods identifying a partitioning decomposition of the IST into: (1) an image and residue, or (2) a pair of sub-terms (e.g., in response to operation 412 in method 400 or in response to operation 610 in method 600).

Upon completion of the construction of the IST set 706 (e.g., after the completion of method 400 in FIG. 4 or the completion of method 600 in FIG. 6), an initial decomposition set constructor 712 constructs an initial decomposition set for each partition information descriptor associated with an IST in the IST set 706, thereby producing one or more initial decomposition sets 714 (FIG. 8, operation 804). The members of each of the initial decomposition sets 714 are the sub-terms specified in the corresponding partition information descriptor.

An additional decomposition set constructor 716 may iteratively construct one or more additional decomposition sets 718, based on an existing decomposition set (e.g., one of the initial decomposition sets 714), by scanning each of the members of the existing decomposition set. Recall that these members are also members of the IST set 706. For example, assume that the method 800 enters a loop over each member of a particular one of the initial decomposition sets 714 (FIG. 8, operation 806). When the additional decomposition set constructor 716 finds an IST that is a partitioned IST (FIG. 8, operation 808), the additional decomposition set constructor 716 constructs a trial set by: (1) copying the decomposition set to create an initial trial set (FIG. 8, operation 810); (2) removing the member (i.e., identified partitioned IST) from that trial set (FIG. 8, operation 812); and (3) adding the sub-ISTs identified by a partition information descriptor associated with the member (i.e., the just-removed partitioned IST) into the trial set, thereby producing the final value of the trial set (FIG. 8, operation 814). This trial set is a valid decomposition set for the IST associated with the existing decomposition set. If the trial set is not identical to a decomposition set already associated with that IST, then the method associates the trial set with that IST (such as by storing data representing an association between the trial set and the IST).

The method 800 determines whether every IST of the new decomposition set is an irreducible IST (FIG. 8, operation 818). If so, then the method 800 marks the new decomposition set as an irreducible decomposition set (FIG. 8, operation 820). Otherwise, the method 800 does not mark the new decomposition set as an irreducible decomposition set. Operations 808-814 may be repeated for all members of the decomposition set (FIG. 8, operation 816), potentially creating one new decomposition set for every member of the decomposition set being scanned that is a partitioned IST. Although not shown in FIG. 8, the loop represented by operations 806-820 may be applied iteratively to a plurality of decomposition sets, e.g., until all existing decomposition sets have been scanned without identifying any new decomposition sets.

Any of the methods disclosed herein for generating IST sets (such as the methods 400 and 600 of FIGS. 4 and 6, respectively), may be augmented to identify a base set for each of one or more of the ISTs in the IST set, including the data signal itself (e.g., the data signal 472 in FIG. 4C or the data signal 502 in FIG. 5). A base set is associated with a corresponding IST in the IST set, and is defined as the minimal subset of the reference set for which some linear mixture of the set members is the associated IST. Not all ISTs have non-empty base sets. For example, if an IST is only a residue of a partitioning decomposition, then that IST may be orthogonal to all of the signals in the reference set.

Each non-empty base set may or may not be a coherent base set. A coherent base set is a base set of an IST for which no linear mixture of the set members exists that is orthogonal to (incoherent with) that IST. Only non-empty base sets can be coherent.

Figure 9:
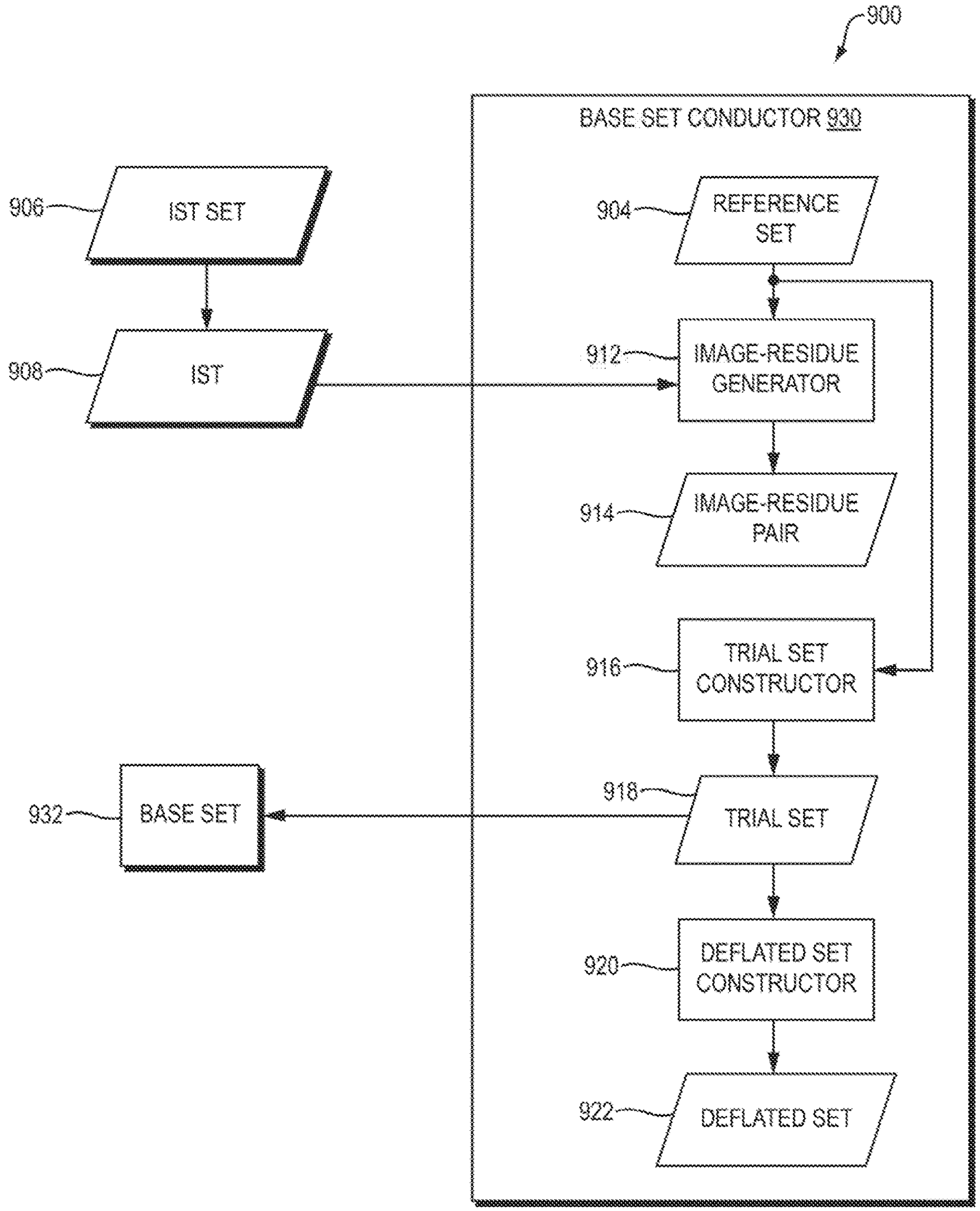
FIG. 9 is a dataflow diagram of a system for identifying one or more base sets for one or more ISTs in an IST set, according to one embodiment of the present invention.
Figure 10:
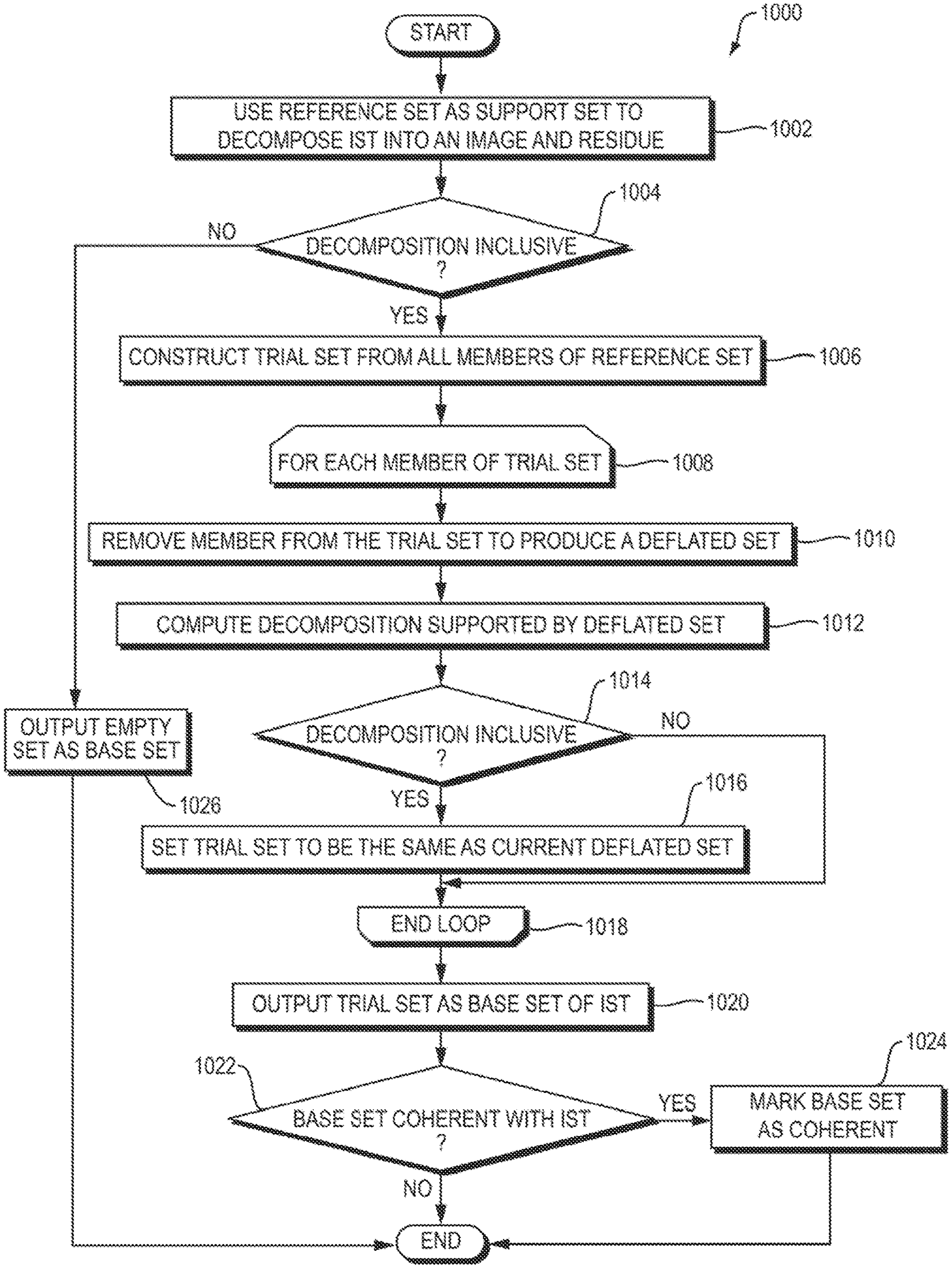
FIG. 10 is a flowchart of a method that is performed by the system of FIG. 9 according to one embodiment of the present invention.

For example, referring to FIG. 9, a dataflow diagram is shown of a system 900 for identifying one or more base sets for one or more ISTs in an IST set, according to one embodiment of the present invention. Referring to FIG. 10, a flowchart is shown of a method 1000 that is performed by the system 900 of FIG. 9 according to one embodiment of the present invention. The system 900 and method 1000 may be applied, for example, after the system 300 and method 400 of FIGS. 3-4 have been applied, or after the system 500 and method 600 of FIGS. 5-6 have been applied.

In general, the system 900 and method 1000 may use a base set constructor 930 to construct a base set 932 for a corresponding IST 908 in an IST set 906 (which may, for example, be the IST set 476 of FIG. 4C or the IST set 506 of FIG. 5). Although only the single IST 908 and corresponding base set 932 are shown in FIG. 9, the base set constructor 930 may construct base sets 932 corresponding to any number of ISTs in the IST set 906 (e.g., all of the ISTs in the IST set 906).

An image-residue generator 912 uses the reference set 904 (which may, for example, be the reference set 474 of FIG. 4C or the reference set 504 of FIG. 5) as a support set to generate (e.g., compute) an image and residue pair 914 defined by that support set (i.e., reference set 904) on the IST 908, by performing a decomposition of the IST 908 based on that support set (i.e., reference set 904) into the image and residue 914 (FIG. 10, operation 1002). If the resulting decomposition is not inclusive, then the base set 932 for the IST 908 is the empty set, and is not coherent, in which case the base set constructor 930 outputs the empty set as the base set 932 (FIG. 10, operation 1026).

Otherwise, if the decomposition is inclusive, then a trial set constructor 916 constructs a trial set 918 containing all of the members of the reference set 904 (FIG. 10, operation 1006). A deflated set constructor 920 enters a loop over each member of the trial set 918 (FIG. 10, operation 1008). The deflated set constructor 920 scans the trial set 918, removing one reference signal from the trial set 918 at a time to produce a deflated set 922 (FIG. 10, operation 1010). The deflated set constructor 920 computes the decomposition supported by the deflated set 922 (FIG. 10, operation 1012). If that decomposition is inclusive (FIG. 10, operation 1014), then the members of the trial set 918 are set to be the same as those of the current deflated set 922 (FIG. 10, operation 1016), and scanning continues (FIG. 10, operation 1018). This deflation process continues until all the reference signals in the reference set 904 have been tested, and no signal in the trial set 918 can be removed from the trial set 918 without making the resulting decomposition non-inclusive.

The base set constructor 930 outputs the final trial set 918 (i.e., the trial set 918 after the result of operation 1012 is "no") as the base set 932 of the associated IST 908 (FIG. 10, operation 1020). Finally, if and only if all of the signals in the base set 932 are coherent with the corresponding IST 908 (FIG. 10, operation 1022), then the base set 932 is marked as coherent (FIG. 10, operation 1024).

Figure 11:
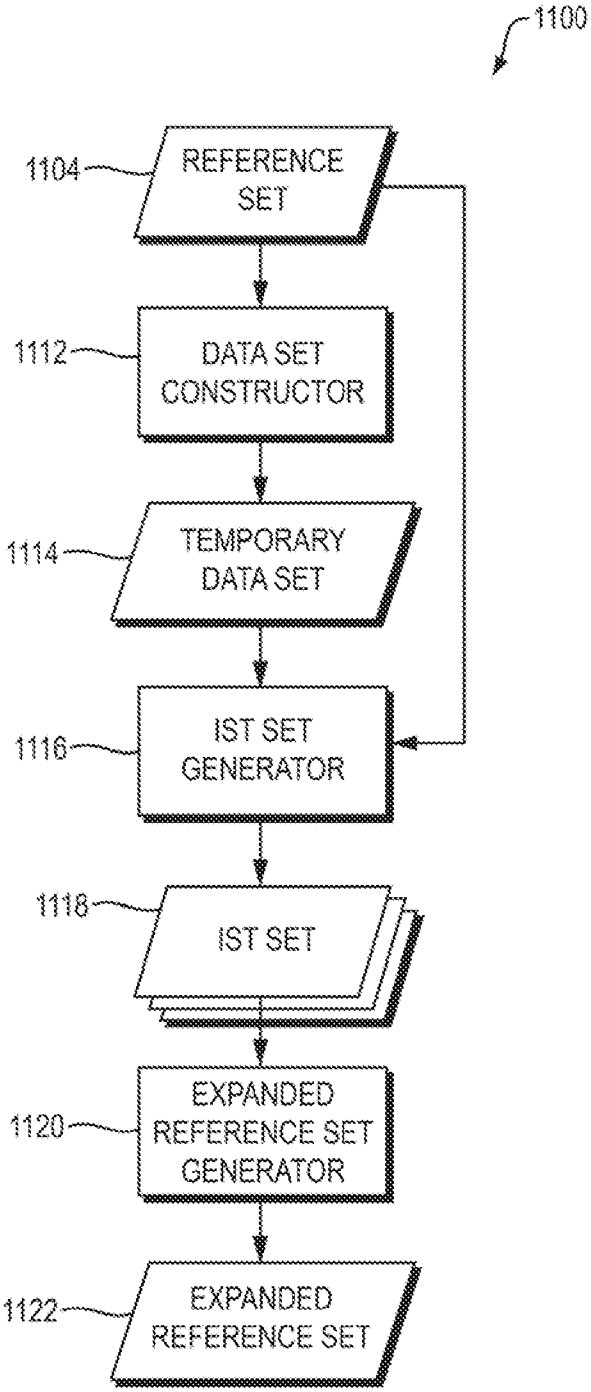
FIG. 11 is a dataflow diagram of a system for generating an expanded reference set for an arbitrary non-orthogonal reference set according to one embodiment of the present invention.

Embodiments of the present invention may be used advantageously to generate an expanded reference set from an arbitrary reference set by using signals in the reference set to decompose other signals, and by identifying members of the expanded reference set as all of the irreducible terms discovered through this decomposition of the reference set. Note that if all of the signals in a reference set are mutually orthogonal, the set is already maximally expanded. For non-orthogonal reference sets, the system 1100 of FIG. 11 and the method 1200 of FIG. 12 may be used to generate an expanded reference set from an arbitrary reference set.

Figure 12:
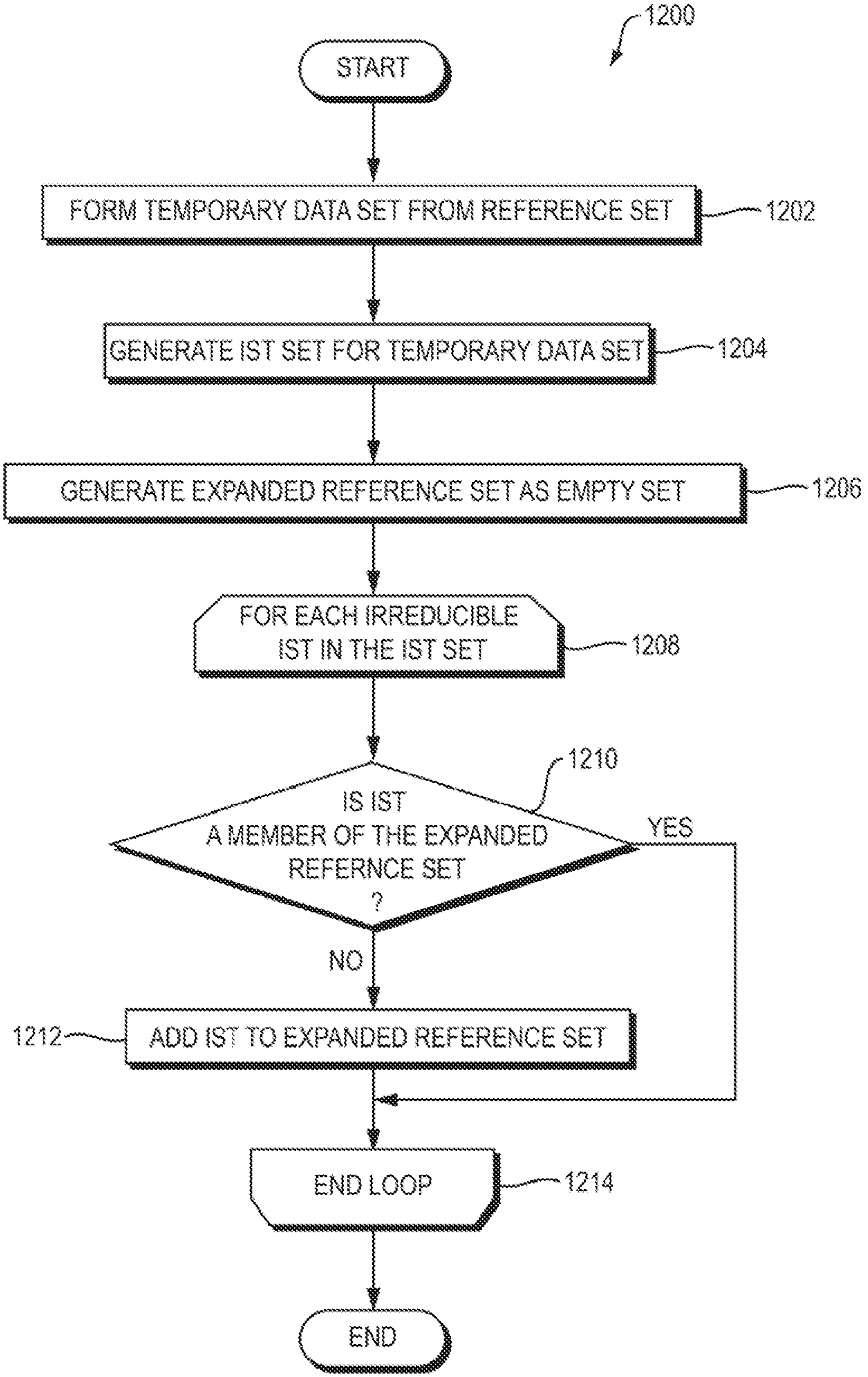
FIG. 12 is a flowchart of a method performed by the system of FIG. 11 according to one embodiment of the present invention.

A data set constructor 1112 forms a temporary data set 1114, whose members are all of the reference signals in a reference set 1104 (where the reference set may be any of the reference sets disclosed herein) (FIG. 12, operation 1202). An IST set generator 1116 generates a complete IST set 1118 for the temporary data set 1114 given the reference set 1104 (FIG. 12, operation 1204). More specifically, the IST set generator 1116 generates a plurality of IST sets, one for each data signal in the temporary data set 1114. The IST set 1118, therefore, includes that plurality of IST sets, or at least all of the members of that plurality of IST sets (which may be stored in a single set in the IST set 1118). An expanded reference set generator 1120 generates an expanded reference set 1122 as an empty set (FIG. 12, operation 1206).

The expanded reference set generator 1120 enters a loop over each irreducible IST in the IST set 1118 (FIG. 12, operation 1206). As mentioned above, the IST set 1118 may include IST members of a plurality of IST sets, one for each data signal in the temporary data set 1114. The expanded reference set generator 1120 determines whether that irreducible IST is a member of the expanded reference set 1122 (FIG. 12, operation 1208). If it is not, then the expanded reference set generator 1120 adds that irreducible IST to the expanded reference set 1122 (FIG. 12, operation 1210). Operations 1208 and 1210 are repeated for all remaining irreducible ISTs in the IST set 1118 (FIG. 12, operation 1212). The result of method 1200 is that the expanded reference set 1122 contains all of the irreducible ISTs from the IST set 1118.

Figure 13:
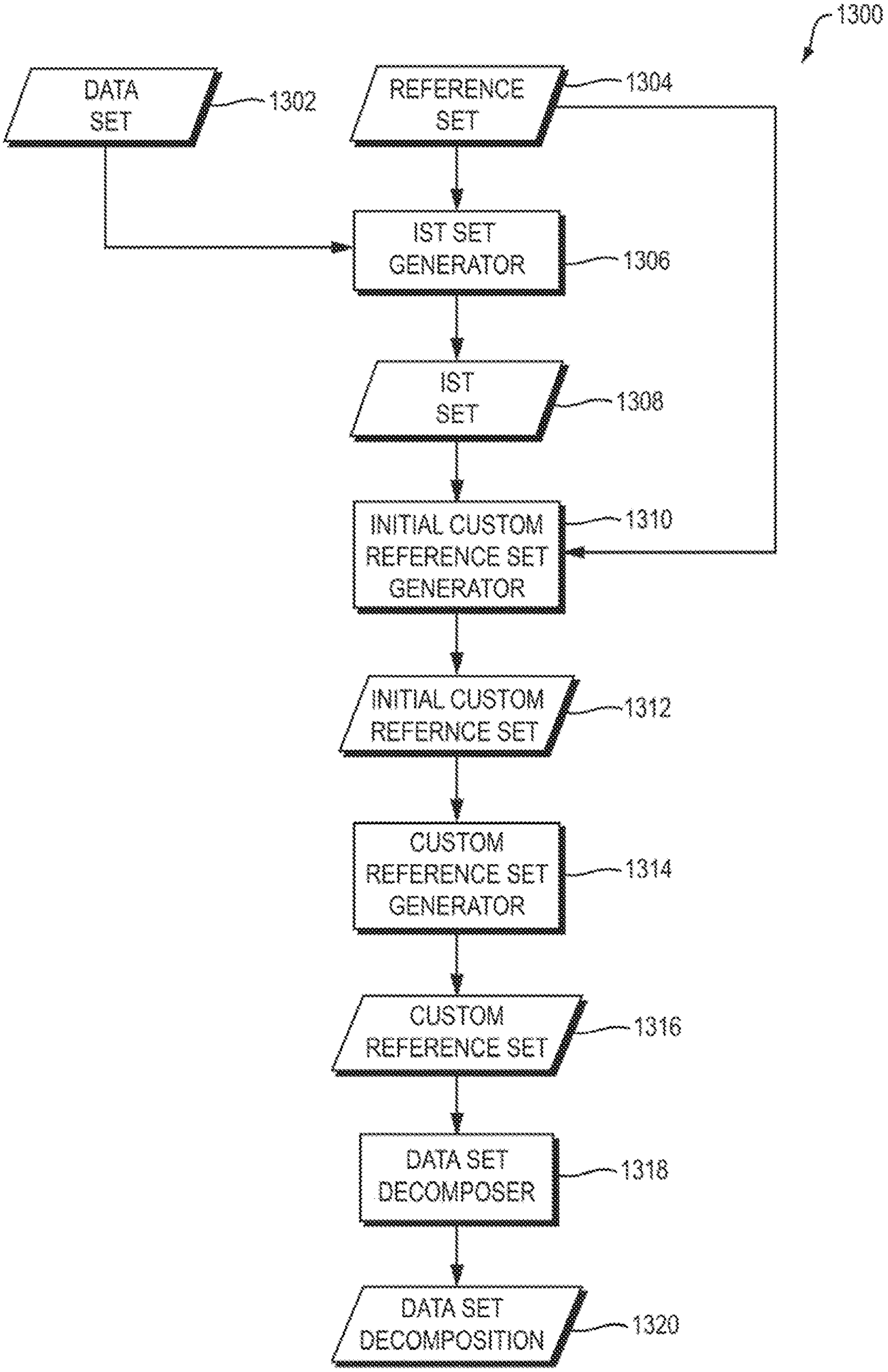
FIG. 13 is a dataflow diagram of a system for generating a custom reference set according to one embodiment of the present invention.
Figure 14:
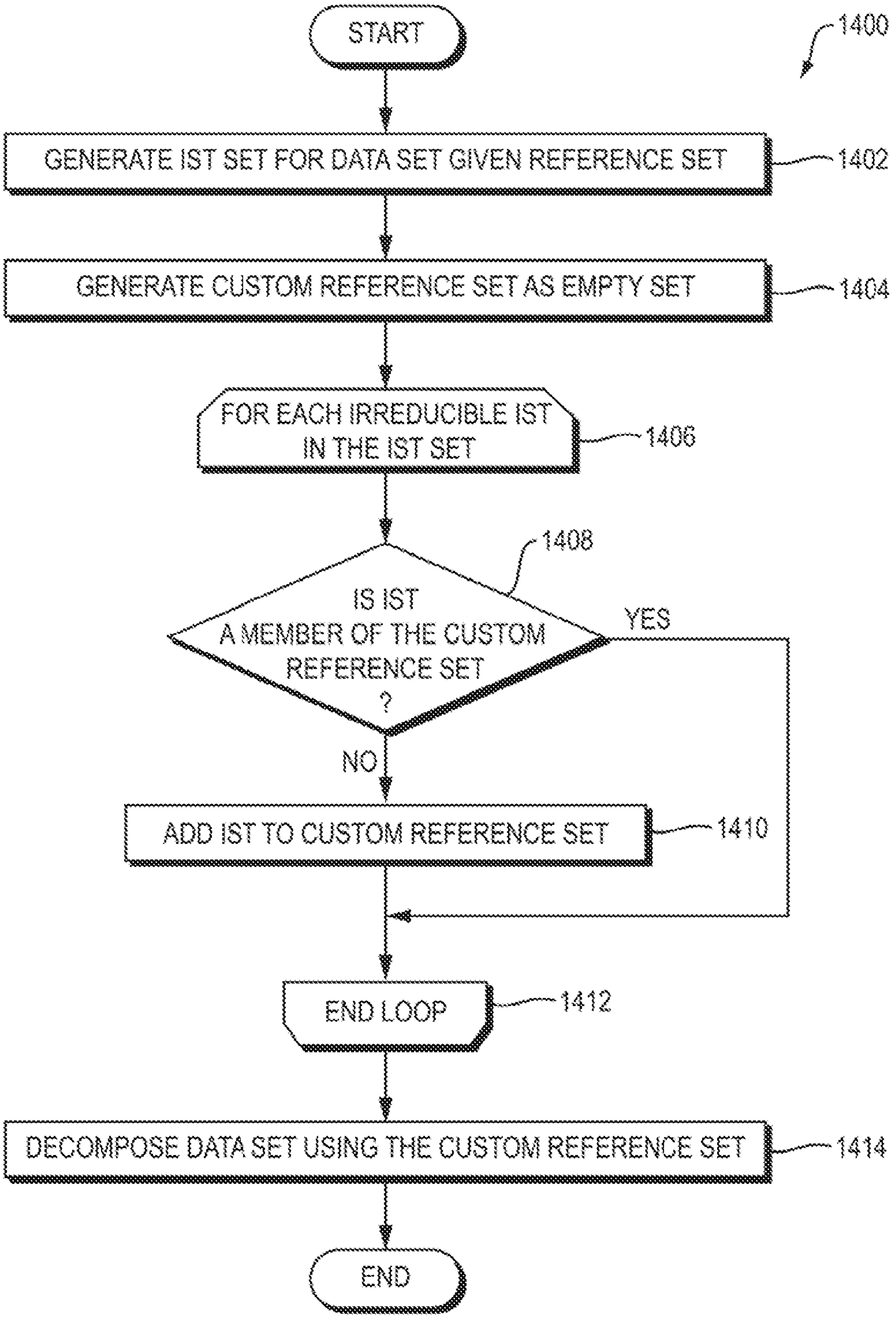
FIG. 14 is a flowchart of a method performed by the system of FIG. 13 according to one embodiment of the present invention.

Embodiments of the present invention may be used advantageously to generate a custom reference set for a particular data set from an initial reference set, by using signals in the initial reference set to decompose all of the data signals, and identifying members of the custom reference set as all of the irreducible ISTs of all of the IST sets for all of the signals in the data set. FIG. 13 shows a dataflow diagram of a system 1300 for generating such a custom reference set according to one embodiment of the present invention. FIG. 14 shows a flowchart of a method 1400 performed by the system 1300 of FIG. 13 according to one embodiment of the present invention.

An IST set generator 1306 generates an IST set 1308 for all of the data signals in a data set 1302 given a reference set 1304 (FIG. 14, operation 1402). More specifically, the IST set generator 1306 generates a plurality of IST sets, one for each data signal in the data set 1302. The IST set 1308, therefore, includes that plurality of IST sets, or at least all of the members of that plurality of IST sets (which may be stored in a single set in the IST set 1308). The reference set 1304 may be empty—that is, initially there may be no identified reference signals. An initial custom reference set generator 1310 generates an initial custom reference set 1312 as an empty set (FIG. 14, operation 1404).

The custom reference set generator 1314 enters a loop over each irreducible IST in the IST set 1308 (FIG. 14, operation 1406). As mentioned above, the IST set 1308 may include IST members of a plurality of IST sets, one for each data signal in the temporary data set 1114. The custom reference set generator 1314 determines whether that irreducible IST is a member of the custom reference set 1316 (which, initially, is the initial custom reference set 1312) (FIG. 14, operation 1408). If it is not, then the custom reference set generator 1314 adds that irreducible IST to the custom reference set 1316 (FIG. 14, operation 1410). Operations 1408 and 1410 are repeated for all remaining irreducible ISTs in the IST set 1308 (FIG. 14, operation 1412). The result of method 1400 is that the custom reference set 1316 contains all of the irreducible ISTs from the IST set 1308. Once the custom reference set has been created, a data set decomposer 1318 may advantageously use that custom reference set 1318 to decompose the data set 1302 from which the custom reference set 1316 was created into a decomposition 1320 (FIG. 14, operation 1414).

Figure 15:
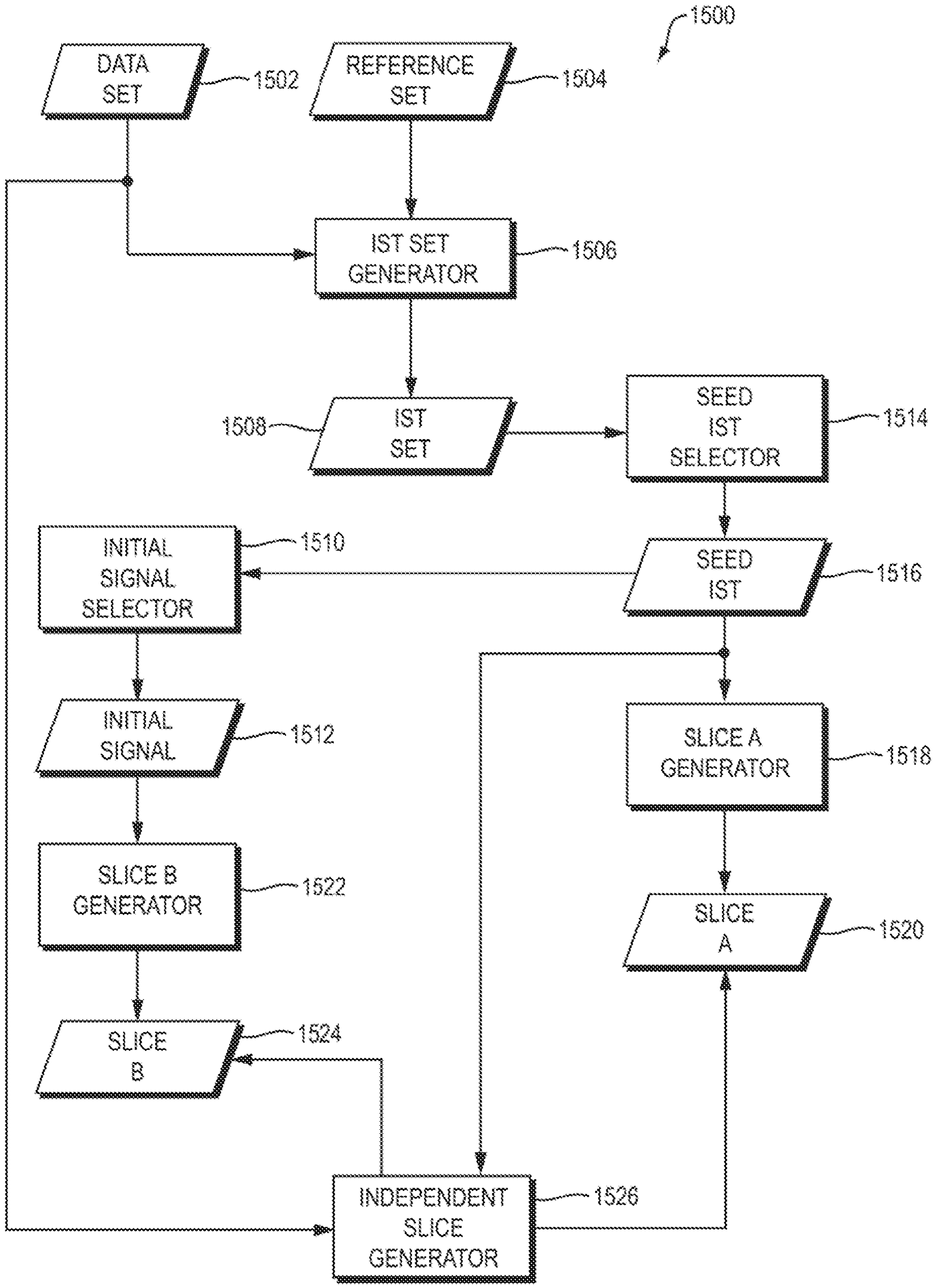
FIG. 15 is a dataflow diagram of a system for generating independent slices of data sets according to one embodiment of the present invention.
Figure 16A:
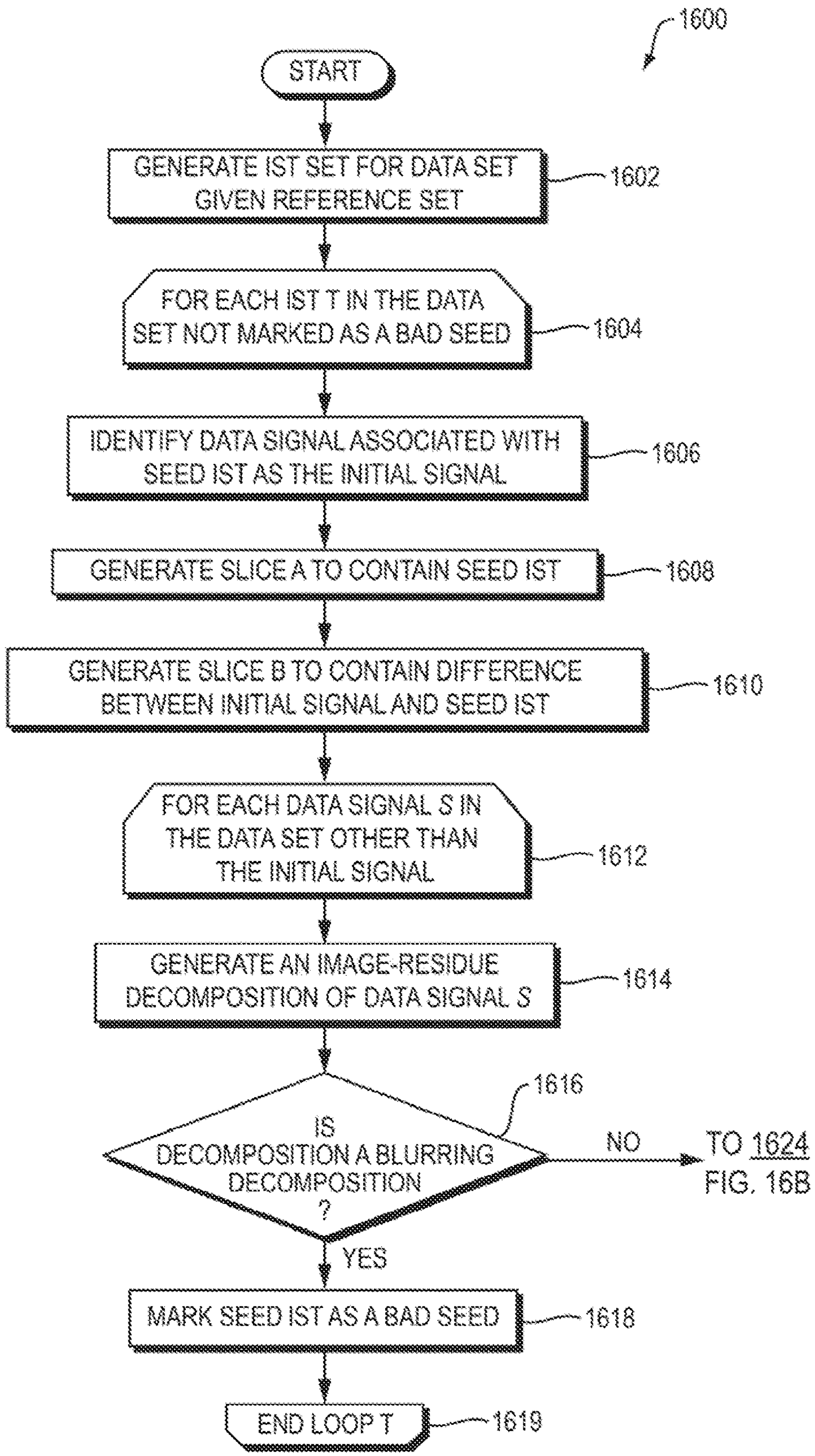
FIGS. 16A-16B are flowcharts of a method performed by the system of FIG. 15 according to one embodiment of the present invention.
Figure 16B:
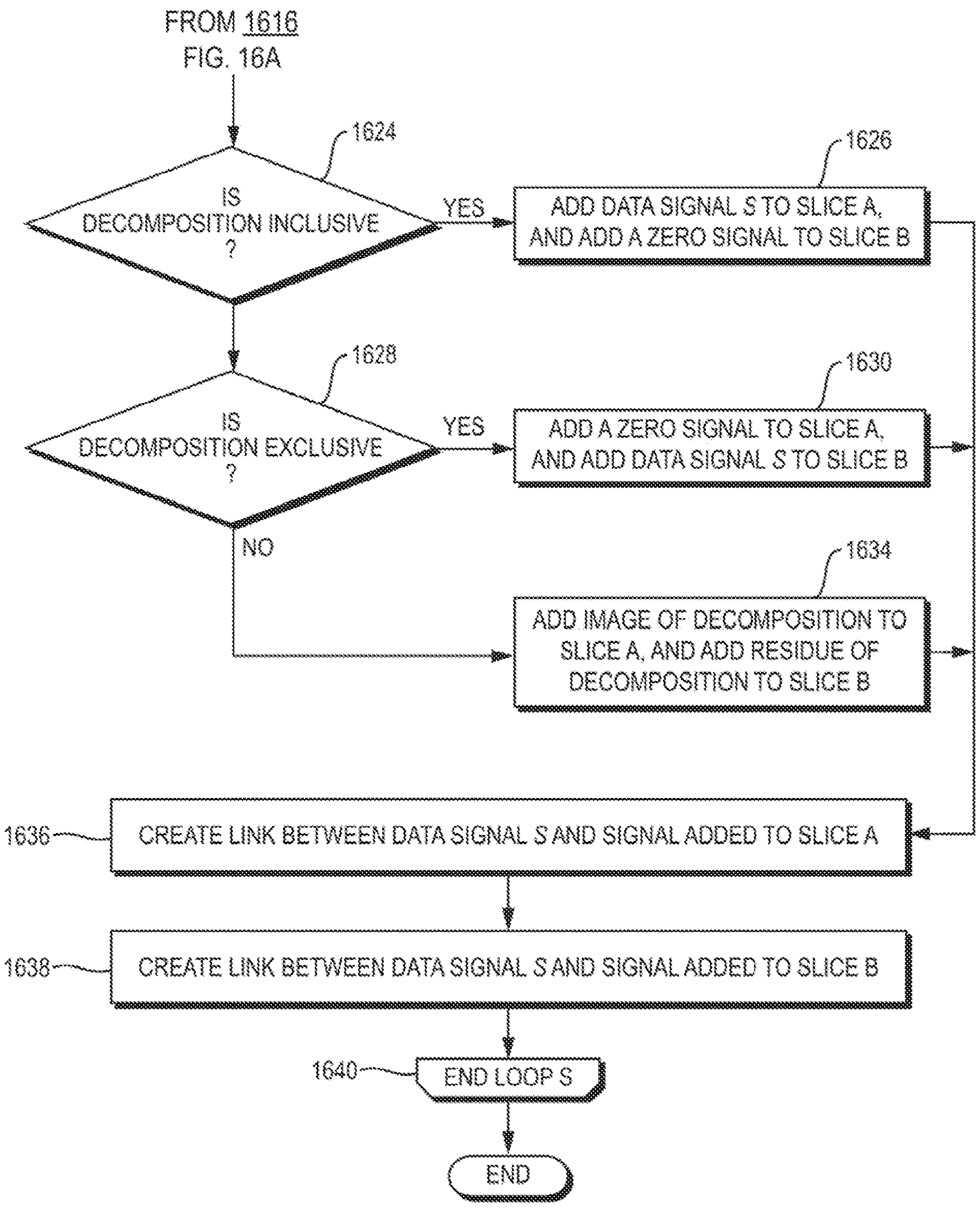

Referring to FIG. 15, a dataflow diagram is shown of a system 1500 for generating independent slices of data sets according to one embodiment of the present invention. Referring to FIGS. 16A-16B, flowcharts are shown of a method 1600 performed by the system 1500 of FIG. 15 according to one embodiment of the present invention.

An independent signal term (IST) generator 1506 generates an IST set 1508 for all of the data signals in a data set 1502 given a reference set 1504 (FIG. 16A, operation 1602). A seed IST selector 1514 enters a loop over all ISTs T in the data set 1502 which have not been marked as a "bad seed" (FIG. 16A, operation 1604). Any IST may be selected from the IST set 1508, in any order, as the seed IST. The current IST T is designated as a "seed IST." An initial signal selector 1510 selects a data signal associated with the seed IST 1516 as an initial signal 1512 (FIG. 16A, operation 1606).

A first slice generator 1518 generates a first slice 1520 (also referred to herein as "Slice A") containing the seed IST 1516 as its only member, and creates a link between that member and the initial signal 1512 (FIG. 16A, operation 1608). A second slice generator 1522 generates a second slice 1524 (also referred to herein as "Slice B") containing the difference between the initial signal 1512 and the seed IST 1516 as its only member, and creates a link between that member and the initial signal 1512 (FIG. 16A, operation 1610). The links generated in operations 1608 and 1610 may be implemented in any way, such as by data stored in a non-transitory computer-readable medium representing the link. The same is true of any link disclosed herein.

An independent slice generator 1526 enters a loop over each data signal S in the data set 1502, other than the initial signal 1512 (FIG. 16A, operation 1612). Treating slice A 1520 as a reference set, the independent slice generator 1526 generates an image-residue decomposition of data signal S (FIG. 16A, operation 1614).

The independent slice generator 1526 determines whether the decomposition performed in operation 1614 is a blurring decomposition (FIG. 16A, operation 1616). If it is, then no independent slice can be formed beginning with the seed IST 1516, in which case the current seed IST 1516 is marked as a "bad seed" (FIG. 16A, operation 1618), and the method 1600 continues to iterate over ISTs in the data set 1502 (FIG. 16A, operation 1619).

If the decomposition performed in operation 1614 is not a blurring composition, then the method 1600 continues to operation 1624 in FIG. 16B. If the decomposition performed in operation 1614 is inclusive (FIG. 16B, operation 1624), then the independent slice generator 1526 adds data signal S to slice A 1520, and adds a zero signal to slice B 1524 (FIG. 16B, operation 1626). If the decomposition performed in operation 1614 is exclusive (FIG. 16B, operation 1628), then the independent slice generator 1526 adds a zero signal to slice A 1520, and adds data signal S to slice B 1524 (FIG. 16B, operation 1630). If the decomposition performed in operation 1614 is not exclusive (FIG. 16B, operation 1628), then the decomposition performed in operation 1614 must be partitioning, and the independent slice generator 1526 adds the image of that decomposition to slice A 1520, and adds the residue of that decomposition to slice B 1524 (FIG. 16, operation 1634).

The independent slice generator 1526 creates a link between the signal that was just added to slice A 1520 (i.e., in operation 1626, 1630, or 1634) and data signal S (FIG. 16B, operation 1636). The independent slice generator 1526 creates a link between the signal that was just added to slice B 1524 (i.e., in operation 1626, 1630, or 1634) and data signal S (FIG. 16B, operation 1638). The method 1600 repeats operations 1606-1638 for the remaining data signals in the data set 1502 other than the initial signal 1512 (FIG. 16B, operation 1640). If none of the data signals S resulted in a blurring decomposition, then the method 1600 ends upon completion of operation 1640.

It may be advantageous to use the image of some reference signal selected from the reference set 1504 as the seed IST 1516 that guides the decomposition of the data set 1502 into independent slices (e.g., slices A 1520 and B 1524). After the initial decomposition of the data set 1502 into two independent slices 1520 and 1524 (e.g., after completion of the method 1600 of FIGS. 16A-16B), embodiments of the present invention may form additional slices (not shown) by iteratively decomposing either or both of the initial independent slices 1520 and 1524 further. To do so, embodiments of the present invention may treat any existing slice to be decomposed (e.g., slice 1520 or 1524) as a data set, and apply the method 1600 of FIGS. 16A-16B to decompose that data set into two further slices.

Figure 17:
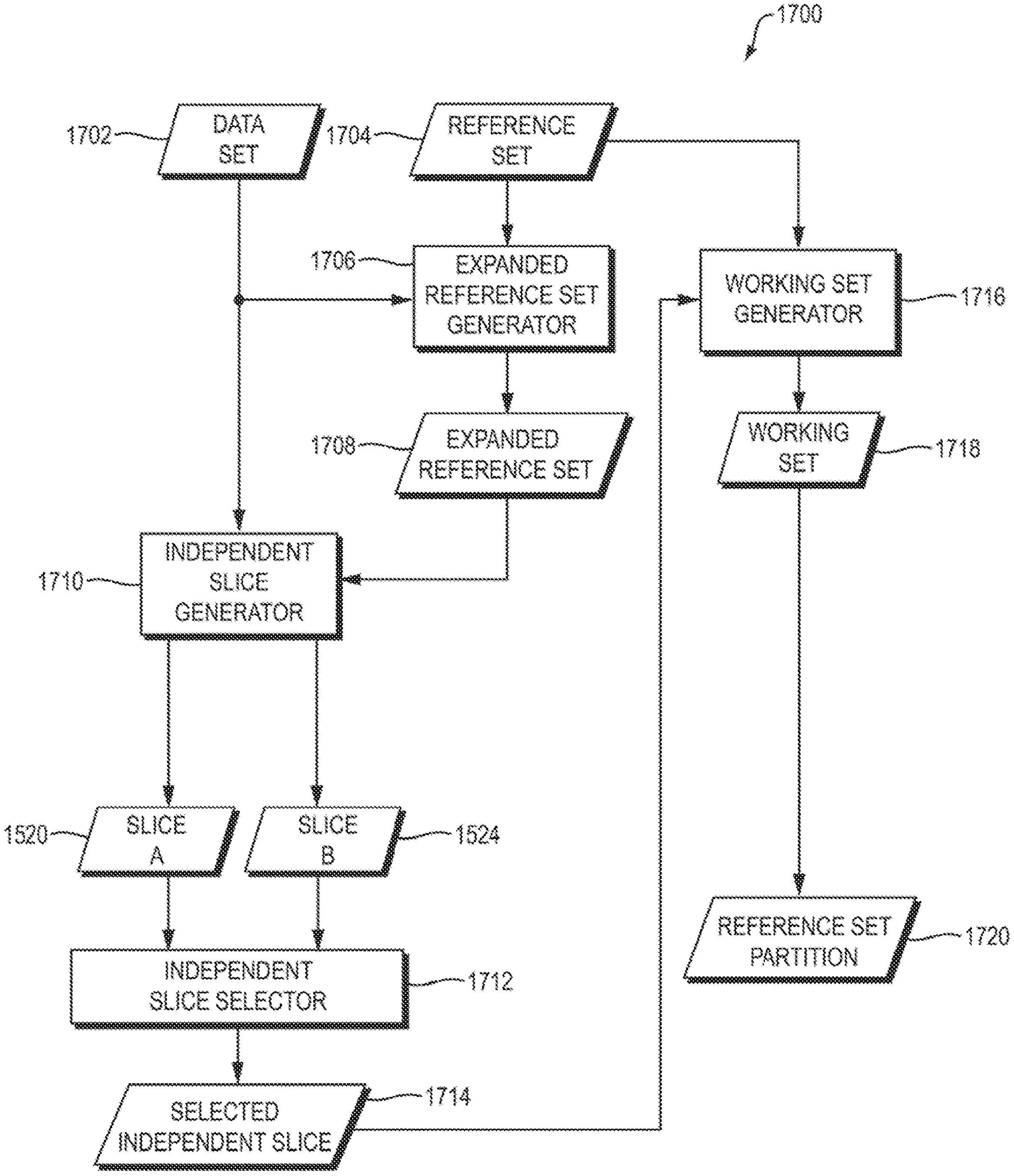
FIG. 17 is a dataflow diagram of a system for constructing a reference set partition for an independent slice of a data set according to one embodiment of the present invention.
Figure 18:
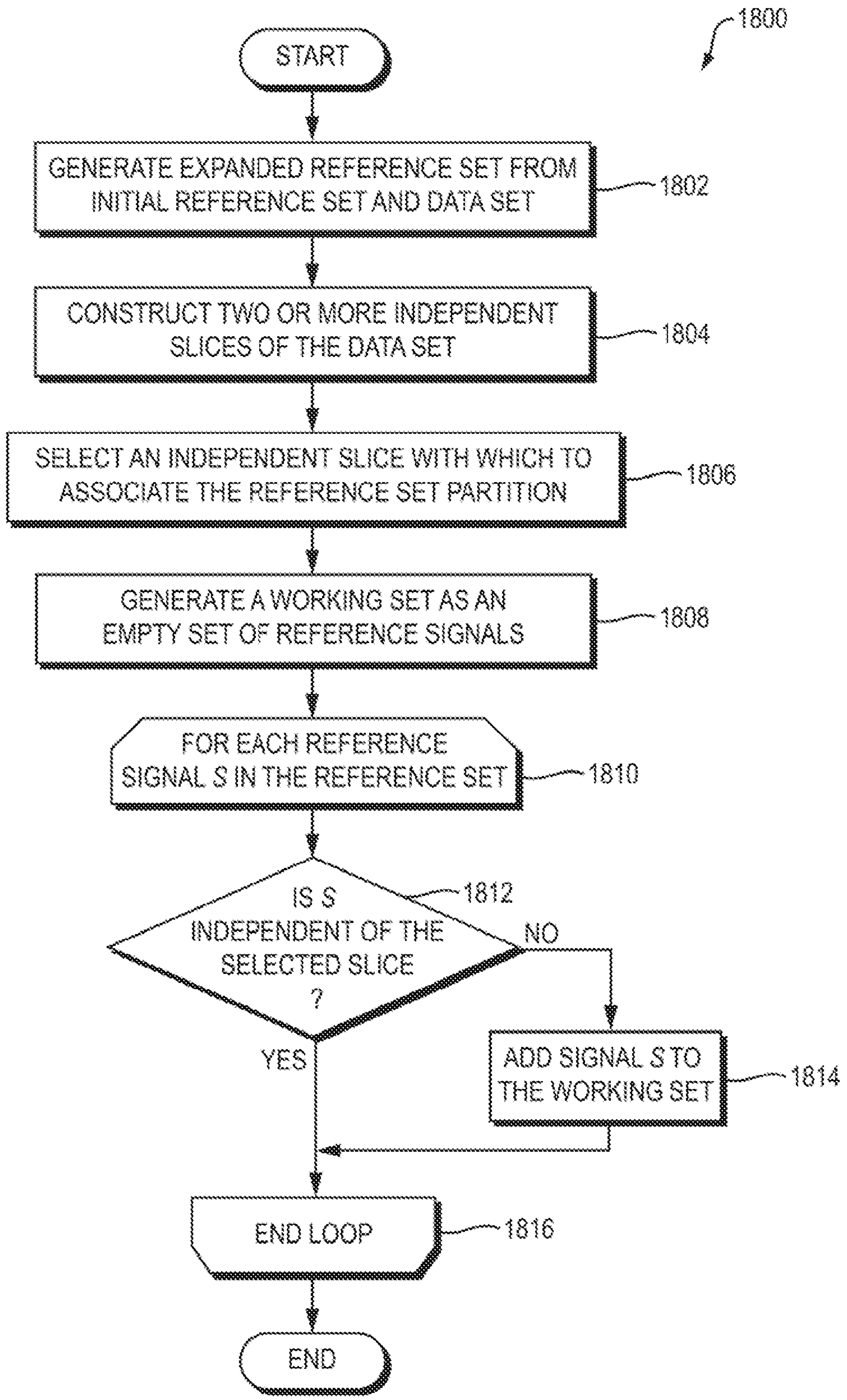
FIG. 18 is a flowchart of a method performed by the system of FIG. 17 according to one embodiment of the present invention.

Referring to FIG. 17, a dataflow diagram is shown of a system 1700 for constructing a reference set partition 1720 for an independent slice of a data set 1702 (such as any of the slices 1520 and 1524 generated in the system 1500 of FIG. 15) according to one embodiment of the present invention. Referring to FIG. 18, a flowchart is shown of a method 1800 performed by the system 1700 of FIG. 17 according to one embodiment of the present invention.

In the particular example shown in FIG. 17, the slice that is used to generate the reference set partition 1720 is Slice A 1520 from FIG. 15. This is merely an example, however, and does not constitute a limitation of the present invention. Any independent slice of the data set 1702 may be used to generate the reference set partition 1720. The partition 1720 is a supporting set of reference signals for all of the non-zero members of the independent slice 1520 that is used to generate the reference set partition 1720.

An expanded reference set generator 1706 generates an expanded reference set 1708 from an initial reference set 1704 and a data set 1702, using any techniques disclosed herein (FIG. 18, operation 1802). Although not shown in FIGS. 17 and 18, the expanded reference set generator may also generate a custom reference set from the initial reference set 1704 and the data set 1702, using any techniques disclosed herein.

An independent slice generator 1710 generates at least two independent slices 1520 and 1524 of the data set 1702 (FIG. 18, operation 1804). The independent slice generator 1710 may use any of the techniques disclosed herein (e.g., in connection with FIGS. 15 and 16A-16B) to generate the independent slices 1520 and 1524. For that reason, the operation of independent slice generator 1710 is not shown in detail in FIG. 17.

An independent slice selector 1712 selects one of the generated independent slices 1520 and 1524 with which to associate a reference set partition, represented in FIG. 17 as the selected independent slice 1714 (FIG. 18, operation 1806). Assume, for purposes of example, that slice A 1520 is the selected independent slice 1714. Note that output need not itself be a slice, but instead may be a pointer or other data indicating which of the independent slices 1520 and 1524 has been selected.

A working set generator 1716 generates a working set 1718 as an empty set of reference signals (FIG. 18, operation 1808). The working set generator 1716 enters a loop over each reference signal S in the reference set (FIG. 18, operation 1810). The working set generator 1716 determines whether reference signal S is independent of the selected slice 1714 (FIG. 18, operation 1812). If the signal S is not independent of the selected slice, then the working set generator 1716 adds signal S to the working set 1718 (FIG. 18, operation 1814). The working set generator 1716 repeats operations 1812-1814 for the remaining reference signals in the reference set 1704 (FIG. 18, operation 1816).

When all reference signals in the reference set have been considered, the working set generator 1716 associates the final working set 1718 with the selected slice 1714 as its reference set partition 1720 (FIG. 18, operation 1818).

Embodiments of the present invention have a variety of advantages, such as the following. Many real-world sensors, such as microphones or bio-electrical sensors, are placed in environments characterized by multiple simultaneously active sources, and their response signals, at any given moment, are often the sum of what their responses would be to each individual source. Output signals generated by electrical or computational equipment may also take the form of a sum of independent terms, each of which is some unknown filtered version of an unknown signal generated by independent signal source or generator.

It is often of great interest to determine what the sensor or output signals would be if only a single source were active. However, it is typically not possible to arrange for all but one source to become inactive, so as to actually generate the desired "solo response" from the sensors or the equipment. It would be advantageous to be able to determine those solo responses by appropriately processing the actual sensor or output signals, comprising as they do the summed responses to the individual sources. Embodiments of the present invention include methods and systems for advantageously determining those solo responses. In certain aspects, embodiments of the present invention make use of information and assumptions about the desired solo responses (such as the assumption that they are statistically independent of each other), and of possibly-available reference signals that are known or thought to be arbitrary linear mixtures of the underlying signal sources.

For example, a particular method which may be performed by embodiments of the present invention is one in which each of a plurality of microphones in an environment with multiple simultaneously active acoustic sources responds with a signal equal to that microphone's response to each individual active source, summed over all the active sources. The microphone signals are digitized and processed by a blind source separation algorithm, each of whose outputs, upon convergence or completion of the algorithm, is an approximately statistically independent filtered version of one of the acoustic source signals. The responses of each one of the set of microphones to a single acoustic source is reconstructed by: (a) designating the set of microphone responses as a set of data signals; (b) designating the set of blind source separation output signals as a set of reference signals; (c) computing the IST set for each of the data signals in the data set using the reference set; (d) identifying each irreducible IST of a data signal as the response of the microphone associated with the data signal to some one acoustic source in isolation; (e) computing each independent slice of the data set that has a non-empty associated reference set partition; (f) identifying each such independent slice with the acoustic source, a filtered version of whose signal appears as the sole signal in the reference set partition of the independent slice; and (g) identifying each IST in those independent slices with the microphone whose signal is the IST's data signal.

As explained above, when multiple microphones are present in a complex acoustic environment with multiple simultaneously active sound sources, each microphone's response is, in general, the sum of that microphone's response to each of the active sound sources in isolation: the sum of its "solo response" to each source if all of the other sources were mute. Embodiments of the present invention may recover these solo responses by reconstructing them from the available microphone responses to all of the active sources "in concert."

The techniques described herein may be used to achieve this end, by assuming that the acoustic signals radiated by the sound sources are mutually statistically independent. In that case, the microphone signals can be considered to be data signals whose independent signal terms are the desired solo responses. Like many state-of-the-art BSS algorithms, certain embodiments of the present invention require at least as many sensor signals as there are active source signals. Certain embodiments of the present invention assume that the hidden source signals are mutually uncorrelated, non-stationary, and non-white.

To reconstruct these solo responses, the actual microphone responses are digitized and processed as a set of data signals. A set of reference signals is generated by also processing the microphone signals using a blind source separation (BSS) process. The outputs of this BSS process are a set of signals, each of which is an arbitrarily filtered version of the acoustic signal generated by one of the sound sources. (Note that in general none of these signals will be any of the desired microphone solo responses.) The outputs of the blind source separation process are employed as a set of mutually independent reference signals.

Because the reference signals are considered to be statistically independent, the alternative method described above can be employed to generate IST sets by decomposing the data set of microphone signals using the reference set of source signals. This decomposition process will produce, among other things, irreducible ISTs each of which is the solo response of some microphone to some acoustic source.

The solo response of a particular microphone to a particular acoustic source can be identified using the BSS output that is a filtered version of that source's signal. To do so, the independent data slices of the data set, and their associated reference set partitions, are identified. Each of the reference set partitions will be a single BSS output signal, because those signals, at convergence, are mutually independent. Thus, each independent slice will have a reference set partition that is a single one of the filtered acoustic signals. Each slice is thus associated with a single acoustic source. Each IST in a slice is associated with a data signal, which in turn is the response signal from a particular microphone. Therefore each IST signal is the solo response of the microphone associated with that data signal to the acoustic source associated with the slice.

Figure 21:
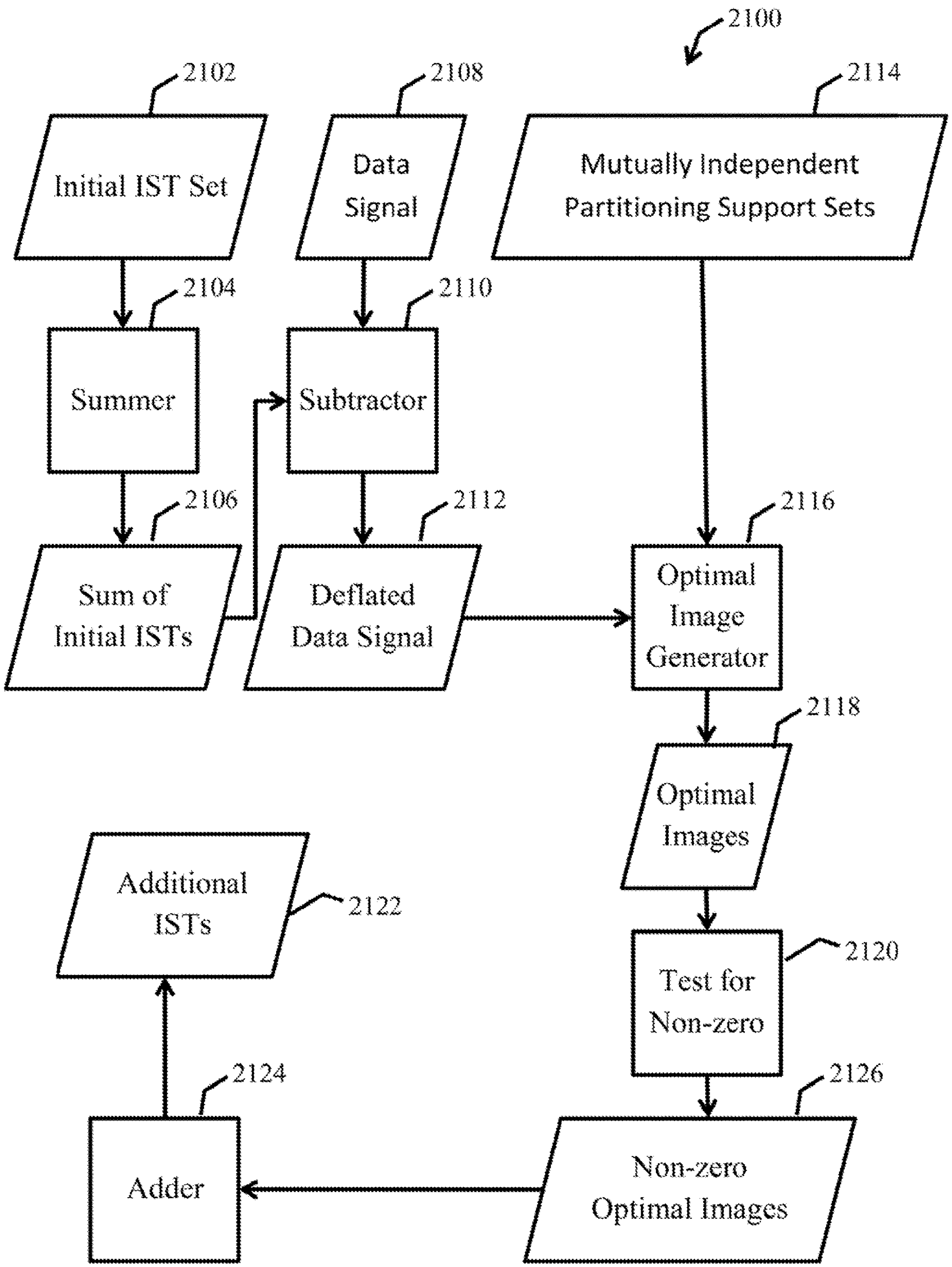
FIG. 21 is a dataflow diagram of a system for generating additional independent signal terms (ISTs) of a data signal, given an initial set of ISTs of that data signal and at least one mutually independent partitioning support set of reference signals, according to one embodiment of the present invention.
Figure 22:
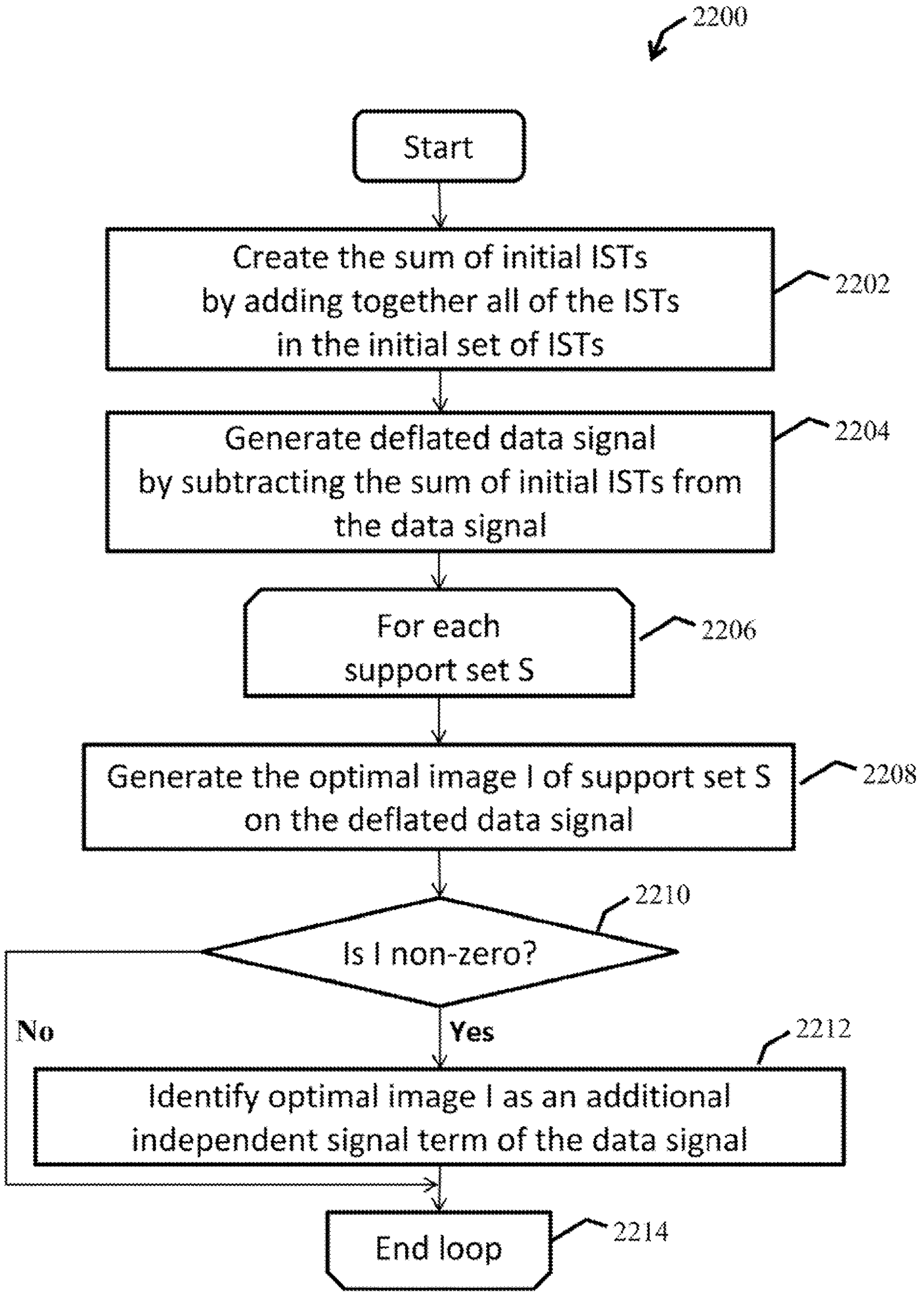
FIG. 22 is a flowchart of a method performed by the system of FIG. 21 according to one embodiment of the present invention.

Referring to FIG. 21, a dataflow diagram is shown of a system 2100 for generating additional independent signal terms (ISTs) 2122 of a data signal 2108, given an initial set of ISTs 2102 of that data signal 2108 and at least one mutually independent partitioning support set of reference signals 2114 according to one embodiment of the present invention. Referring to FIG. 22, a flowchart is shown of a method 2200 performed by the system 2100 of FIG. 21 according to one embodiment of the present invention. A "set," as that term is used herein, may include zero or more elements. For example, the initial IST set 2102 may include zero or more elements.

The system 2100 includes a summer 2104, which receives the initial IST set 2102 as an input and sums all of the signal terms in the initial IST set 2102 to produce a sum of the initial ISTs 2106 (FIG. 22, operation 2202). The system 2100 also includes a subtractor 2110, which receives the data signal 2108 and the sum of the initial ISTs 2106 as inputs, and subtracts the sum of the initial ISTs 2106 from the data signal 2108 to produce a deflated data signal 2112 as an output (FIG. 22, operation 2204).

The method 2200 enters a loop over each support set S in the mutually independent partitioning support sets 2114 (FIG. 22, operation 2206). The system 2100 includes an optimal image generator 2116, which, for each such support set S, receives the support set S and the deflated data signal 2112 as inputs, and generates an optimal image I of the support set S on the deflated data signal 2112 (FIG. 22, operation 2208). The resulting set of optimal images is shown in FIG. 21 as optimal images 2118.

The system 2100 also includes a non-zero test module 2120, which determines, for each optimal image I in the optimal images 2118, whether the optimal image I is non-zero (FIG. 22, operation 2210). If the optimal image I is determined to be non-zero, then the system 2100 identifies the optimal image I as an additional independent signal term of the data signal 2108 (FIG. 22, operation 2212). For example, if the non-zero test module 2120 determines that the optimal image I is non-zero, then the non-zero test module 2120 may add the optimal image I to a set of non-zero optimal images 2126; otherwise, the non-zero test module 2120 may not add the optimal image I to the set of non-zero optimal images 2126. The system 2100 also includes an adder 2124, which adds all of the identified non-zero optimal images 2126 to the set of additional ISTs 2122. As implied by the description above, operations 2208, 2210, and 2212 may be repeated for each of the optimal images 2118 (FIG. 22, operation 2214).

In the method 2200, the initial set of ISTs 2102 may consist of zero ISTs, and the method 2200 may further include generating independent signal terms of the data signal 2108 by performing the following steps one or more times: (1) creating an augmented set of ISTs by adding any previously-generated additional independent signal terms to the initial set of ISTs; and (2) generating additional independent signal terms of the data signal, using the method 2200, using the augmented set of ISTs as the initial set of ISTs 2102.

At the beginning of the method 2200 (i.e., before operation 2202), the method 2200 may generate at least one of the reference signals in the mutually independent partitioning sets of reference signals 2114 by linearly filtering signals generated by a blind source separation algorithm. At least one of the additional ISTs 2122 may represent a response of a sensor (e.g., an acoustic sensor).

Figure 23:
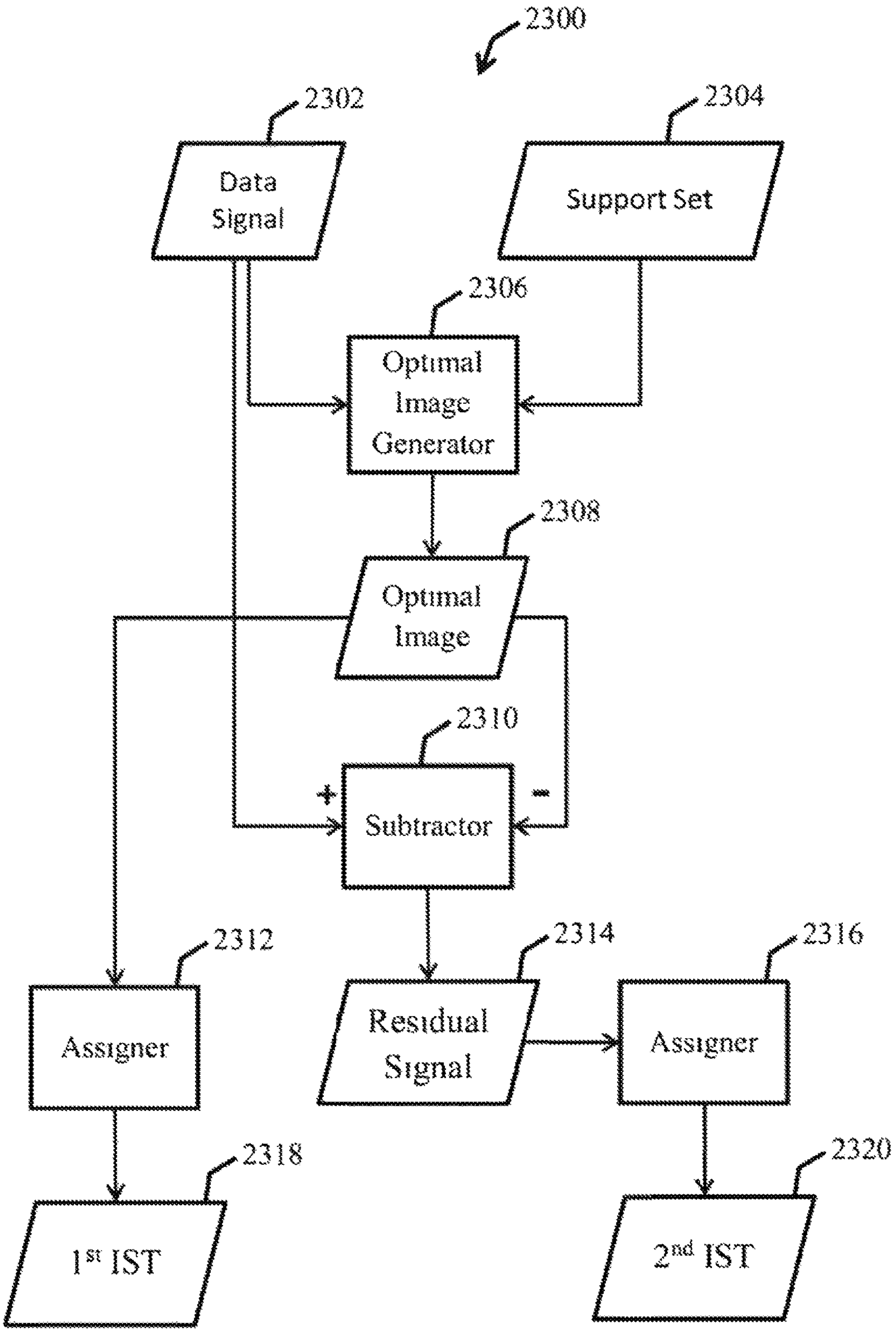
FIG. 23 is a dataflow diagram of a system for decomposing a data signal into a first independent signal term (1st IST) that is coherent with a partitioning support set of at least one reference signal, and a second independent signal term (2nd IST) that is incoherent with the support set according to one embodiment of the present invention.
Figure 24:
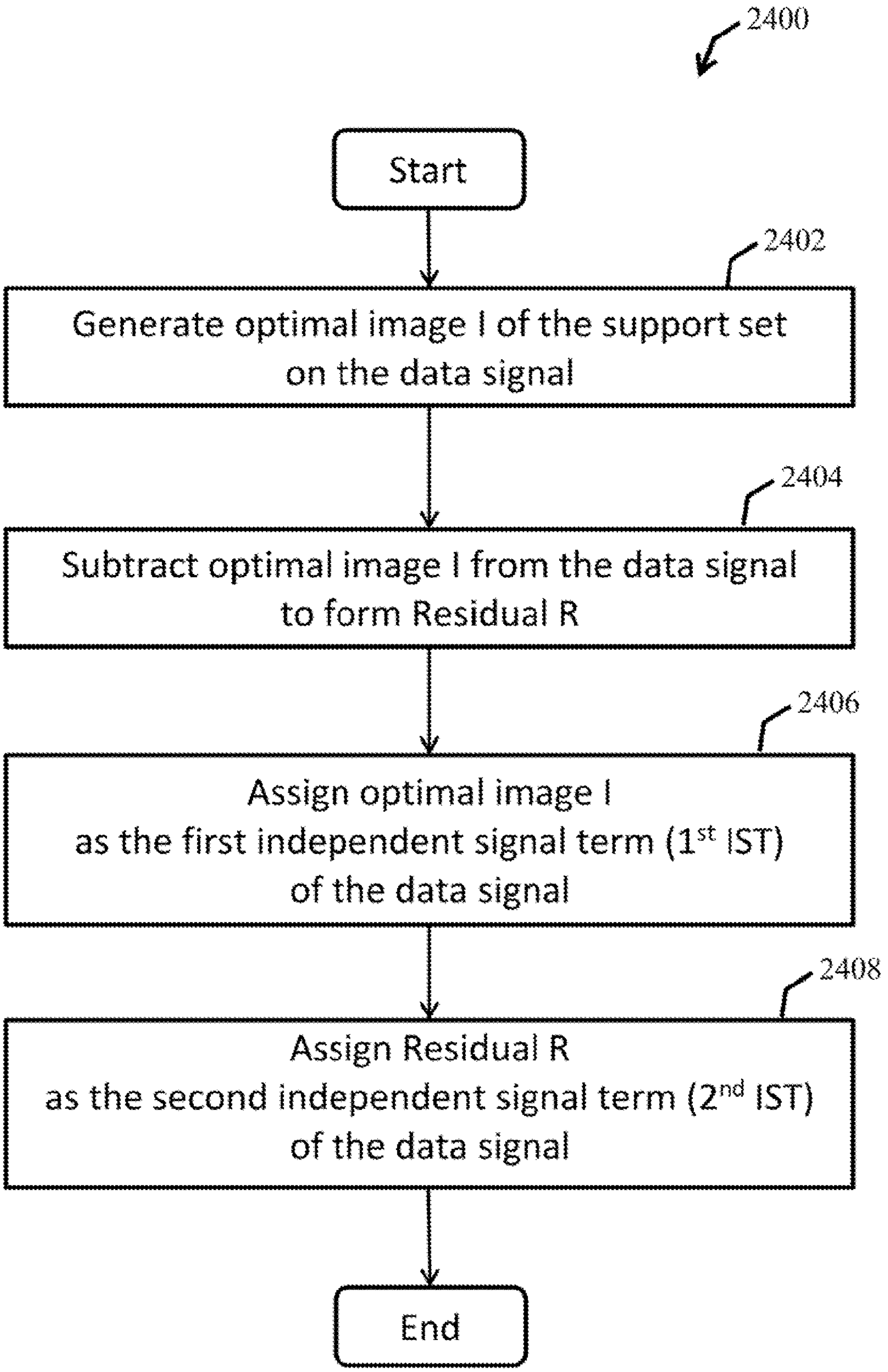
FIG. 24 is a flowchart of a method performed by the system of FIG. 23 according to one embodiment of the present invention.

Referring to FIG. 23, a dataflow diagram is shown of a system 2300 for decomposing a data signal 2302 into a first independent signal term 2318 (1st IST) that is coherent with a partitioning support set 2304 of at least one reference signal, and a second independent signal term 2320 (2nd IST) that is incoherent with the support set 2304 according to one embodiment of the present invention. Referring to FIG. 24, a flowchart is shown of a method 2400 performed by the system 2300 of FIG. 23 according to one embodiment of the present invention.

The system 2300 includes an optimal image generator 2306, which receives the data signal 2302 and support set 2304 as input, and generates an optimal image 2308 of the support set 2304 on the data signal 2302 (FIG. 24, operation 2402). The system 2300 also includes a subtractor 2310 which receives the data signal 2302 and the optimal image 2308 as input, and subtracts the optimal image 2308 from the data signal 2302 to produce the residual signal 2314 as an output (FIG. 24, operation 2404).

The system 2300 also includes an assigner 2312 which receives the optimal image 2308 as input and assigns it as the first independent signal term 2318 (FIG. 24, operation 2406).

The system 2300 also includes an assigner 2316 which receives the residual signal 2314 as input and assigns it as the second independent signal term 2320 (FIG. 24, operation 2408).

At the end of the method 2400 (i.e., after operation 2408), the method 2400 may use first independent signal term 2318 or second independent signal term 2320 as input signals to a blind source separation algorithm. In system 2300, data signal 2302 may represent a response of a sensor (e.g., an acoustic sensor).

Figure 25:
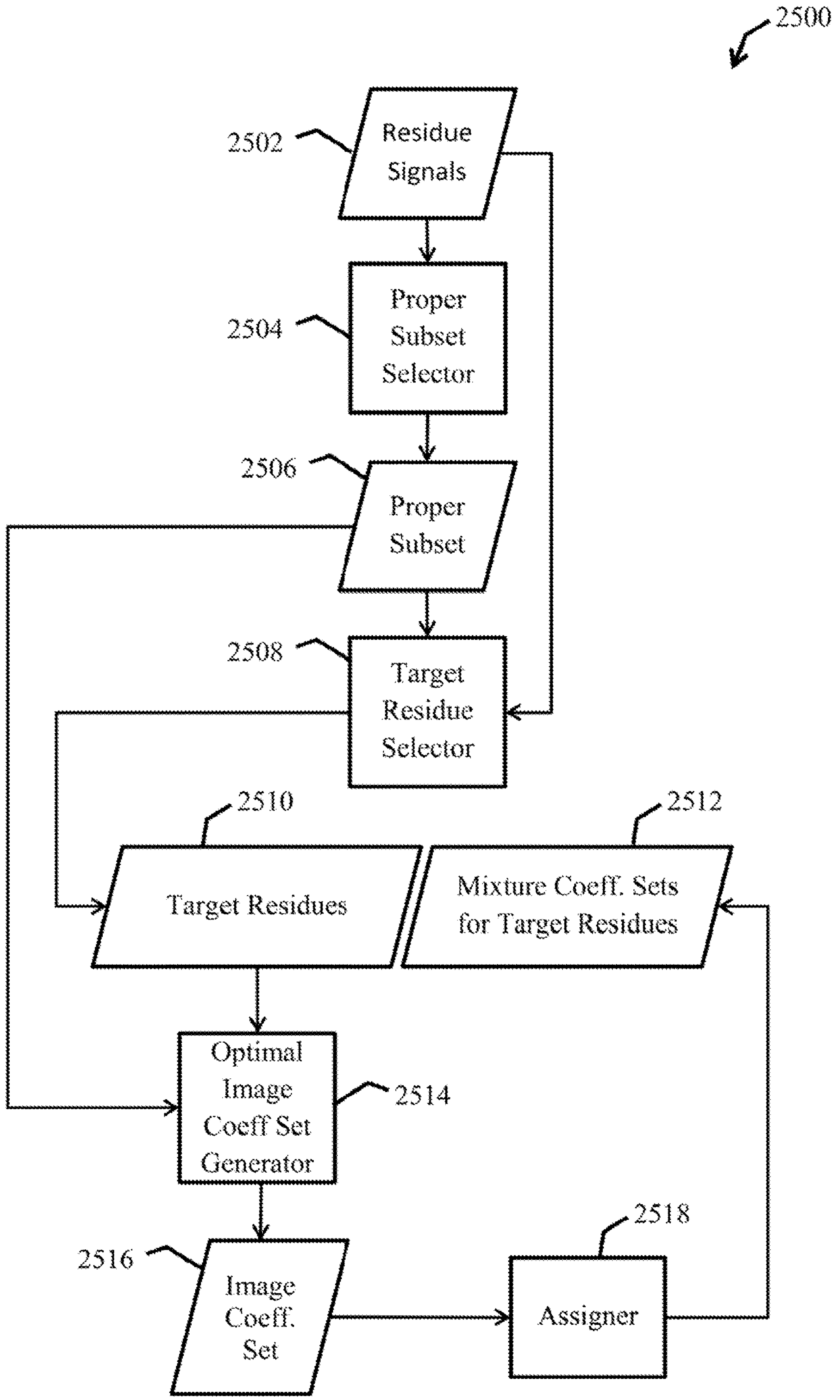
FIG. 25 is a dataflow diagram of a system for selecting a proper subset of a given set of residue signals, and at least one target residue, and generating mixture coefficient sets for each of the target residues, according to one embodiment of the present invention.
Figure 26:
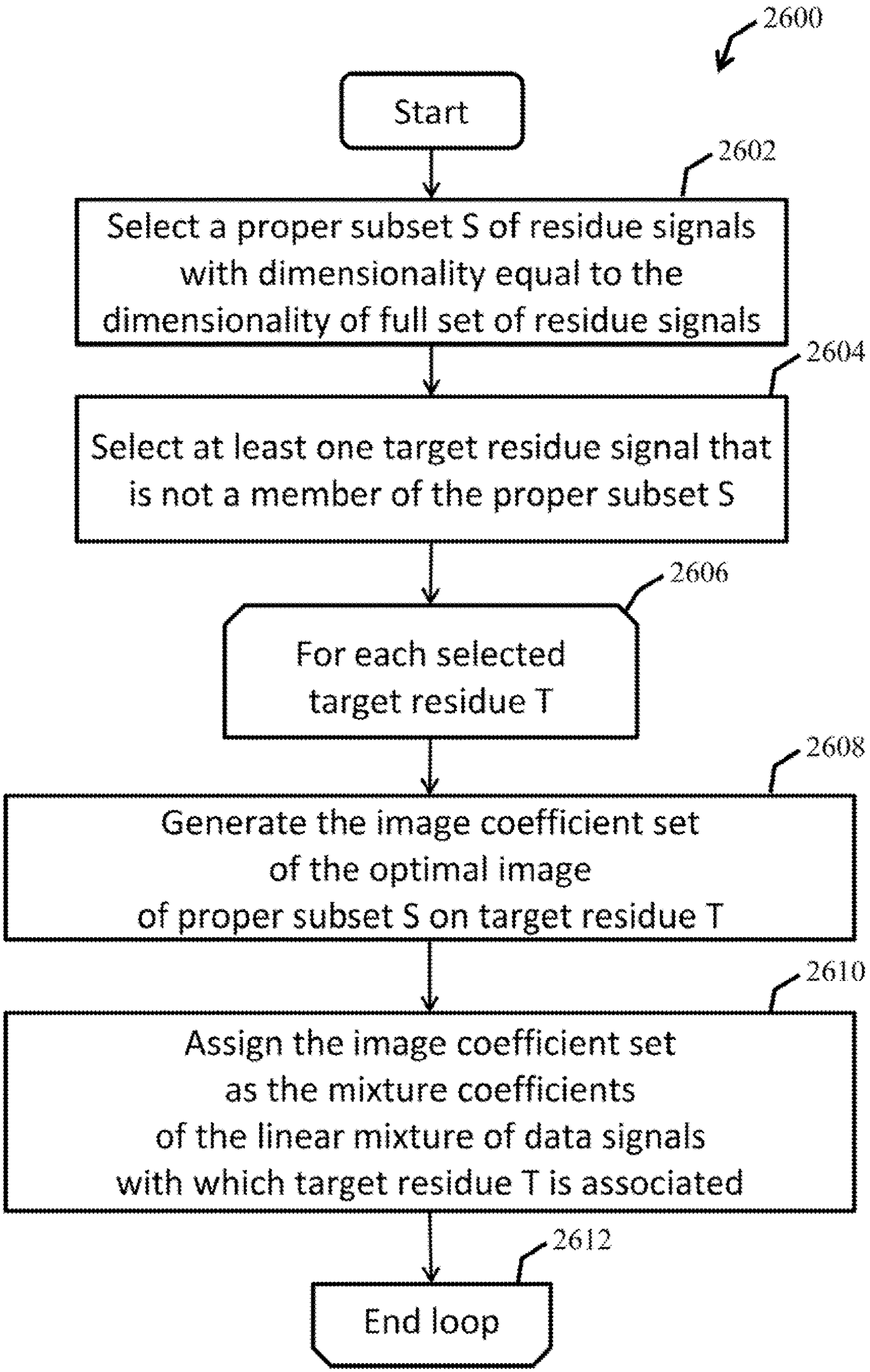
FIG. 26 is a flowchart of a method performed by the system of FIG. 25 according to one embodiment of the present invention.

Referring to FIG. 25, a dataflow diagram is shown of a system 2500 for selecting a proper subset 2506 of a given set of residue signals 2502, and at least one target residue 2510, and generating mixture coefficient sets 2512 for each of the target residues 2510. Referring to FIG. 26, a flowchart is shown of a method 2600 performed by the system 2500 of FIG. 25 according to one embodiment of the present invention.

The system 2500 includes a proper subset selector 2504 that receives as input the set of residue signals 2502, selects any one of the proper subsets of the residue signals 2502 whose dimensionality equals the dimensionality of the set of residue signals 2502, producing that subset S as proper subset 2506 (FIG. 26, operation 2602). The system 2500 also includes a target residue selector 2508 that receives the set of residue signals 2502 and proper subset 2506 as inputs, and produces at least one selected target residue 2510 that is not a member of proper subset 2506 (FIG. 26, operation 2604).

The method 2600 enters a loop over each target residue T in the set of selected target residues 2510 (FIG. 26, operation 2606). The system 2500 includes an optimal image coefficient set generator 2514, which, for each such target residue T, receives the target residue T and proper subset S 2506 as inputs, and generates the image coefficient set 2516 of the optimal image of proper subset S 2506 on the target residue T (FIG. 26, operation 2608). The system 2500 also includes an assigner 2518 that assigns the image coefficient set 2516 as the mixture coefficient set 2512 for the data signals corresponding to the proper subset 2506 of residues in the at least one linear mixture with which target residue T is associated. As implied by the description above, operations 2608 and 2610 in FIG. 26 may be repeated for each of the selected target residues 2510.

The dimensionality of the set of data signals may be equal to the number of data signals in the data set, and the set of residue signals 2502 may be a set of finite segments of each of those data signals, wherein the dimensionality of the set of signal segments is less than the number of data signals in the data set.

The method 2600 may further include computing the image of the common support set of reference signals on at least one of the data signals whose residues are target residues, such as by: (1) computing the at least one linear mixture of the data signals associated with the at least one target residue; (2) subtracting the computed linear mixture from the at least one data signal to form a difference signal; and (3) identifying the image of the common support set of reference signals on the at least one data signal as the image of the difference signal on the at least one data signal.

The method 2600 may further include computing the residue of the image of the common support set of reference signals on at least one of the data signals whose residues are target residues, such as by identifying the residue of the image of the common support set of reference signals on at least one of the data signals as the at least one data signal minus the image of the common support set of reference signals on at least one of the data signal.

Embodiments of the present invention include computer-implemented methods and systems for partitioning data signals without foreknowledge of the signals' hidden sources when:

- the sources are essentially independent of each other;
- the location of sources and sensors are quasi-stationary;
- the maximum number N of simultaneously active sources is less than the number S of data signals; and
- some sources become silent occasionally (referred to herein as "taking turns"), independently of other sources' silence. More than one source may be silent simultaneously.

The input to embodiments of the present invention may, for example, be N sources (where N>1), where S>=N. The sources may be additive, convolutive mixtures. This may, for example, include sources of any one or more of the following types, in any combination: audio, acoustic, electrical, and biolectrical.

The output of embodiments of the present invention may, for example, be at least two partitions (sets) containing P and Q sources, where P+Q<=N), where each of the partitions contains a subset of the original N sources. Each of P and Q may be any number. Examples of combination of P and Q include: P=1 and Q=1, P=1 and Q>1, and P>1 and Q>1.

Embodiments of the present invention may perform source separation on the two partitions to produce essentially independent estimates of the sources, accounting for all sources found in the mixtures, except optionally for low-amplitude, unmodeled "noise."

Note that if every source independently goes silent occasionally, then the result of the partitioning process above is complete, i.e., the partitioning process achieves source separation. That is, if the silent intervals of any two sources are not always coincident, then it is possible to place them in distinct partitions; and for any source that is a member of a singleton partition (P=1, regardless of Q), that source is separated from all other sources. If this applies to all sources, or to all sources of interest, then no further source separation is required.

Embodiments of the present invention may, for example, perform source separation on N sources as follows. A block of L signal samples is received from S data signals. L must be short enough that the sources and sensors are effectively stationary in position throughout the interval ("quasi-stationarity," from the first of the L samples to the last of the L samples), but long enough to encompass correlation lags between coherent ISTs in pairs of data signals (by way of example, time delays across the sensor array in the case of data signals generated by acoustic sensors) including any echoes that the application needs to include. In one embodiment, for example, N=3 or 4, S=N+1, L is on the order of tens of milliseconds, and there are a few hundred samples, at a sampling rate of 16 kHz. These values are merely examples and do not constitute limitations of the present invention.

For every choice of Q (Q=1:S) data signals, an embodiment of the present invention may calculate the joint MMSE estimate (i.e., matrix M of convolution kernels) of Q signals to a Pth channel (P=1:S), where the Pth data signal is not contained in the set of the Q data signals that are used to calculate the estimate. Note that because N<S, this estimate is guaranteed to be perfect, i.e., to produce a residual of zero.

In the absence of prior information about the sources, an embodiment of the present invention checks every possible value of P. This means that, for each of the data signals (i.e., the Pth data signal in the range 1:S), the embodiment finds the linear combination (of all of the data signals except data signal P) that equals the Pth data signal in the current data block. Thus, the Pth row of the matrix M consists of the coefficients of that linear combination. This involves a total of 2^S estimations (of which only 2^N are non-redundant), corresponding to each possibility that each data signal is active or not, in all possible combinations.

If desired, the MMSE estimate may be weighted to emphasize certain frequencies at the expense of others. Several standard techniques are available to perform such estimates, in either block or streaming implementations. Such techniques include, for example, computing the minimum mean-squared error using matrix-inversion techniques. Two standard algorithms which may be used are, for example, LU decomposition and singular value decomposition, both of which produce appropriate pseudo-inverses.

In practice, embodiments of the present invention may or may not check all possible combinations of data signals. For example, embodiments of the present invention may check fewer than all possible combinations of data signals. In one embodiment, for example, only combinations involving Q=S−1 are checked, in which case each data signal may be checked individually, i.e., for each value of P in the range 1:S.

After checking values of P, an embodiment of the present invention may take the next block of L signal samples of the N data signals. This block may overlap with the previous block, but it need not. For ease of explanation, but without limitation, assume that this next block begins at the first sample after the previous block ends. An embodiment of the present invention may estimate the matrix M' that corresponds to this next block, in the manner described above with respect to estimating the matrix M for the previous block.

An embodiment of the present invention may apply the kernel matrix M, estimated for the previous block(s), to the current block (by convolving the signals with the kernels in M and summing) and evaluate the outputs. If the result of applying the kernel matrix M is a good estimate of the Pth channel's current block (or, equivalently, if the residual power after subtracting the estimate from this block is a sufficiently small fraction of the block's power), then an embodiment of the present invention may conclude that only a subset (although not necessarily a proper subset) of the previous block's active sources are still active, and apply the difference M'-M to the current block; note that M'-M is also a kernel matrix of the same dimensions as M and M'. If the resulting residual is not zero (or is not sufficiently small), then an embodiment of the present invention may conclude that J>0 sources that were formerly non-silent are now silent, and that M' and M'-M partition the sources. Note that the matrix M need not be computed from the immediately previous block; it could be computed from an older block, or indeed from a future block if available; and many such blocks and matrices could be compared. In general, for any past block B (or, in principle, future block) and corresponding matrix, this comparison permits deciding whether sources active in B and those active in the current block have a subset relationship, and whether some sources that are silent in the current block were (or will be, for a future block) silent in B and thus constitute a partitioning of the sources.

For example, applying M'-M to the previous block will produce a residual that consists of a combination of exactly these J sources and no others.

The threshold for "sufficiently small" in the process described above may be based on prior estimates of noise level in the signals (e.g., permitting an F-test on residual power compared to estimated noise power); or on an application-dependent threshold, such as 1%.

Embodiments of the present invention may produce substantial reductions in one or more of the following, in comparison to existing source separation techniques:

- amount of computation required to perform source separation;
- amount of data used to achieve separation, as reflected in the amount of time before separation is achieved;
- sensitivity to echoes; and
- the speed at which sources may move without severely compromising separation.

As an example of the reduction in number of computations achieved by embodiments of the present invention, consider that the number of computations (as measured in floating point operations) for existing BSS techniques is O(filter length)*O(#sources)^3. If, for example, P=2 and Q=3, then the number of computations required by existing BSS techniques to perform source separation would be proportional to (P+Q)^3=125. In contrast, embodiments of the present invention may perform source separation on the two partitions to perform source separation using a number of the two computations that is proportional to P^3=Q^35. Furthermore, each partition may be processed in parallel, such as by using multiple processors, thereby further reducing the amount of computation time required to perform source separation.

As an example of the data reductions achieved by embodiments of the present invention, consider that existing BSS techniques require approximately 60 seconds of data to perform source separation on four audio sources, in the absence of significant echoes. In contrast, using embodiments of the present invention, the first partition can be created within 0.1 seconds after the first source goes silent, which might occur within a few seconds. Suppose that each source goes silent in turn every T seconds, where T is equal to a few seconds. Embodiments of the present invention can achieve a very good, complete separation by the time 4*T seconds have passed, which is much shorter than the 60 seconds required by existing BSS techniques, assuming that T<5 (although even with T>5 a significant reduction may be achieved, representing partial separation).

Figure 3A:
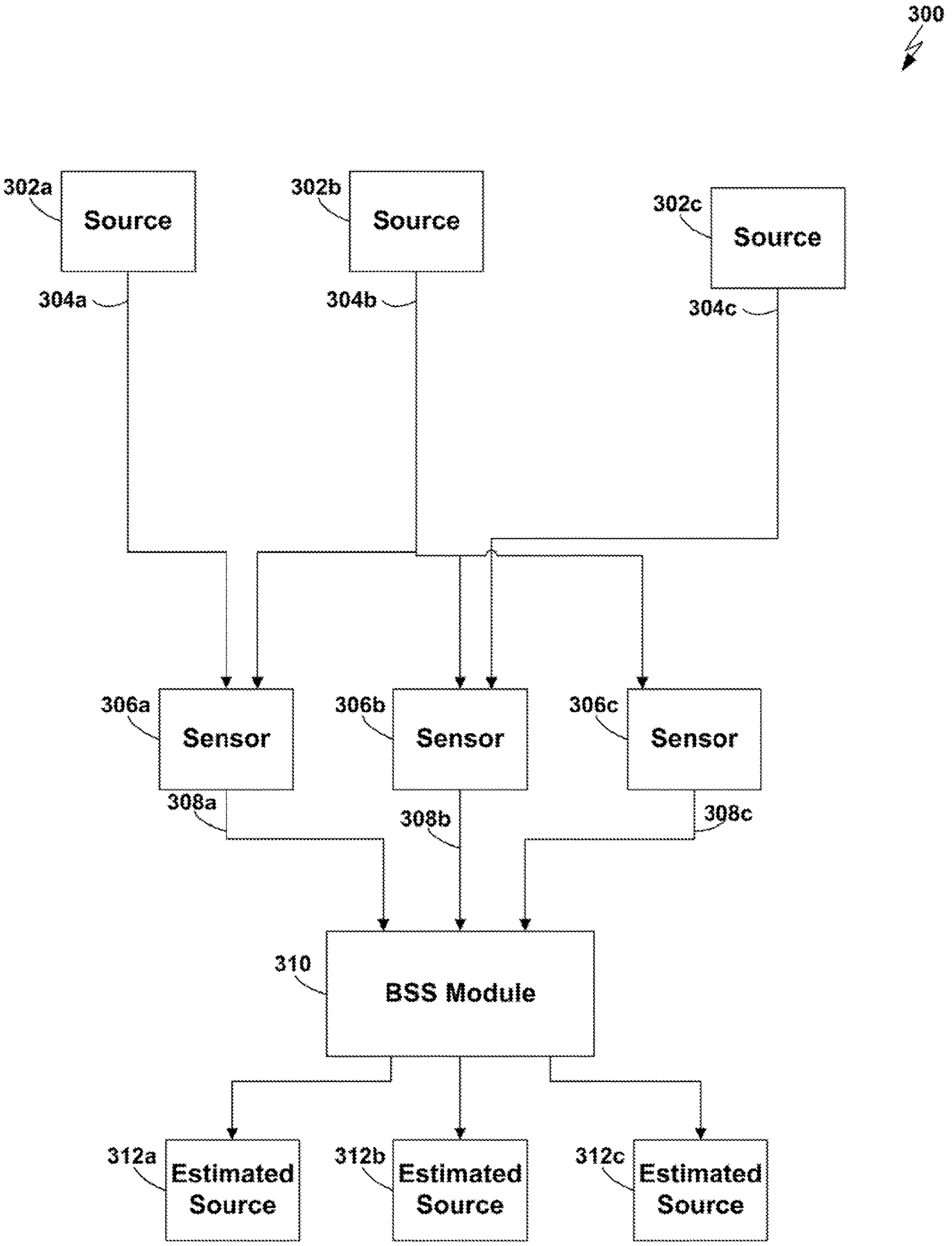
FIG. 3A is a diagram illustrating a prior art Blind Source Separation (BSS) system.
Figure 3B:
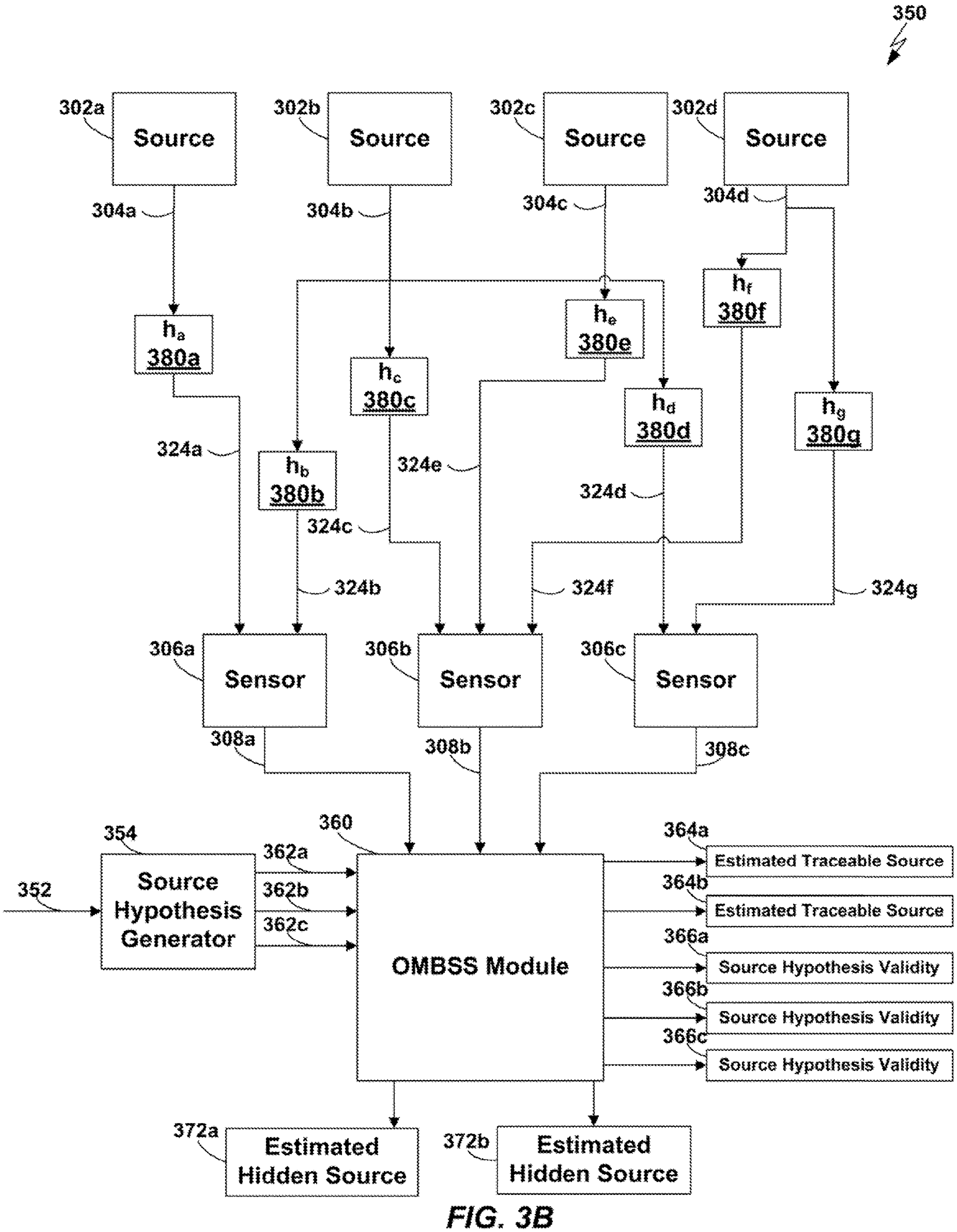
FIG. 3B is a diagram illustrating a Blind Source Separation (BSS) system according to one embodiment of the present invention.

Referring to FIG. 3B, an OMBSS system 350 implemented according to one embodiment of the present invention is shown. The OMBSS system 350 includes the sources 302*a-c* and signals 304*a-c*, but also includes an additional source 302*d*, which emits signal 304*d*. As in the system 300 of FIG. 3A, in the system 350 of FIG. 3B the sensor 306*a* receives a mixture of signals 304*a* and 304*b*. In the system 350 of FIG. 3B, the sensor 306*b* receives a mixture of signals 304*b*, 304*c*, and 304*d*; and sensor 306*c* receives a mixture of signals 304*b* and 304*d*. The OMBSS system 350 of FIG. 3B, like the BSS system 300 of FIG. 3A, includes sensors 306*a-c*. As the example in FIG. 3B illustrates, the number of sources 302*a-d* may be greater than the number of sensors 306*a-c* in embodiments of the present invention.

The OMBSS system 350 explicitly models the environmental transfer functions as filters 380*a-g*, each of which receives one of the source signals 304*a-d* as an input and produces a filtered source signal as an output. (Although the BSS system 300 of FIG. 3A also explicitly models the environmental transfer functions as filters, such filters are omitted from FIG. 3A for ease of illustration.) In particular, for each source A that contributes a source signal received by a sensor B, a corresponding transfer function filter $h_{A,B}$ filters the signal from source A to produce the potentially delayed and filtered signal that is received by sensor B. Any two or more such filters may differ from each other (i.e., they may apply different filtering functions to their inputs). In particular, in the example of FIG. 3B:

- Filter 380*a* filters source signal 304*a* to produce filtered source signal 324*a*, which is received as an input by sensor 306*a*.
- Filter 380*b* filters source signal 304*b* to produce filtered source signal 324*b*, which is received as an input by sensor 306*a*.
- Filter 380*c* filters source signal 304*b* to produce filtered source signal 324*c*, which is received as an input by sensor 306*b*.
- Filter 380*d* filters source signal 304*b* to produce filtered source signal 324*d*, which is received as an input by sensor 306*c*.
- Filter 380*e* filters source signal 304*c* to produce filtered source signal 324*e*, which is received as an input by sensor 306*b*.
- Filter 380*f* filters source signal 304*d* to produce filtered source signal 324*f*, which is received as an input by sensor 306*b*.

Filter 380*g* filters source signal 304*d* to produce filtered source signal 324*g*, which is received as an input by sensor 306*c*.

Therefore, any reference herein to one of the sensors 306*a-c* receiving one of the signals 304*a-d* should be understood to refer to that sensor receiving a filtered version of the specified signal. For example, any reference herein to sensor 306*a* receiving signal 304*a* should be understood to refer to sensor 306*a* receiving filtered signal 324*a*, which is a filtered signal resulting from using filter 380*a* to filter signal 304*a*. As the example of FIG. 3B illustrates, any two sensors which receive the "same" one of the signals 304*a-d* in fact receive different filtered versions of that signal. For example, although it may be said that both sensors 306*a* and 306*b* receive signal 304*b*, in fact sensor 306*a* receives filtered signal 380*b* and sensor 306*b* receives filtered signal 380*c*, both of which are filtered versions of the same signal 304*b*. Similarly, any reference herein to a "mixture of signals" received from two or more sources should be understood to refer to a mixture of filtered signals received from such sources. For example, any reference herein to sensor 306*a* receiving a mixture of signals 304*a* and 304*b* should be understood to refer to sensor 306*a* receiving a mixture of filtered source signals 324*a* and 324*b*.

The OMBSS system 350 includes an OMBSS module 360 that performs the functions performed by the BSS module 310 of FIG. 3A, along with additional functions described below. In general, OMBSS leverages the fact that sometimes there is in fact additional information available to a source separation system (such as system 350) about the sources (such as sources 302*a-c*). For example, one or more signals might be available to the OMBSS module 360, each of which is similar to a single one of the sources 302*a-c*. We call such a signal a source hypothesis signal. In general, a source hypothesis signal is hypothesized to be coherent with one of the sources 302*a-c*. In particular, each source hypothesis signal is hypothesized to have unit coherence with exactly one of the sources 302*a-c*, and to be essentially independent of all other sources. Thus, every source hypothesis that is a signal (as explained below there are source hypotheses that are not signals) constitutes an appropriate candidate for a partitioning reference signal for data signals 308*a*, 308*b*, and 308*c*.

A source hypothesis is said to be "associated with" the source with which it is hypothesized to be coherent. For example, in FIG. 3B, a source hypothesis signal 362*a*, which is associated with source 302*a*, is available as an input to the OMBSS module 360. Similarly, a source hypothesis signal 362*b*, which is associated with source 302*b*, is available as an input to the OMBSS module 360. Furthermore, a source hypothesis signal 362*c*, which is not associated with any of the sources 302*a-c* in the system 350, is available to the OMBSS module 360. Solely for purposes of example, no source hypothesis signal associated with source 302*c* or 302*d* is available to the OMBSS module 360. The particular set of source hypotheses available to the OMBSS module 360 in FIG. 3B is merely an example and does not constitute a limitation of the present invention.

Alternatively, the available additional information about a source might be descriptive information other than a signal that is coherent with the source signal itself. For example, if the source signal were a pure tone, the descriptive information associated with that source might be the frequency of the pure tone. Or, if the source signal were a musical composition, the associated descriptive information might be the name of the composition, or the musical score for the composition. We call such information about a source a source hypothesis description.

In the OMBSS model, a source hypothesis signal can be generated from a source hypothesis description via an appropriate source hypothesis generator. For example, the OMBSS system 350 of FIG. 3B may include a source hypothesis generator 354, which may receive a source hypothesis description 352 as an input, and generate, based on the source hypothesis description 352, the source hypothesis signals 362*a-c*. There are many different types of source hypothesis generators, which are, in general, matched with the characteristics of the source hypothesis descriptions they can process to generate a source hypothesis signal. For example, a tone generator is a source hypothesis generator that accepts a frequency value as an input source hypothesis description, and outputs a pure tone with the specified frequency as a source hypothesis signal. A speech synthesizer is a source hypothesis generator that accepts as input a source hypothesis description comprising an orthographic or phonetic description of speech, and which generates as output a source hypothesis signal that takes the form of a corresponding acoustic speech signal.

The source hypothesis generator 354, however, is not a required component of the system 350. The source hypothesis generator 354 may, for example, be omitted from the system 350, in which case the source hypothesis signals 362*a-c* may be available for use despite not having been generated from any identifiable source hypothesis generator from an explicit source hypothesis description. As a result, the OMBSS module 360 may receive one or more of the source hypothesis signals 362*a-c* from some source other than the source hypothesis generator 354. For example, the source hypothesis generator 354 may be included in the system 350, but need not be the source of all source hypothesis signals received by the OMBSS module 360. For example, the OMBSS module 360 may receive as inputs a plurality of source hypothesis signals, some of which were generated by the source hypothesis generator 354, and some of which were not generated by any source hypothesis generator. In general, all, some, or none of the source hypothesis signals received as inputs by the OMBSS module 360 may be generated by the source hypothesis generator 354. Similarly, all, some, or none of the source hypothesis signals received by the OMBSS module 360 may not be generated by any source hypothesis generator.

A source hypothesis description may itself comprise a signal. For instance, if a source is hypothesized to be a poor quality loudspeaker playing music broadcast by an FM classical music station, an associated source hypothesis description might comprise a high-quality version of the FM broadcast signal, accompanied by a linear filter model of the loudspeaker. In this case, an appropriate source hypothesis generator would be a linear filter (perhaps implemented in software) that could model the loudspeaker and be used to filter the FM broadcast signal to generate an appropriately low-fidelity output signal. This output signal would be the source hypothesis signal for the loudspeaker.

Furthermore, although only a single source hypothesis signal 362*a* is shown for source 302*a*, this is merely an example and does not constitute a limitation of the present invention. From time to time, multiple source hypotheses may be available to the OMBSS module 360 for any particular source, and source hypotheses may be available for a signal source, multiple sources, all sources, or none of the sources. Furthermore, a single source hypothesis description may generate more than one source hypothesis signal, which may be alternative hypotheses for a single source, or simultaneous hypotheses for multiple sources.

A single source hypothesis signal may usefully be compared with a sensor response signal: unlike a sensor response signal, a valid source hypothesis signal is "pure," in that it is, by hypothesis, coherent with only one source. A source hypothesis signal never represents a mixture of source signals. That is, every valid source hypothesis signal is either an inclusive or partitioning reference signal for the set of data signals comprising the sensor response signals. For example, the OMBSS module 360 may compare the source hypothesis signal 362*a* to one or more of the sensor outputs 308*a*, 308*b*, and 308*c* individually. Similarly, the OMBSS module 360 may compare the source hypothesis signal 362*b* to one or more of the sensor outputs 308*a*, 308*b*, and 308*c* individually.

Unlike a sensor response signal, a source hypothesis signal is not necessarily valid. The source with which it is associated may not actually be active in the environment, or might not be a contributing source. As a result, the source with which the source hypothesis signal is associated may not actually be contributing to any sensor response in the system 350. For example, in the system 350 of FIG. 3B, source hypothesis signal 362*c* is associated with a hypothetical source that does not, in fact, contribute any energy to any of the sensor responses in the system 350. As a result, the source with which source hypothesis signal 362*c* is associated does not produce a signal that is received by any of the sensors 306*a-c* in the system, and therefore does not contribute to any of the sensor outputs 308*a-c*.

A valid source hypothesis signal is a source hypothesis signal that is in fact significantly coherent with at least one of the sensor responses in the system 350. An invalid source hypothesis signal is a source hypothesis signal that is essentially independent of all of the sensor responses in the system 350. By extension, source hypotheses and source hypothesis descriptions are valid (invalid) when their corresponding source hypothesis signals are valid (invalid).

In summary, source hypotheses (e.g., source hypotheses signals 362*a-c*) are pure, but possibly invalid, and even when they are valid, in practice source hypotheses are only significantly coherent with their associated source—they are, in general, not equal either to the source signal itself, or the source's mixture component in any sensor response. Sensor responses (e.g., sensor outputs 308*a-c*), on the other hand, are always valid, but are generally impure—they are mixtures of components contributed by multiple incoherent sources. These characteristics are consistent with the understanding of the set of source hypotheses as a set of essentially independent reference signals, and the set of sensor responses as a set of data signals.

A traceable source is any source associated with a valid source hypothesis. In the example of FIG. 3B, OMBSS module 360 outputs estimated traceable source signals 364*a* and 364*b*, which are associated with valid ones of the source hypothesis signals 362*a-c*. Once a source has been determined to be traceable, it is no longer completely blind—hence the sobriquet "Only Mostly Blind Source Separation". Each valid hypothesis signal is a reference signal that is significantly coherent with a response component of at least one response signal. We call such a component a traceable response component, or simply a traceable component. Each traceable component is associated with exactly one valid source hypothesis signal. An invalid source hypothesis has no traceable components associated with it.

Since each traceable component associated with a given valid hypothesis is coherent with the corresponding hypothesis signal, that set of traceable components may be used to estimate the underlying traceable source. Such an estimate is called a traceable source estimate.

A number of alternative techniques are available for estimating the traceable source signal from the source hypothesis signal and the traceable components. Possibilities include, but are not limited to, the following:

A. Using the source hypothesis signal as the traceable source estimate.

B. Selecting one of the traceable source components as the traceable source estimate. Possible selection criteria include selecting the component with the most power, selecting the component with the widest range of frequencies, and selecting the component that is most coherent with the source hypothesis signal.

C. Forming the traceable source signal as a complex weighted sum of all of the traceable components of the given source hypothesis, where by "complex weighted sum" is meant forming a mixture of the traceable components, each convolved with a "kernel" vector calculated to maximize or minimize an application-appropriate metric, such as the mutual correlation of the weighted terms.

D. Forming the traceable source signal using any of the techniques above, and further delaying or advancing the signal in a useful way. For example, adjusting the delay of the estimated traceable source signal so that the relative delay of one of the traceable source components is set to a desired value, for example zero. This corresponds to modeling the position in space of the traceable source to be identical to the position of the sensor whose traceable component has a zero delay.

It should be noted that two source hypothesis signals may be mutually coherent. For instance, this situation may arise when a particular source hypothesis description is ambiguous, and the associated source hypothesis generator generates two or more alternative, partially coherent, hypothesis signals from a single description. Alternatively, two source hypothesis signals, arising independently either from two source hypothesis generators or from other origins, may happen to be coherent. In the alternative, it may be possible to determine from the details of the origins of source hypothesis signals that all simultaneous source hypotheses are mutually incoherent and perhaps even essentially independent.

The possibility of mutually coherent source hypothesis signals gives rise to the possibility of generating mutually coherent traceable source estimates. In such cases, the user of the traceable source estimates may need to decide, based on application-specific criteria, which source hypothesis is superior.

The other issue that arises when mutually coherent source hypotheses may be present is the way in which valid hypothesis signals are to be scrubbed from each sensor response signal. As discussed below, in general such scrubbing may be performed either sequentially or jointly. In the presence of potentially coherent source hypotheses, the use of a sequential scrubbing architecture suffers from the disadvantage that the order of scrubbing will, in general, affect the coherence of the identified traceable components. Joint scrubbing architectures, or parallel scrubbing architectures, do not suffer from this disadvantage, because they do not impose any sequence on the order in which hypothesis signals are scrubbed.

As shown in FIG. 3B, OMBSS module element 360 has three types of outputs. First, the OMBSS module 360 generates source hypothesis validity codes 366*a-c*, one for each of its input source hypothesis signals 362*a-c*. At any given time, each validity code output assumes one of the following three possible values:

Hypothesis validity unknown: the validity of the corresponding source hypothesis is currently unknown;

Hypothesis valid: the corresponding source hypothesis has been determined to be currently valid;

Hypothesis invalid: the corresponding source hypothesis has been determined to be currently invalid.

Second, the OMBSS module generates a traceable source signal estimate corresponding to each detected traceable source signal. Finally, the OMBSS module generates a hidden source signal estimate for each detected hidden source. The number of validity code outputs equals the number of source hypothesis signal inputs. The number of traceable signal outputs equals the number of detected traceable source signals, and the number of hidden signal outputs equals the number of detected hidden sources.

One particular context in which embodiments of the present invention are often useful is the processing of acoustic signals. In the acoustic case, the "hidden" sources are acoustic sources (e.g., noise sources, talkers, loudspeakers, etc.), the sensors are microphones, and an important class of source hypotheses is the class of "pre-acoustic" signals, such as the audio signals that feed loudspeakers. For example, in an airport gate area, there are many simultaneously-active acoustic sources. A microphone anywhere in the gate area will pick up a mixture of many sources. One of those sources might frequently be a CNN broadcast, with the audio coming from loudspeakers mounted in the ceiling. The acoustic radiation from one such speaker is an acoustic source. A relevant source hypothesis description or signal is the audio channel of the CNN broadcast. The electronically broadcast audio signal is not precisely the acoustic output of the speaker itself (it doesn't, for instance, reflect the loudspeaker's frequency characteristics), but it is strongly coherent with the loudspeaker's acoustic output.

We now present in greater technical detail one basic method of employing source hypothesis signals to improve BSS, and then a multi-stage enhancement to the basic method. In this exposition we treat OMBSS as an enhancement to the blind source separation problem that employs a priori known source signals (the source hypotheses). Although the principles proposed here apply to the broader settings of general estimation within nonlinear and post-nonlinear mixing scenarios, we use adaptive filtering within a linear (convolutive) mixing network as an example. Given a set of L-length source vectors $S=\{s_q(t)\}_{q=1}^{Q}$ at time t where the $q^{th}$ source vector is $s_q(t)=[s_q(t), s_q(t-1), \ldots, s_q(t-L+1)]^T$ and $s_q(t)$ is an individual source sample, the set of data signals, $\{x_p(t)\}_{p=1}^{P}$ is given by, $$x_p(t) = \sum_{q=1}^{Q} h_{qp}^T(t) s_q(t), \quad p = 1, \ldots , P$$

where $h_{qp}^T(t)$ is an L-length vector of filter coefficients. Although $h_{qp}^T(t)$ is possibly time-varying, we now drop the time-dependence for clarity of presentation and assume that the individual filters, $h_{qp}$ for q=1, . . . , Q and p=1, . . . , P, are static (or at least quasi-static, in practice). The goal of the source separation problem is to recover S up to some arbitrary constant filtering and permutation (if S is considered as an ordered set).

Figure 19:
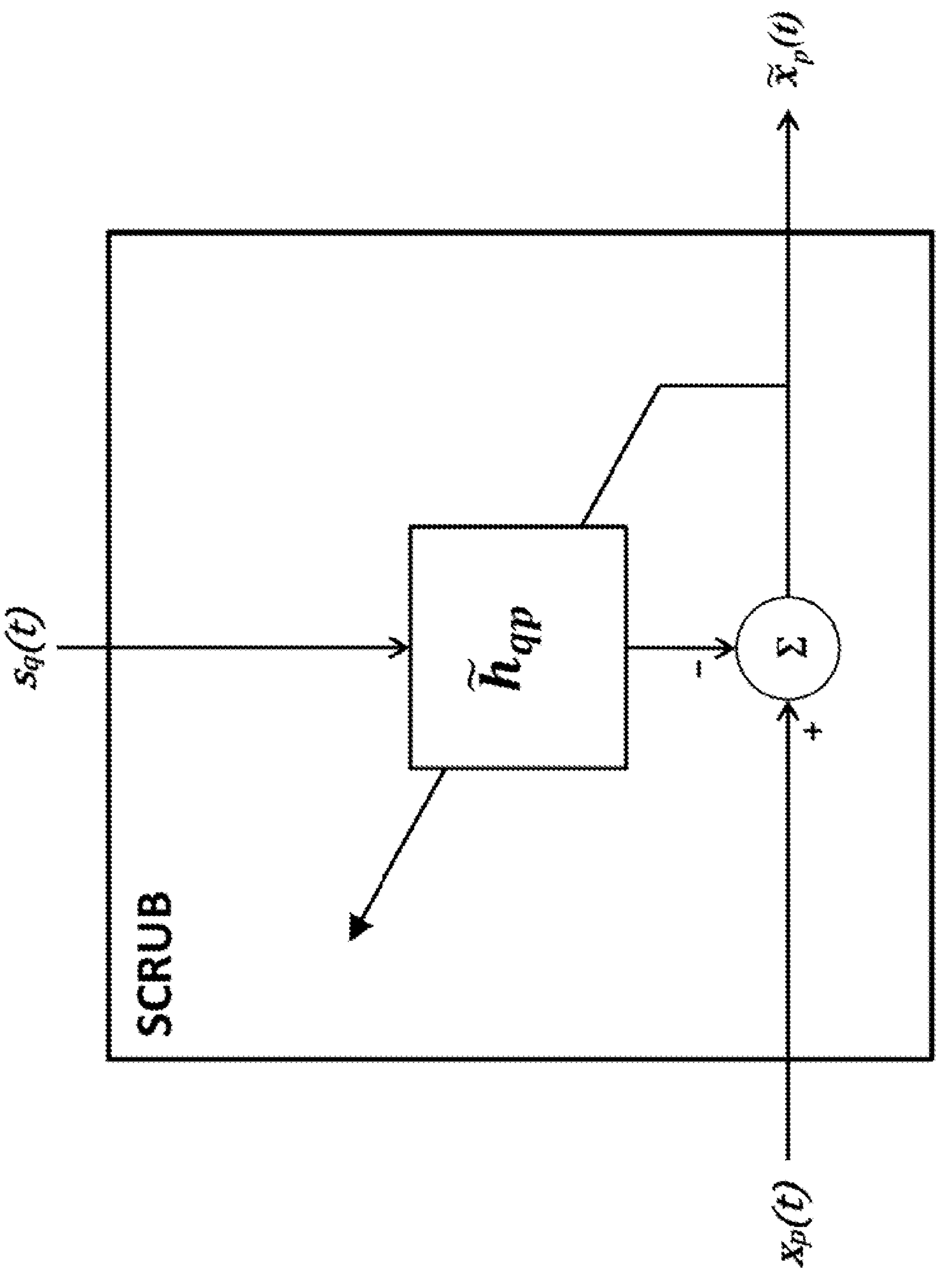
FIG. 19 shows an adaptive filtering representation of removing a source from a mixture of sources according to one embodiment of the present invention.

Now consider the case where R sources are known a priori, in the form of reference signals, such that the source set can be divided into two complementary subsets $S_a(t)=\{s_q(t)\}_{q=1}^{R}$ and $S_h(t)=\{s_q(t)\}_{q=R+1}^{Q}$. We are making the assumption that all sources in S are actually present in the data signals, and we do not address the problem of detecting the known source set, $S_a(t)$, in those mixtures. For each of the R known reference signals we wish to estimate the forward mixing filters $h_{qp}$ for q==1, . . . , R and p=1, . . . , P, and then use those estimates to remove, or scrub, the filtered estimates of $S_a(t)$ from the mixtures. FIG. 19 shows an adaptive filtering representation of a method of removing the $q^{th}$ reference signal from the $p^{th}$ data signal.

Thus, speaking informally about the process shown in FIG. 1, we say that the adaptive filter shown in FIG. 19 "scrubs" the $q^{th}$ source hypothesis signal (reference signal) from the $p^{th}$ sensor response mixture (data signal).

For the $p^{th}$ mixture, the source removal can be performed by jointly estimating $\{\hat{h}_{qp}\}_{q=1}^{R}$ or estimating the individual $\hat{h}_{qp}$ for q=1, . . . , R sequentially in a deflationary manner. In either case, the filter estimation will take place in the presence of multiple interfering sources, resulting in a filter mismatch $\tilde{h}_{qp}=h_{qp}-\hat{h}_{qp}\neq 0$ which leaves a residual of the set $S_a(t)$ remaining in the mixture. However, since the power of the individual sources in $S_a(t)$ have been reduced in the mixture leaving the hidden sources $S_h(t)$ as the predominant source power, performing the source removal a second time to estimate the known sources', $S_a(t)$'s, residuals will be more effective since the estimation will take place, effectively, in the presence of Q−R interferers as opposed to the original Q−1 interferers. Denoting $h'_{qp}$ as the residual filter of the $q^{th}$ source the $p^{th}$ mixture, then there will be a filter mismatch $\tilde{h}'_{qp}=h'_{qp}-\hat{h}'_{qp}\neq 0$ thus leaving a residual.

Denoting the $p^{th}$ deflated mixture of this "double SCRUB" method just outlined as, $$x'_p(t) = x_p(t) - \sum_{q=1}^{R} \hat{h}_{pq}^T s_q(t) - \sum_{q=1}^{R} \hat{h}_{pq}^{\prime T} s_q(t)$$

Figure 20:
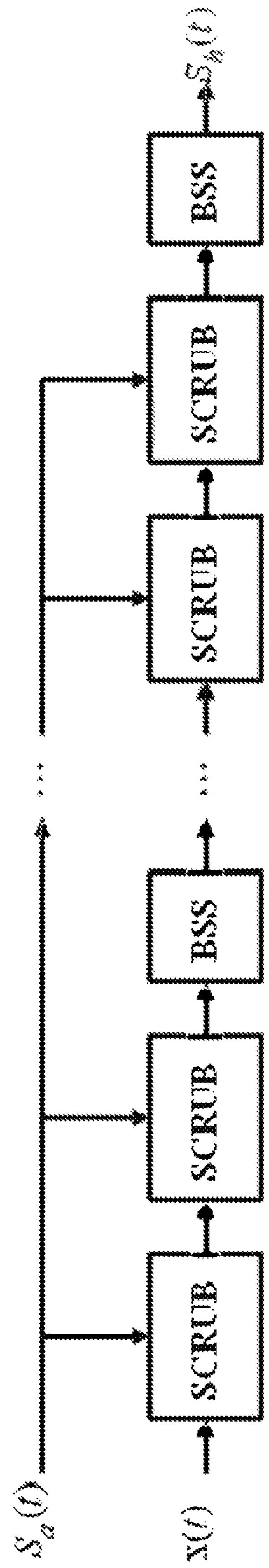
FIG. 20 is a diagram illustrating a process involving performing a SCRUB operation twice and then performing a BSS operation, and then repeating the process indefinitely according to one embodiment of the present invention.

The set of deflated mixtures $X'=\{x'_p(t)\}_{p=1}^{P}$ can be input into a blind source separation (BSS) algorithm where $x'_p(t)=[x'_p(t), x'(t), \ldots, x'_p(t-M+1)]^T$ and M is some number of algorithm-dependent samples. Assuming that the BSS method is able to (at least, partially) separate the hidden sources such that the BSS outputs are estimates of the hidden sources, $\hat{S}_h(t)$, then the double SCRUB method can be repeated on the BSS outputs, since the residual estimates will now be carried out under an even further reduced interference set. Indeed, the individual known source residuals will be estimated in the presence of one predominant interfering source and Q−2 (presumably low-power) residuals. The output of the double SCRUB can then be fed into the BSS algorithm again, since the resulting reduction in residual power will allow a better source separation estimate. Denoting the vector of mixture observations at time t as $x(t)=[x_1(t), x_2(t), \ldots, x_p(t)]^T$, this process of double SCRUB then BSS can then be performed indefinitely to enhance the BSS solution, as is shown in FIG. 20.

In general, when a source hypothesis signal has been scrubbed from all of the sensor response signals, the associated traceable source has been removed as a possible hidden source that makes any contribution to the scrubbed response signals. That is, the scrubbed responses signals are all essentially independent of the given source hypothesis signal.

Similarly, whenever the power in a scrubbed sensor response signal is zero, or not significantly greater than zero, and it has any traceable components, then that sensor response mixture can be considered to consist solely of traceable components, all of which have been scrubbed, and none of which correspond to hidden sources. In this case, the response signal does not need to be processed by the BSS algorithm, and eliminating it as an input (i.e., reducing the response set) may have computational and performance advantages.

Embodiments of the present invention use source hypotheses (e.g., source hypotheses signals 362*a-c*) to improve source separation. As a result, in practice embodiments of the present invention may produce better results (i.e., better estimated hidden sources 372*a-b*) than BSS. Put another way, in cases where information associated with source signals is available, that information can be used in conjunction with BSS processing to generate a better estimate of the hidden sources than is available from sensor mixtures alone. Here, "better" generally means source estimates that are of higher fidelity and are more completely separated from other sources.

Another advantage of embodiments of the present invention is that it may reduce the number of components in one or more response mixtures, which typically improves the quality of the final result and/or reduces the amount of input data and processing time required to produce a final estimate. Yet another advantage of embodiments of the present invention is that it may eliminate one or more hidden sources completely—that is, convert them from "hidden" to "known". Often, if the number of hidden sources in a particular signal scenario can be reduced, the amount of input data and processing time required for the BSS algorithm to produce an estimate of the remaining sources is reduced, and the quality of the resulting estimates improved. Indeed, although there exist BSS algorithms that can separate more underlying sources than there are sensor response signals to process, many attractive BSS algorithms assume that the number of underlying hidden source signals is equal to, or at least no greater than, the number of sensor response signals. In practice, using embodiments of the present invention to "scrub" excess source components from a set of sensor response signals may represent the difference between effective separation of the remaining hidden sources, and the inability to effectively separate the mixtures, due to violation of the BSS algorithm's underlying assumptions and requirements.

A related advantage of embodiments of the present invention is that in some circumstances, all of the components in one or more sensor outputs may be associated with source hypothesis signals, so that those sensor outputs do not have to be submitted for BSS processing at all, thereby reducing the complexity of the required BSS processing, reducing the quantity of sensor data required, and/or improving the quality of the final BSS estimates. A set of sensor outputs whose number has been reduced by eliminating one or more outputs, all of whose mixture components have been identified as traceable, is referred to as a reduced, or deflated, response set.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

For example, although the acoustic situation is an important one, embodiments of the present invention are not limited to use in conjunction with acoustic signals, but rather may be used additionally or alternatively with other kinds of signals. For example, embodiments of the present invention may be used in conjunction with bioelectrical signals (e.g., bioelectrical signals in the human body), in which case the sensors may be electrodes and the sources may be neural signals.

Also by way of example, although statistical independence has been regularly assumed as an advantageous measure of essential independence, source independence may also be usefully employed as the measure of essential independence.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Any reference herein to "associating" one unit of data with another may be implemented, for example, by storing data in a non-transitory computer readable medium, representing the association between the two units of data. A variety of techniques for representing such associations are well-known to those having ordinary skill in the art. Similarly, any reference herein to "marking" a unit of data with a property may be implemented, for example, by storing data in a non-transitory computer readable medium representing the property and indicating that the property is associated with the unit of data. A variety of techniques for performing such markings are well-known to those having ordinary skill in the art.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention process automatically (e.g., using electronic circuitry, such as one or more computer processors) signals (e.g., acoustic and/or electrical signals) that cannot be manipulated, understood, or otherwise processed manually by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method for generating additional independent signal terms (ISTs) of a data signal given an initial set of ISTs of that data signal and at least one mutually independent partitioning support set of reference signals, the initial set of ISTs including zero or more ISTs, the method comprising:

(1) generating a deflated data signal by subtracting the sum of all of the ISTs in the initial set of ISTs from the data signal;

(2) generating an optimal image of each of the at least one mutually independent partitioning support sets on the deflated data signal;

(3) testing each generated optimal image so as to identify each non-zero optimal image; and (4) identifying each non-zero optimal image as an additional independent signal term of the data signal.

2. The method of claim 1, wherein the initial set of ISTs consists of zero ISTs, and wherein the method further comprises:

(5) generating additional independent signal terms of the data signal by performing the following steps at least once:

a. creating an augmented set of ISTs by adding any previously-generated additional independent signal terms to the initial set of ISTs; and b. generating additional independent signal terms of the data signal, using the augmented set of ISTs as the initial set of ISTs.

3. The method of claim 1, further comprising:

(5) before (1), generating at least one of the reference signals in the at least one mutually independent partitioning set of reference signals by linearly filtering signals generated by a blind source separation algorithm.

4. The method of claim 3, wherein the additional independent signal terms (ISTs) of the data signal represents a response of a sensor.

5. The method of claim 4, wherein the sensor comprises an acoustic sensor.

6. A system comprising at least one non-transitory computer readable medium having stored thereon computer program instructions executable by at least one computer processor to perform a method for generating additional independent signal terms (ISTs) of a data signal given an initial set of ISTs of that data signal and at least one mutually independent partitioning support set of reference signals, the initial set of ISTs including zero or more ISTs, the method comprising:

(1) generating a deflated data signal by subtracting the sum of all of the ISTs in the initial set of ISTs from the data signal;

(2) generating an optimal image of each of the at least one mutually independent partitioning support sets on the deflated data signal;

(3) testing each generated optimal image so as to identify each non-zero optimal image; and (4) identifying each non-zero optimal image as an additional independent signal term of the data signal.

7. The system of claim 6, wherein the initial set of ISTs consists of zero ISTs, and wherein the method further comprises:

(5) generating additional independent signal terms of the data signal by performing the following steps at least once:

c. creating an augmented set of ISTs by adding any previously-generated additional independent signal terms to the initial set of ISTs; and d. generating additional independent signal terms of the data signal, using the augmented set of ISTs as the initial set of ISTs.

8. The system of claim 6, wherein the method further comprises:

(5) before (1), generating at least one of the reference signals in the at least one mutually independent partitioning set of reference signals by linearly filtering signals generated by a blind source separation algorithm.

9. The system of claim 8, wherein the additional independent signal terms (ISTs) of the data signal represents a response of a sensor.

10. The system of claim 9, wherein the sensor comprises an acoustic sensor.

* * * * *